United States Patent
Li et al.

(10) Patent No.: US 11,212,345 B2
(45) Date of Patent: Dec. 28, 2021

(54) FRAMEWORK AND METHODS TO CONTROL EXCHANGE OF RANGING RESULT

(71) Applicant: Samsung Electronics Co., Ltd., Suwon-si (KR)

(72) Inventors: Zheda Li, Plano, TX (US); Aditya V. Padaki, Richardson, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 16/810,627

(22) Filed: Mar. 5, 2020

(65) Prior Publication Data
US 2020/0287959 A1    Sep. 10, 2020

Related U.S. Application Data

(60) Provisional application No. 62/815,865, filed on Mar. 8, 2019, provisional application No. 62/856,824, filed on
(Continued)

(51) Int. Cl.
  *H04L 29/08*    (2006.01)
  *H04L 12/26*    (2006.01)
  (Continued)

(52) U.S. Cl.
  CPC ........ *H04L 67/101* (2013.01); *H04L 43/0864* (2013.01); *H04W 24/10* (2013.01);
  (Continued)

(58) Field of Classification Search
  CPC ......... H04W 72/0406; H04W 72/1263; H04W 72/446; H04W 28/02; H04W 4/70; H04W 7/026; H04W 56/007; H04W 48/16
  (Continued)

(56) References Cited

U.S. PATENT DOCUMENTS

| | | | |
|---|---|---|---|
| 9,456,375 B2* | 9/2016 | Kang | H04B 7/026 |
| 9,729,999 B2* | 8/2017 | Wang | H04L 67/327 |

(Continued)

FOREIGN PATENT DOCUMENTS

| | | | | |
|---|---|---|---|---|
| WO | WO-2020141868 A1 * | 7/2020 | | H04L 43/0864 |
| WO | WO-2020145745 A1 * | 7/2020 | | G01S 13/765 |

OTHER PUBLICATIONS

IEEE Standard for Low-Rate Wireless Networks Amendment: Enhanced High Rate Pulse (HRP) and Low Rate Pulse (LRP) Ultra Wide-Band (UWB) Physical Layers (PHYs) and Associated Ranging Techniques Oct. 2019 (Year: 2019).*

(Continued)

*Primary Examiner* — William D Cumming

(57) ABSTRACT

A method and apparatus of a network entity in a wireless communication system supporting ranging capability. The method includes generating a medium access control (MAC) common part sublayer-data request primitive including a ranging enable indicator and a ranging request measurement and control IE (RRMC IE) with a reply-time request. The RRMC IE includes request fields for a reply time, a round-trip measurement, a time-of-flight, an angle of arrival (AOA) azimuth, an AoA elevation, a ranging control information, a reserved bit, an RRMC table length, and an RRMC table. The method further includes transmitting MAC Data including the RRMC IE to another network entity and receiving MAC Data including a ranging reply time instantaneous IE from the other network entity. A local value of a receive ranging counter is identified at the network entity.

20 Claims, 47 Drawing Sheets

Related U.S. Application Data on Jun. 4, 2019, provisional application No. 62/863,091, filed on Jun. 18, 2019, provisional application No. 62/867,605, filed on Jun. 27, 2019, provisional application No. 62/874,438, filed on Jul. 15, 2019.

(51) Int. Cl.
*H04W 48/16* (2009.01)
*H04W 72/04* (2009.01)
*H04W 48/14* (2009.01)
*H04W 80/02* (2009.01)
*H04W 88/06* (2009.01)
*H04W 24/10* (2009.01)

(52) U.S. Cl.
CPC ........... *H04W 48/14* (2013.01); *H04W 48/16* (2013.01); *H04W 72/0446* (2013.01); *H04W 80/02* (2013.01); *H04W 88/06* (2013.01)

(58) Field of Classification Search
USPC .......................................... 370/328, 329, 230
See application file for complete search history.

(56) References Cited

U.S. PATENT DOCUMENTS

| | | | |
|---|---|---|---|
| 9,813,494 B2 | 11/2017 | Ding et al. | |
| 9,974,040 B1* | 5/2018 | Chu | H04W 56/007 |
| 10,225,710 B2* | 3/2019 | Wang | H04W 4/70 |
| 10,609,187 B2* | 3/2020 | Venkatesan | H04L 69/24 |
| 10,771,999 B2* | 9/2020 | Sanderovich | G01S 13/765 |
| 10,908,274 B2* | 2/2021 | Li | H04W 72/048 |
| 2011/0103309 A1* | 5/2011 | Wang | H04W 72/0406 370/328 |
| 2014/0126419 A1 | 5/2014 | Boland et al. | |
| 2014/0293783 A1* | 10/2014 | Kang | H04W 28/02 370/230 |
| 2015/0016359 A1 | 1/2015 | Wang et al. | |
| 2015/0263880 A1* | 9/2015 | Wang | H04W 4/70 370/329 |
| 2015/0319631 A1 | 11/2015 | Aldana et al. | |
| 2017/0086185 A1* | 3/2017 | Wang | H04W 72/1263 |
| 2017/0339512 A1* | 11/2017 | Wang | H04L 67/327 |
| 2020/0225341 A1* | 7/2020 | Li | H04L 5/0055 |
| 2020/0229068 A1* | 7/2020 | Li | H04W 48/16 |
| 2020/0287959 A1* | 9/2020 | Li | H04W 72/0446 |
| 2020/0359275 A1* | 11/2020 | Li | H04W 74/002 |
| 2020/0374783 A1* | 11/2020 | Padaki | H04W 80/02 |

OTHER PUBLICATIONS

IEEE Draft Standard for Low-Rate Wireless Networks Amendment: Enhanced High Rate Pulse (HRP) and Low Rate Pulse (LRP) Ultra Wide-Band (UWB) Physical Layers (PHYs) and Associated Ranging Techniques Published in: IEEE P802.15.4z/D05, Nov. 2019 (pp. 1-180) Dec. 9, 2019 (Year: 2019).*

"IEEE Standard for Wireless Medium Access Control (MAC) and Physical Layer (PHY) Specifications for Peer Aware Communications (PAC)", IEEE Computer Society, IEEE Std 802.15.8TM, Dec. 2017, 322 pages.

"IEEE Standard for Low-Rate Wireless Networks", IEEE Computer Society, IEEE Std 802.15.4TM, Dec. 2015, 708 pages.

Notification of Transmittal of the International Search Report and the Written Opinion of the International Searching Authority, or the Declaration dated Jun. 15, 2020 in connection with International Patent Application No. PCT/KR2020/003214, 9 pages.

* cited by examiner

| Bit: 0 | 1 | 2 | 3~7 | Octets: 0/1 | Variable |
|---|---|---|---|---|---|
| Provider Address Present | AoA Azimuth Request | AoA Elevation Request | Reserved | Provider List Length | Provider List |

FIG. 25

| Octets: 0/2/6/8 |
|---|
| Address |

FIG. 26

| Bits: 0 | Octets: 0/1 | Variable |
|---|---|---|
| Provider Address Present | Provider List Length | Provider List |

FIG. 27

| Octets: 0/2/6/8 | Bits: 1 | Bits: 1 |
|---|---|---|
| Address | AoA Azimuth Request | AoA Elevation Request |

FIG. 28

| Bits: 0 | Octets: 0/1 | Variable |
|---|---|---|
| Provider Address Present | Provider List Length | Provider List |

FIG. 29

| Octets: 0/2/6/8 | Bit: 0 | 1 | 2 | 3~7 |
|---|---|---|---|---|
| Address | ToF request | AoA Azimuth Request | AoA Elevation Request | Reserved |

FIG. 30

| Bit: 0 | 1 | 2 | 3 | 4~7 | Octets: 0/1 | Variable |
|---|---|---|---|---|---|---|
| Provider Address Present | AoA Azimuth Request | AoA Elevation Request | ToF Request | Reserved | Provider List Length | Provider List |

FIG. 31

| Octets: 0/2/6/8 |
|---|
| Address |

| Bits: 1 | 7 | Variable |
|---|---|---|
| Provider Address Present | Provider List Length | Provider List |

FIG. 36 (3600)

| Bit: 0 | 1 | 2 | 3 | 4 | 5 | 6~7 | Octets: 0/2/8 |
|---|---|---|---|---|---|---|---|
| Address Type | Reply Time Request | Round-trip Measurement Request | ToF Measurement request | AoA Azimuth Request | AoA Elevation Request | Reserved | Address |

FIG. 37 (3700)

| Bit: 0 | 1 | 2 | 3 | 4 | 5~7 | Octets: 0/2/8 |
|---|---|---|---|---|---|---|
| Reply Time Request | Round-trip Measurement Request | ToF Measurement request | AoA Azimuth Request | AoA Elevation Request | Reserved | Address |

FIG. 38 (3800)

| Bits: 1 | 7 | Variable |
|---|---|---|
| Address Present | RR Table Length | RR Table |

FIG. 39 (3900)

| Bit: 0 | 1 | 2 | 3 | 4 | 5 | 6 | 7 | Octets: 0/4 | 0/4 | 0/4 | 0/2 | 0/2 | Octets: 0/2/8 |
|---|---|---|---|---|---|---|---|---|---|---|---|---|---|
| Address Type | Reply Time Present | Round-trip Measurement Present | ToF Present | AoA Azimuth Present | AoA Elevation Present | Deferred Mode | Reserved | Reply-Time | RX-to-TX-Time | TX-to-RX Round-trip Time | ToF | AOA Azimuth | AOA Elevation | Address |

FIG. 40 (4000)

| Bit: 0 | 1 | 2 | 3 | 4 | 5 | 6–7 | Octets: 0/4 | 0/4 | 0/4 | 0/2 | 0/2 | Octets: 0/2/8 |
|---|---|---|---|---|---|---|---|---|---|---|---|---|
| Reply Time Present | Round-trip Measurement Present | ToF Present | AoA Azimuth Present | AoA Elevation Present | Deferred Mode | Reserved | Reply-Time | RX-to-TX-Time | TX-to-RX Round-trip Time | ToF | AOA Azimuth | AOA Elevation | Address |

4500

| Bits: 1 | 7 | Variable |
|---|---|---|
| Address Present | RRRC Table Length | RRRC Table |

| Bit: 0 | 1 | 2 | 3 | 4 | 5 | 6 | 7 | Octets: 0/4 | 0/4 | 0/4 | 0/2 | 0/2 | Octets: 0/2/8 |
|---|---|---|---|---|---|---|---|---|---|---|---|---|---|
| Address Request/ Type Report Indicator Request | Reply Time Request | Round-trip Measurement Request | ToF Measurement Request | AoA Azimuth Request | AoA Elevation Request | Deferred Mode | RX-to-TX-Reply-Time | TX-to-RX Round-trip Time | ToF | AoA Azimuth Elevation | AoA | Address |

| Bit: 0 | 1 | 2 | 3 | 4 | 5 | 6 | 7 | Octets: 0/4 | 0/4 | 0/4 | 0/2 | 0/2 | Octets: 0/2/8 |
|---|---|---|---|---|---|---|---|---|---|---|---|---|---|
| Request/ Report Indicator | Reply Time Request | Round-trip Measurement Request | ToF Measurement Request | AoA Azimuth Request | AoA Elevation Request | Deferred Mode | Reserved | RX-to-TX-Reply-Time | TX-to-RX Round-trip Time | ToF | AoA Azimuth Elevation | AoA | Address |

| Bit: 0 | 1 | 2 | 3 | 4 | 5-7 | Octets: 0/4 | 0/4 | 0/4 | 0/2/8 |
|---|---|---|---|---|---|---|---|---|---|
| Request/Report Indicator | Reply Time Request | Round-trip Measurement Request | ToF Request | Deferred Mode | Reserved | RX-to-TX-Reply-Time | TX-to-RX-Round-trip Time | ToF | Address |

FIG. 49 — 4900

| Bit: 0 | 1 | 2 | 3 | 4 | 5 | 6-7 | Octets: 0/1 | 0/Variable |
|---|---|---|---|---|---|---|---|---|
| Address Present | Reply Time Request | Round-trip Measurement Request | ToF Request | AoA Azimuth Request | AoA Elevation Request | Reserved | RRR Table Length | RRR Table |

FIG. 50 — 5000

| Octets: 0/2/8 |
|---|
| Address |

5200

| Bit: 0 | 1 | 2 | 3 | 4 | 5 | 6 | 7 | Octets:0/1 | 0/Variable |
|---|---|---|---|---|---|---|---|---|---|
| Address Present | Address Type | Reply Time Request | Round-trip Measurement Request | ToF Request | AoA Azimuth Request | AoA Elevation Request | Reserved | RRR Table Length | RRR Table |

| Bit: 0 | 1 | 2 | 3 | 4 | 5 | 6-7 | Octets:0/1 | 0/Variable |
|---|---|---|---|---|---|---|---|---|
| Address Present | Reply Time Request | Round-trip Measurement Request | ToF Request | AoA Azimuth Request | AoA Elevation Request | Ranging Control Info | RRR Table Length | RRR Table |

FIG. 53

| Bit: 0 | 1 | 2 | 3 | 4 | 5 | 6 | 7 | Octets: 1 | Variable |
|---|---|---|---|---|---|---|---|---|---|
| Address Present | Reply Time Present | Round-trip Measurement Present | ToF Present | AoA Azimuth Present | AoA Elevation Present | Deferred Mode | Reserved | RR Table Length | RR Table |

FIG. 54

| Octets: 0/4 | 0/4 | 0/4 | 0/2 | 0/2 | 0/2/8 |
|---|---|---|---|---|---|
| RX-to-TX Reply-Time | TX-to-RX Roundtrip Time | ToF | AOA Azimuth | AOA Elevation | Address |

| Bit: 0 | 1 | 2 | 3 | 4 | 5 | 6 | 7 | Octets:1 | Variable |
|---|---|---|---|---|---|---|---|---|---|
| Address Present | Address Type | Reply Time Present | Round-trip Measurement Present | ToF Present | AoA Azimuth Present | AoA Elevation Present | Deferred Mode | RR Table Length | RR Table |

FIG. 57 (5700)

| Bit: 0 | 1 | 2 | 3 | 4 | 5 | 6 | 7 | Octets:0/1 | 0/Variable |
|---|---|---|---|---|---|---|---|---|---|
| Request/Report Indicator | Address Present | Reply Time Present | Round-trip Measurement Present | ToF Present | AoA Azimuth Present | AoA Elevation Present | Deferred Mode | RRRC Table Length | RRRC Table |

| Bits: 0 | 1-7 | Variable |
|---|---|---|
| Address Present | RRTI Table Length | RRTI Table |

FIG. 64

| Octets: 4 | 0/2/8 |
|---|---|
| RX-to-Tx-Reply-Time | Address |

FIG. 65

FRAMEWORK AND METHODS TO CONTROL EXCHANGE OF RANGING RESULT

CROSS-REFERENCE TO RELATED APPLICATIONS AND CLAIM OF PRIORITY

The present application claims priority to:
U.S. Provisional Patent Application No. 62/815,865 filed on Mar. 8, 2019;
U.S. Provisional Patent Application No. 62/856,824 filed on Jun. 4, 2019;
U.S. Provisional Patent Application No. 62/863,091 filed on Jun. 18, 2019;
U.S. Provisional Patent Application No. 62/867,605 filed on Jun. 27, 2019; and
U.S. Provisional Patent Application No. 62/874,438 filed on Jul. 15, 2019.

The content of the above-identified patent documents is incorporated herein by reference.

TECHNICAL FIELD

The present disclosure relates generally to a ranging operation in a wireless communication system. In particular, framework and methods to control exchange of ranging result in a wireless communication network is presented.

BACKGROUND

A peer aware communication (PAC) network is a fully distributed communication network that allows direct communication among the PAC devices (PDs). PAC networks may employ several topologies like mesh, star, etc. to support interactions among the PDs for various services.

SUMMARY

Embodiments of the present disclosure provide framework and methods to control exchange of ranging result in a wireless communication network.

In one embodiment, a first network entity in a wireless communication system supporting ranging capability is provided. The first network entity comprises a processor configured to: generate a medium access control (MAC) common part sublayer-data request (MCPS-DATA.request) primitive including a ranging enable indicator and a ranging request measurement and control IE (RRMC IE) with a reply-time request. The first network entity further comprises a transceiver operably connected to the processor, the transceiver configured to: transmit, to a second network entity, a first MAC Data including the RRMC IE, receive, from the second network entity, a second MAC Data including a ranging reply time instantaneous IE (RRTI IE), and the RRMC IE. The processor of the first network entity is further configured to identify a local value of a receive ranging counter (RxRangingCounter).

In another embodiment, a second network entity in a wireless communication system supporting ranging capability is provided. The second network entity comprises a transceiver configured to: receive, from a first network entity, a first MAC Data including ranging enable indicator and a ranging request measurement and control IE (RRMC IE) with a reply-time request, wherein the RRMC IE is generated, by a first network entity, in a medium access control (MAC) common part sublayer-data request (MCPS-DATA.request); and transmit, to the first network entity, a second MAC Data including a ranging reply time instantaneous IE (RRTI IE), and the RRMC IE. The second network entity further comprises a processor operably connected to the transceiver, the processor configured to identify a local value of a receive ranging counter (RxRangingCounter).

In yet another embodiment, a method of a first network entity in a wireless communication system supporting ranging capability is provided. The method comprises: generating a medium access control (MAC) common part sublayer-data request (MCPS-DATA.request) primitive including a ranging enable indicator and a ranging request measurement and control IE (RRMC IE) with a reply-time request; transmitting, to a second network entity, a first MAC Data including the RRMC IE; receiving, from the second network entity, a second MAC Data including a ranging reply time instantaneous IE (RRTI IE), and the RRMC IE; and identifying a local value of a receive ranging counter (RxRangingCounter).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 25 illustrates an example RAR IE content field according to embodiments of the present disclosure;

FIG. 26 illustrates an example row of provider list according to embodiments of the present disclosure;

FIG. 27 illustrates another example RAR IE content field according to embodiments of the present disclosure;

FIG. 28 illustrates another example row of provider list according to embodiments of the present disclosure;

FIG. 29 illustrates an example RRR IE content field according to embodiments of the present disclosure;

FIG. 30 illustrates yet another example row of provider list according to embodiments of the present disclosure;

FIG. 31 illustrates another example RRR IE content field according to embodiments of the present disclosure;

FIG. 32 illustrates yet another example row of provider list according to embodiments of the present disclosure;

FIG. 35 illustrates an example RRR IE content field format according to embodiments of the present disclosure;

FIG. 36 illustrates an example row/element of provider list according to embodiments of the present disclosure;

FIG. 37 illustrates another example row/element of provider list according to embodiments of the present disclosure;

FIG. 38 illustrates an example RR IE content field format according to embodiments of the present disclosure;

FIG. 39 illustrates an example row/element of RR table according to embodiments of the present disclosure;

FIG. 40 illustrates another example row/element of RR table according to embodiments of the present disclosure;

FIG. 45 illustrates an example RRRC IE content field format according to embodiments of the present disclosure;

FIG. 46 illustrates an example row/element of RRRC table according to embodiments of the present disclosure;

FIG. 47 illustrates an example row/element of RRRC table according to embodiments of the present disclosure;

FIG. 48 illustrates an example simplified row/element of RRRC table according to embodiments of the present disclosure;

FIG. 49 illustrates an example revised ranging result request IE (RRR IE) with one control octet according to embodiments of the present disclosure;

FIG. 50 illustrates an example element/row in the RRR table according to embodiments of the present disclosure;

FIG. 52 illustrates another example revised ranging result request IE (RRR IE) with one control octet according to embodiments of the present disclosure;

FIG. 53 illustrates an example revised ranging result request IE (RRR IE) with ranging control bits according to embodiments of the present disclosure;

FIG. 54 illustrates an example revised ranging report IE (RR IE) with one control octet according to embodiments of the present disclosure;

FIG. 55 illustrates an example element/row in the RR table according to embodiments of the present disclosure;

FIG. 56 illustrates another example revised ranging report IE (RR IE) with one control octet according to embodiments of the present disclosure;

FIG. 57 illustrates an example revised ranging request and report control (RRRC) IE with one control octet according to embodiments of the present disclosure;

FIG. 64 illustrates an example ranging reply time instantaneous IE content field format according to embodiments of the present disclosure;

FIG. 65 illustrates an example RRTI table row element format according to embodiments of the present disclosure;

DETAILED DESCRIPTION

Figure 1:
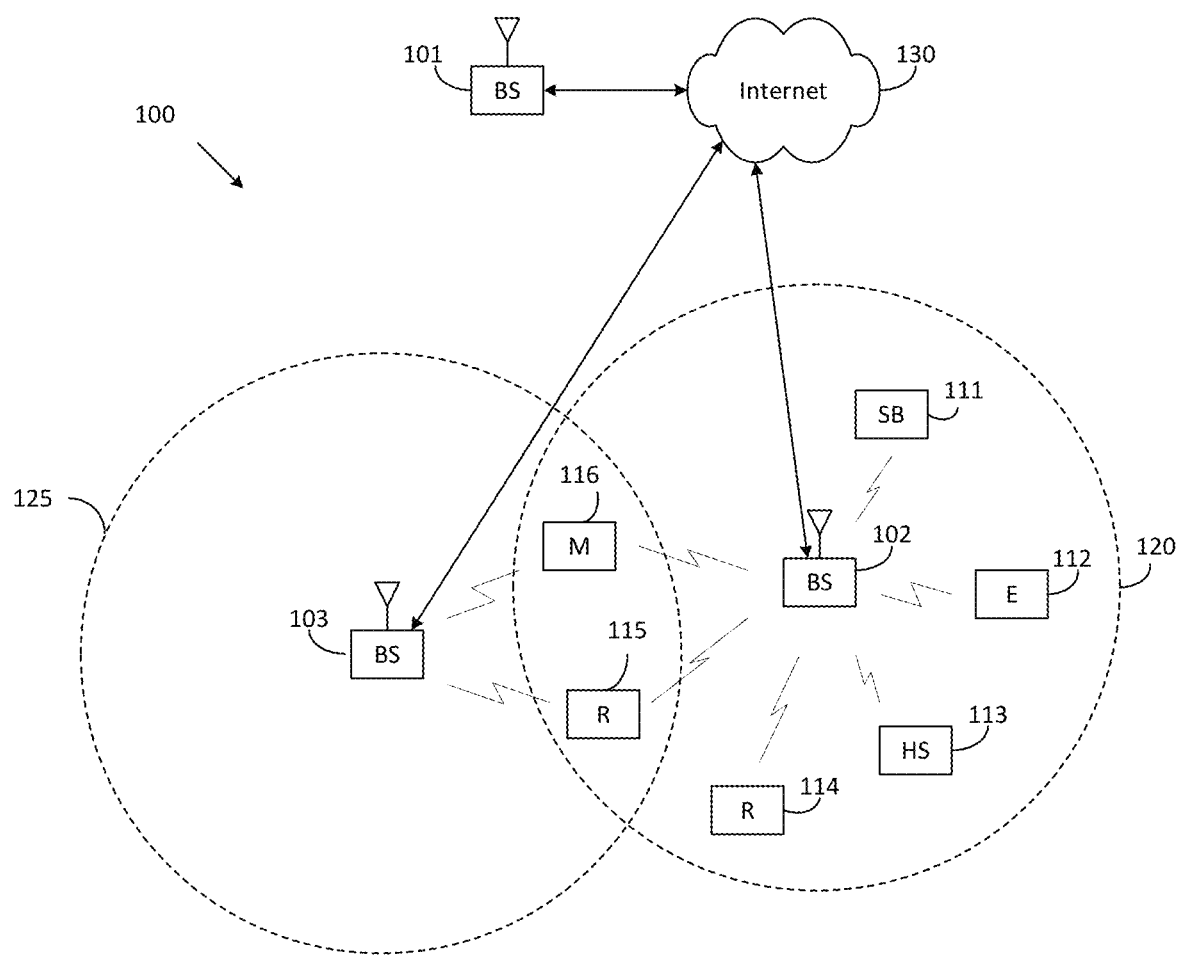
FIG. 1 illustrates an example wireless network according to embodiments of the present disclosure.
Figure 76:
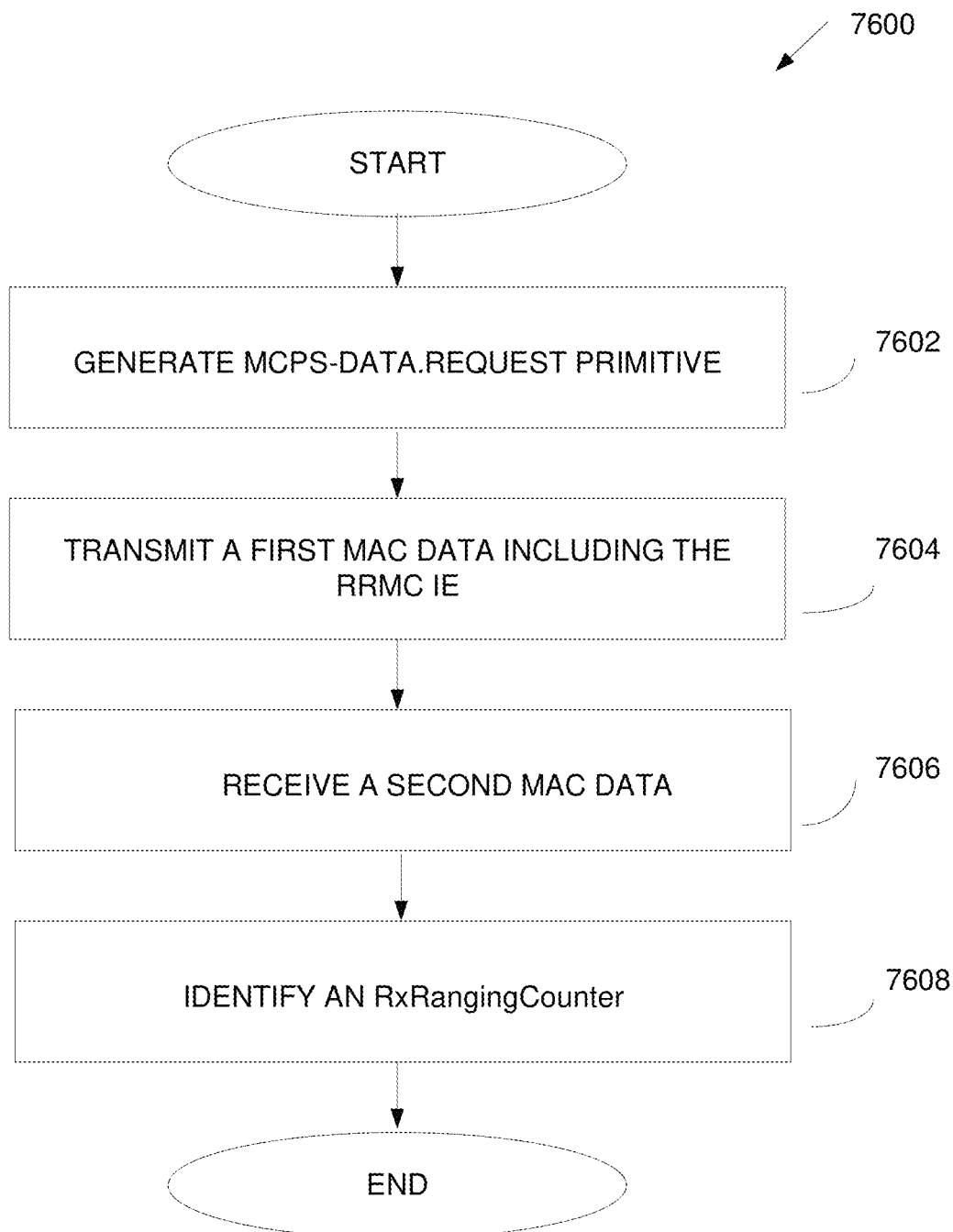
FIG. 76 illustrates a flowchart of a method for secure ranging operation according to embodiments of the present disclosure.

FIG. 1 through FIG. 76, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: IEEE Standard for Wireless Medium Access Control (MAC) and Physical Layer (PHY) Specifications for Peer Aware Communications, IEEE Std 802.15.8, 2017; and IEEE Standard Wireless Medium Access Control (MAC) and Physical Layer (PHY) Specifications for Low Rate Wireless Personal Area Networks (WPANs), IEEE Std 802.15.4, 2105.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 2:
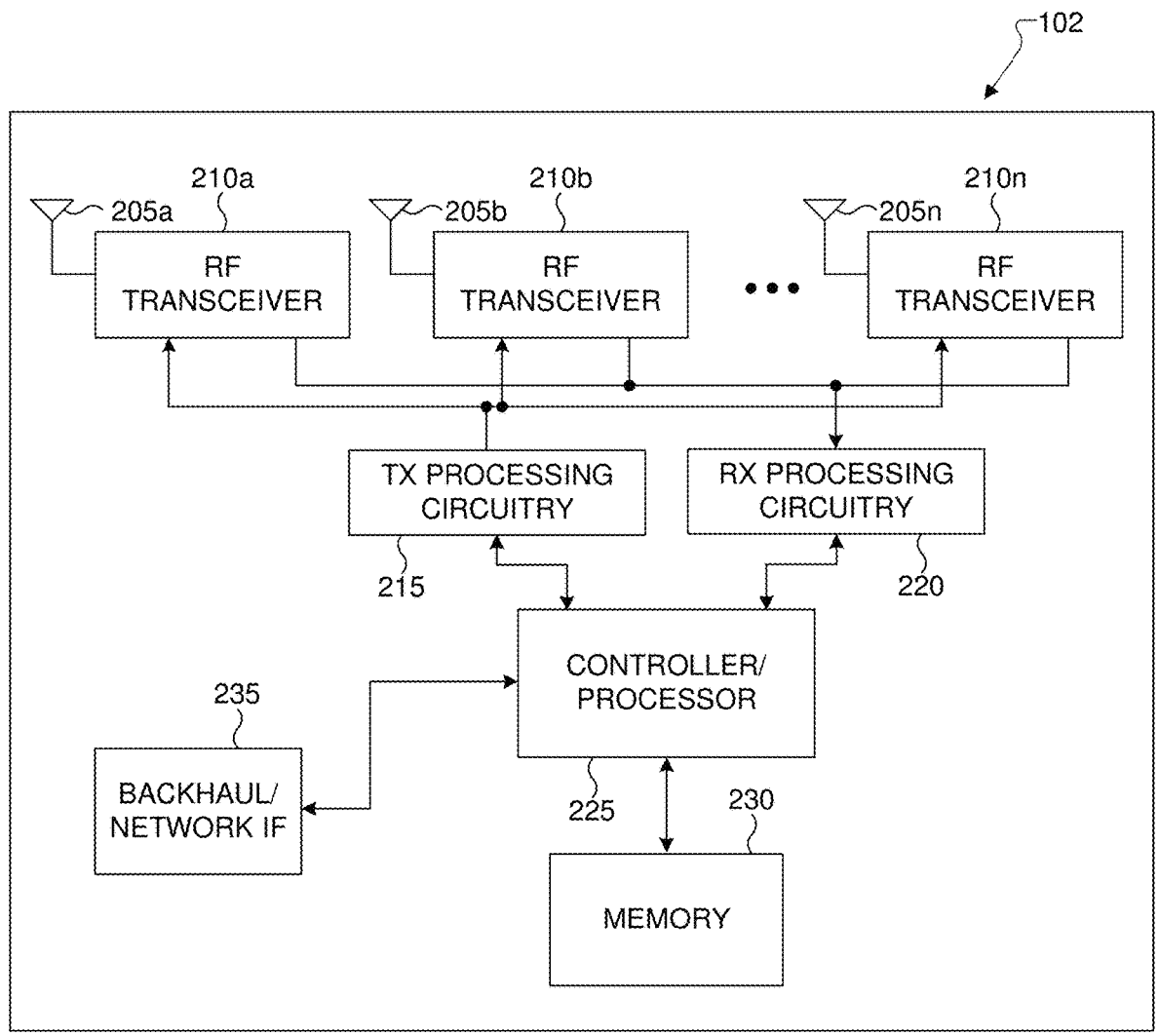
FIG. 2 illustrates an example gNB according to embodiments of the present disclosure.
Figure 3:
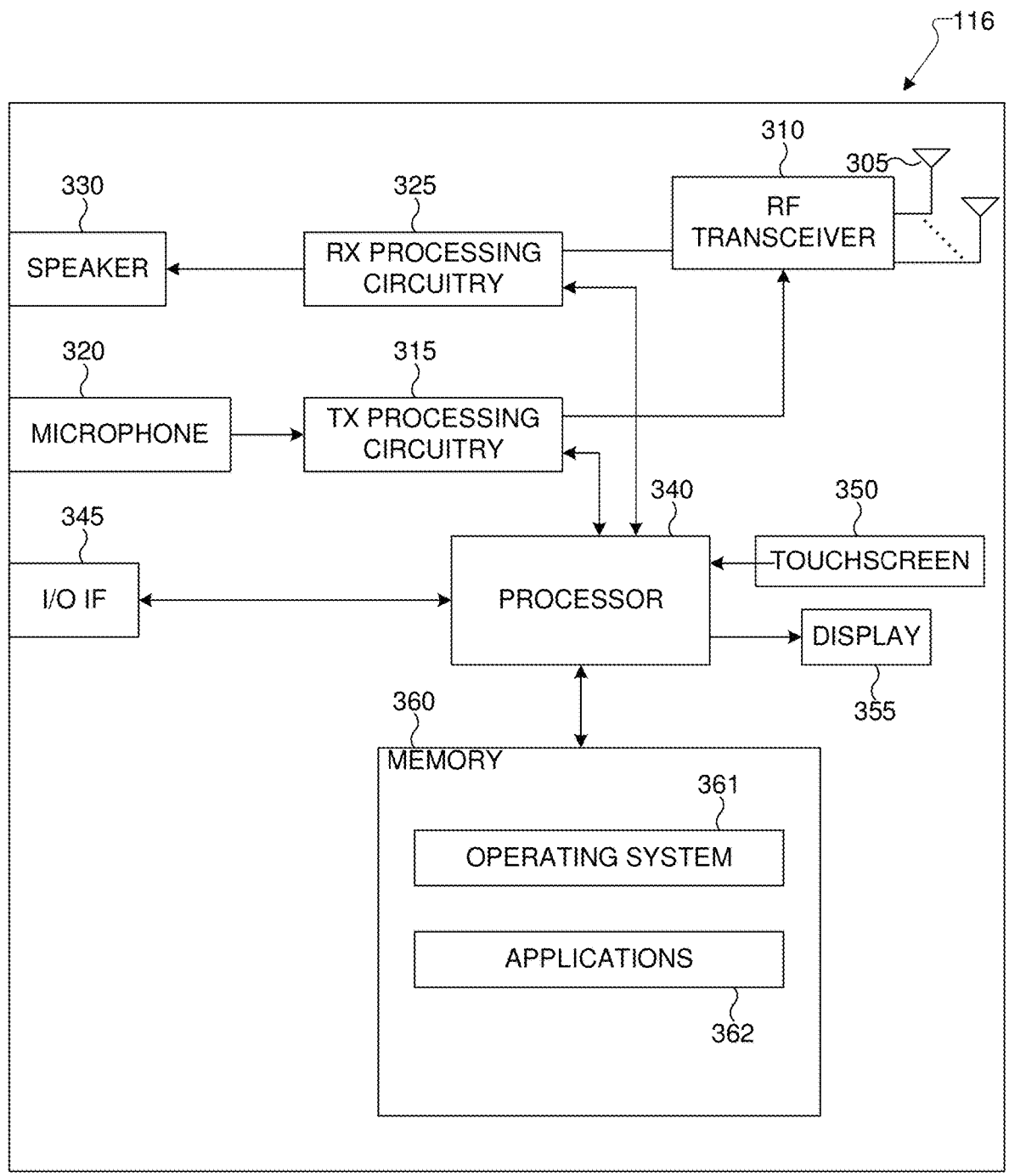
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for CSI reporting in an advanced wireless communication system. In certain embodiments, and one or more of the gNBs 101-103 includes circuitry, programming, or a combination thereof, for CSI acquisition in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
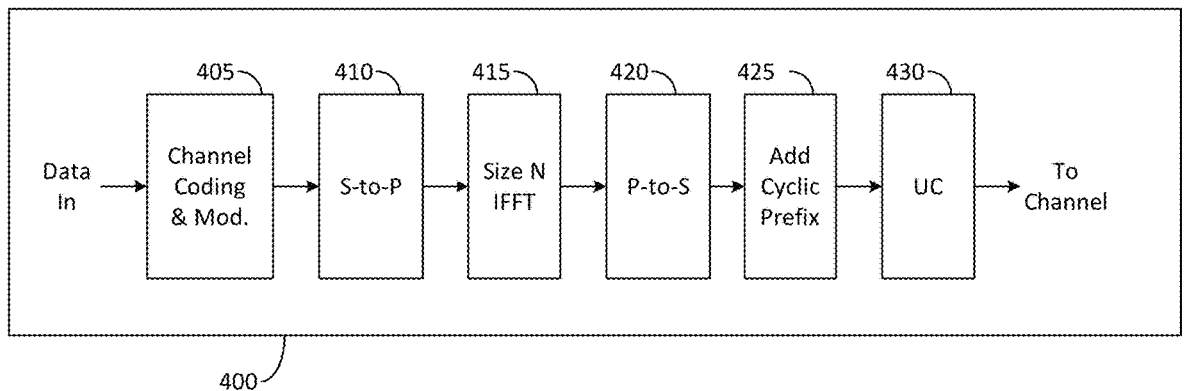
FIG. 4A illustrates a high-level diagram of an orthogonal frequency division multiple access transmit path according to embodiments of the present disclosure.
Figure 4B:
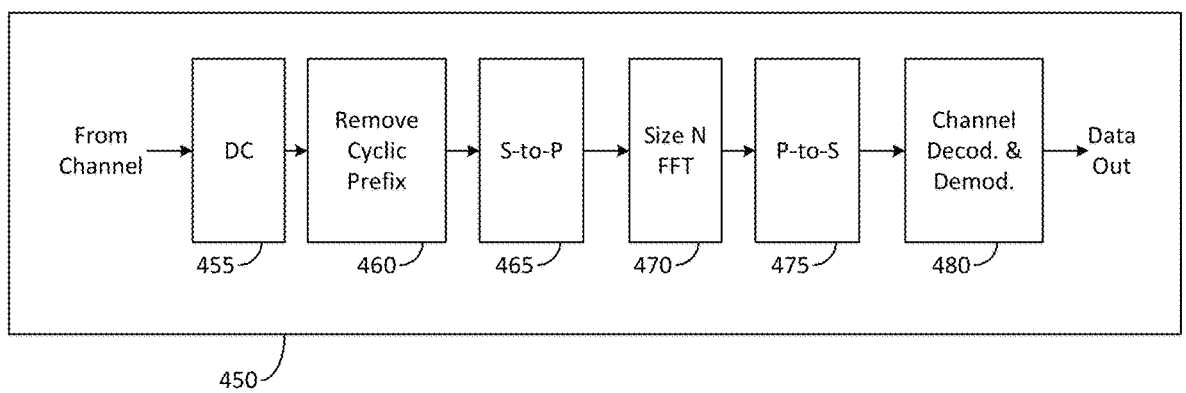
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the present disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A peer aware communication (PAC) network is a fully distributed communication network that allows direct communication among the PAC devices (PDs). PAC networks may employ several topologies like mesh, star, etc. to support interactions among the PDs for various services. While the present disclosure uses PAC networks and PDs as an example to develop and illustrate the present disclosure, it is to be noted that the present disclosure is not confined to these networks. The general concepts developed in the present disclosure may be employed in various type of networks with different kind of scenarios.

Figure 5:
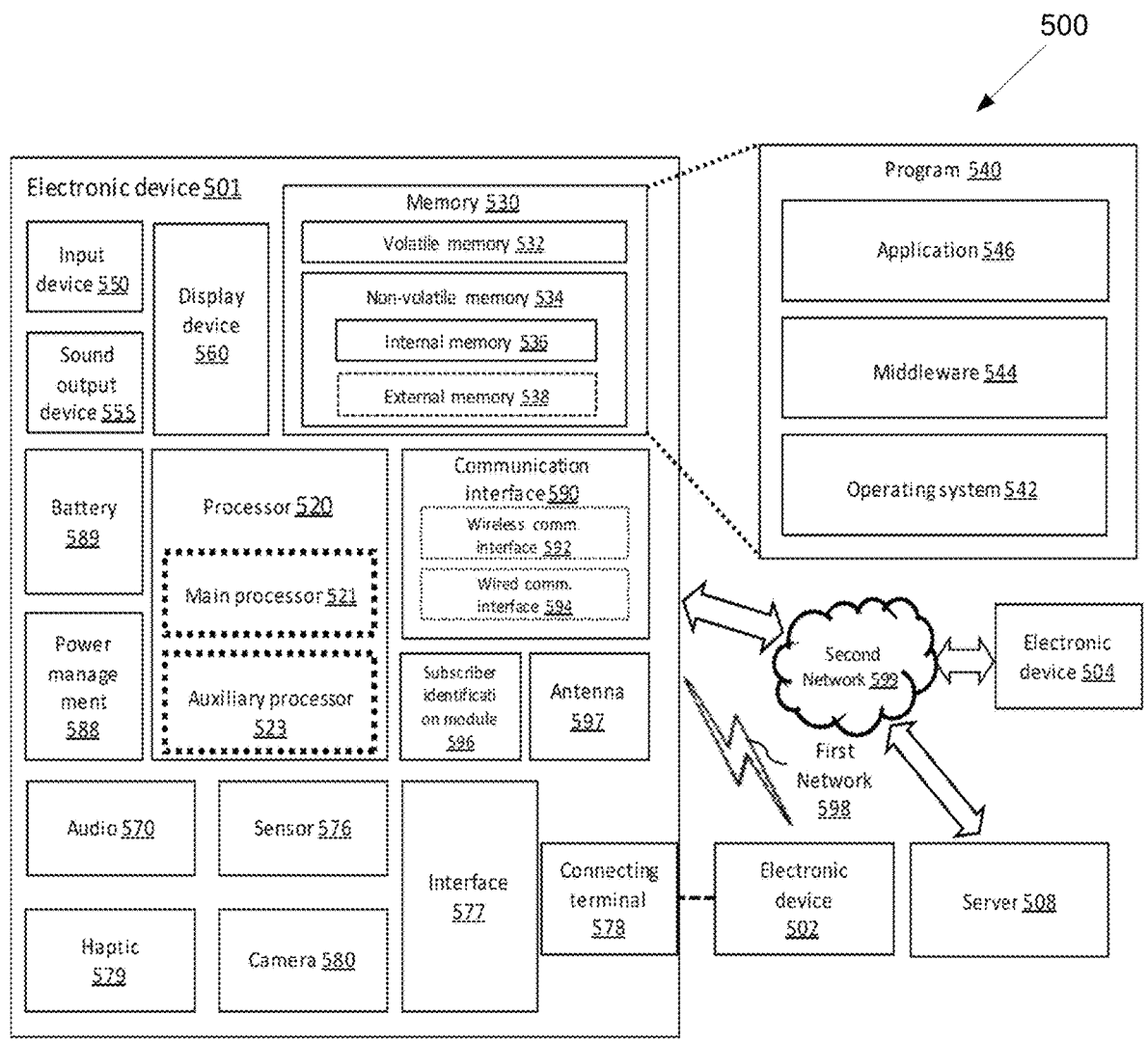
FIG. 5 illustrates an example electronic device according to embodiments of the present disclosure.

FIG. 5 illustrates an example electronic device 501 according to embodiments of the present disclosure. The embodiment of the electronic device 501 illustrated in FIG. 5 is for illustration only. FIG. 5 does not limit the scope of the present disclosure to any particular implementation. The electronic device 501 may be performed a function or functions of 111-116 as illustrated in FIG. 1. In one embodiment, the electronic device may be 111-116 and/or 101-103 as illustrated in FIG. 1.

PDs can be an electronic device. FIG. 5 illustrates an example electronic device 501 according to various embodiments. Referring to FIG. 5, the electronic device 501 may communicate with an electronic device 502 via a first network 598 (e.g., a short-range wireless communication network), or an electronic device 104 or a server 508 via a second network 599 (e.g., a long-range wireless communication network). According to an embodiment, the electronic device 501 may communicate with the electronic device 504 via the server 508.

According to an embodiment, the electronic device 501 may include a processor 520, memory 530, an input device 550, a sound output device 555, a display device 560, an audio 570, a sensor 576, an interface 577, a haptic 579, a camera 580, a power management 588, a battery 589, a communication interface 590, a subscriber identification module (SIM) 596, or an antenna 597. In some embodiments, at least one (e.g., the display device 560 or the camera 580) of the components may be omitted from the electronic device 501, or one or more other components may be added in the electronic device 501. In some embodiments, some of the components may be implemented as single integrated circuitry. For example, the sensor 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520 and may perform various data processing or computation. According to one embodiment of the present disclosure, as at least part of the data processing or computation, the processor 520 may load a command or data received from another component (e.g., the sensor 576 or the communication interface 590) in volatile memory 532, process the command or the data stored in the volatile memory 532, and store resulting data in non-volatile memory 534.

According to an embodiment of the present disclosure, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally, or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor 576, or the communication interface 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera 580 or the communication interface 190) functionally related to the auxiliary processor 523.

The memory 530 may store various data used by at least one component (e.g., the processor 520 or the sensor 576) of the electronic device 501. The various data may include, for example, software (e.g., the program 540) and input data or output data for a command related thereto. The memory 530 may include the volatile memory 532 or the non-volatile memory 534.

The program 50 may be stored in the memory 530 as software, and may include, for example, an operating system (OS) 542, middleware 544, or an application 546.

The input device 550 may receive a command or data to be used by another component (e.g., the processor 520) of the electronic device 501, from the outside (e.g., a user) of the electronic device 501. The input device 550 may include, for example, a microphone, a mouse, a keyboard, or a digital pen (e.g., a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the displays, hologram device, and projector. According to an embodiment, the display device 560 may include touch circuitry adapted to detect a touch, or sensor circuitry (e.g., a pressure sensor) adapted to measure the intensity of force incurred by the touch.

The audio 570 may convert a sound into an electrical signal and vice versa. According to an embodiment, the audio 570 may obtain the sound via the input device 550, or output the sound via the sound output device 555 or a headphone of an external electronic device (e.g., an electronic device 502) directly (e.g., using wired line) or wirelessly coupled with the electronic device 501.

The sensor 576 may detect an operational state (e.g., power or temperature) of the electronic device #01 or an environmental state (e.g., a state of a user) external to the electronic device 501, and then generate an electrical signal or data value corresponding to the detected state. According to an embodiment, the sensor 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., using wired line) or wirelessly. According to an embodiment of the present disclosure, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic 579 may convert an electrical signal into a mechanical stimulus (e.g., a vibration or a movement) or electrical stimulus which may be recognized by a user via his tactile sensation or kinesthetic sensation. According to an embodiment, the haptic 579 may include, for example, a motor, a piezoelectric element, or an electric stimulator.

The camera 580 may capture a still image or moving images. According to an embodiment of the present disclosure, the camera 580 may include one or more lenses, image sensors, image signal processors, or flashes.

The power management 588 may manage power supplied to the electronic device 501. According to one embodiment, the power management 588 may be implemented as at least part of, for example, a power management integrated circuit (PMIC). The battery 589 may supply power to at least one component of the electronic device 501. According to an embodiment, the battery 589 may include, for example, a primary cell which is not rechargeable, a secondary cell which is rechargeable, or a fuel cell.

The communication interface 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication interface 590 may include one or more communication processors that are operable independently from the processor 520 (e.g., the application processor (AP)) and supports a direct (e.g., wired) communication or a wireless communication.

According to an embodiment of the present disclosure, the communication interface 590 may include a wireless communication interface 592 (e.g., a cellular communication interface, a short-range wireless communication interface, or a global navigation satellite system (GNSS) communication interface) or a wired communication interface 594 (e.g., a local area network (LAN) communication interface or a power line communication (PLC)). A corresponding one of these communication interfaces may communicate with the external electronic device via the first network 598 (e.g., a short-range communication network, such as Bluetooth, wireless-fidelity (Wi-Fi) direct, ultra-wide band (UWB), or infrared data association (IrDA)) or the second network 599 (e.g., a long-range communication network, such as a cellular network, the Internet, or a computer network (e.g., LAN or wide area network (WAN)).

These various types of communication interfaces may be implemented as a single component (e.g., a single chip), or may be implemented as multi components (e.g., multi chips) separate from each other. The wireless communication interface 592 may identify and authenticate the electronic device 501 in a communication network, such as the first network 598 or the second network 599, using subscriber information (e.g., international mobile subscriber identity (IMSI)) stored in the subscriber identification module 596.

The antenna 597 may transmit or receive a signal or power to or from the outside (e.g., the external electronic device) of the electronic device 501. According to an embodiment, the antenna 597 may include an antenna including a radiating element composed of a conductive material or a conductive pattern formed in or on a substrate (e.g., PCB). According to an embodiment, the antenna 597 may include a plurality of antennas. In such a case, at least one antenna appropriate for a communication scheme used in the communication network, such as the first network 198 or the second network 599, may be selected, for example, by the communication interface 590 (e.g., the wireless communication interface 592) from the plurality of antennas. The signal or the power may then be transmitted or received between the communication interface 590 and the external electronic device via the selected at least one antenna. According to an embodiment, another component (e.g., a radio frequency integrated circuit (RFIC)) other than the radiating element may be additionally formed as part of the antenna 597.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 may perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

Various embodiments as set forth herein may be implemented as software (e.g., the program 140) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the present disclosure, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as one or more functions are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Ultra-wideband communication, realized by sending a short radio pulse, brings some key benefits to wireless communications, including low-complexity transceiver design, large capacity by utilizing large bandwidth, and robustness to inter-symbol-interference (ISI) of multi-path environment. Meanwhile, the extremely narrow pulses also lower the probability of interception and detection by the third party, which is promising for the data service with highly secure requirement, e.g., secure ranging. Currently, IEEE 802.15.4z is exploring and developing enhancements for capabilities of low rate and high rate UWB impulse radio, aiming to provide better integrity and efficiency.

Ranging and relative localization are essential for various location-based services and applications, e.g., Wi-Fi direct, Internet-of-things (IoTs), etc. With the tremendous increasing of network devices, high demands of ranging requests can be foreseen in the near future, which implies overall ranging message exchanges occur frequently in the network. This may worsen the bottleneck limited by the battery capacity. Energy efficiency becomes more critical for mobile devices, and self-sustained static devices, e.g., low-power sensors.

Another critical issue in the dense environment is the latency to fulfill the scheduled ranging sessions for different ranging pairs. Based on the ranging procedures as defined in IEEE specification, each ranging pair may be assigned with dedicated time slots. It may result in long latency for latter scheduled pairs if there exist large amounts of ranging requests.

Figure 6:
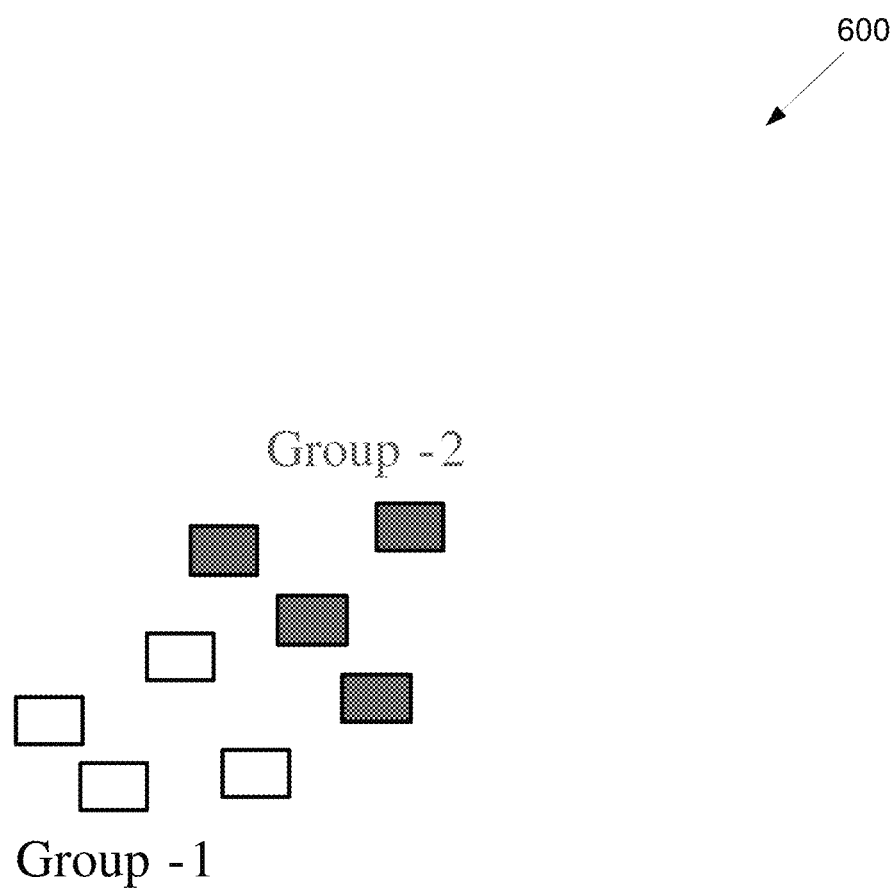
FIG. 6 illustrates an example many-to-many scenario according to embodiments of the present disclosure.

Therefore, implementation of more efficient ranging protocols is necessary to reduce the number of required message exchanges for many ranging pairs. In the present disclosure, the optimized ranging procedure is provided between a group of devices and another group of devices. As illustrated in FIG. 6, one or more devices of group-1 has the ranging request to one or more devices of group-2 or vice versa. Exploiting the broadcast characteristics of wireless channel, mechanisms of optimized transmissions can be respectively realized based on the ranging operation, i.e., single-sided two-way ranging (SS-TWR) and double-sided two-way ranging (DS-TWR), which significantly reduce the number of required information exchange, compared with the current standard.

FIG. 6 illustrates an example many-to-many scenario 600 according to embodiments of the present disclosure. The embodiment of the many-to-many scenario 600 illustrated in FIG. 6 is for illustration only. FIG. 6 does not limit the scope of the present disclosure to any particular implementation. As illustrated in FIG. 6, each node in group 1 and group 2 may performs a function or functions of 111-116 and 101-103 as illustrated in FIG. 1. In one embodiment, each node in group 1 and group 2 may be one of 111-116 and/or be one of 101-103 as illustrated in FIG. 1.

As illustrated in FIG. 6, group-1 and group 2 determined with one or more devices. One or more devices from group-1 have ranging requests to one or more devices from group-2.

In the present disclosure, for a pair of devices to fulfill message exchange of ranging, the devices and associated messages is provided by following respective terms: initiator; device which initializes and sends the first ranging frame (RFRAME) to one or more responders; responder, device which expects to receive the first RFRAME from one or more initiators; poll, RFRAME sent by initiator, and ranging response. RFRAME is sent by responder.

There are two aspects neglected in IEEE standard specification, which are essential for future use cases. The first one is the optimized transmission procedure between one or more initiators and one or more responders, which can be critical for energy-saving purpose. Since a poll can be broadcast to multiple responders, an initiator can initialize a multicast, i.e., one-to-many, ranging round by sending a single poll instead of launching multiple unicast ranging rounds. Similarly, since the ranging response can also be broadcast to multiple initiators, a responder can embed the requested data respectively from different initiator in a single ranging response message. Exploiting the broadcast characteristics of wireless channel, the optimized transmission procedure is promising for future UWB network.

The other neglected aspect is the option for the contention-based ranging in an UWB network. In IEEE specification, one ranging round just contains a single pair of devices, i.e., one initiator and one responder. Within one ranging round, transmissions are implicitly scheduled: a responder/initiator expects to receive the message from the far end and may start to transmit afterwards. multiple ranging rounds can be scheduled by the CFP table of the sync frame. However, there can be other use cases that cannot be supported by IEEE standard specification. For example, the initiator broadcasts the poll, but the initiator does not have the prior-knowledge of who may response. Similarly, the responder may not have the prior-knowledge of who may initialize the ranging, so the responder can wait and listen for a certain period of time to collect polls respectively from different initiators.

In the present disclosure, an UWB network is provided with ranging requests between a group of devices and another group of devices. As shown in FIG. 6, one or more devices of group-1 has the ranging request to one or more devices of group-2 or vice versa. To accommodate optimized ranging transmission procedure and other new use cases, the configuration of device role, i.e., whether the configuration of device is an initiator or a responder, and the scheduling information for scheduling-based ranging, need to be determined and exchanged before the ranging round starts. Aiming to build a stand-alone UWB network, the present disclosure defines new control IE, and ranging scheduling IE for initiators and responders, which can be exchanged over the UWB MAC. However, the present disclosure does not preclude other methods to exchange information via the higher layer or out-of-band management.

Figure 7:
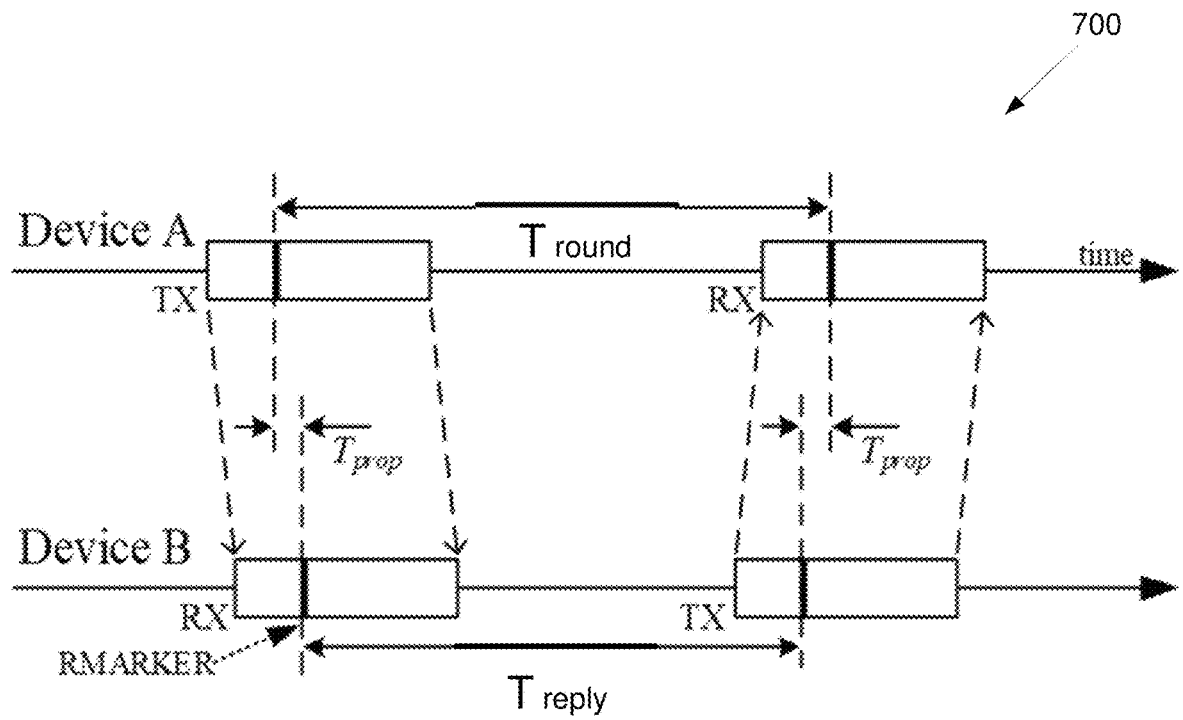
FIG. 7 illustrates an example single-sided two-way ranging according to embodiments of the present disclosure.

FIG. 7 illustrates an example single-sided two-way ranging 700 according to embodiments of the present disclosure. The embodiment of the single-sided two-way ranging 700 illustrated in FIG. 7 is for illustration only. FIG. 7 does not limit the scope of the present disclosure to any particular implementation. The single-sided two-way ranging 700 may be performed in the electronic device 501 as illustrated in FIG. 5.

SS-TWR involves a simple measurement of the round-trip delay of a single message from the initiator to the responder and a response sent back to the initiator. The operation of SS-TWR is as shown in FIG. 7, where device A initiates the exchange and device B responds to complete the exchange. Each device precisely timestamps the transmission and reception times of the message frames, and so can calculate times $T_{round}$ and $T_{reply}$ by simple subtraction. Hence, the resultant time-of-flight, $T_{prop}$, can be estimated by the equation:

$$\hat{T}_{prop} = \frac{1}{2}(T_{round} - T_{reply}).$$

Figure 8:
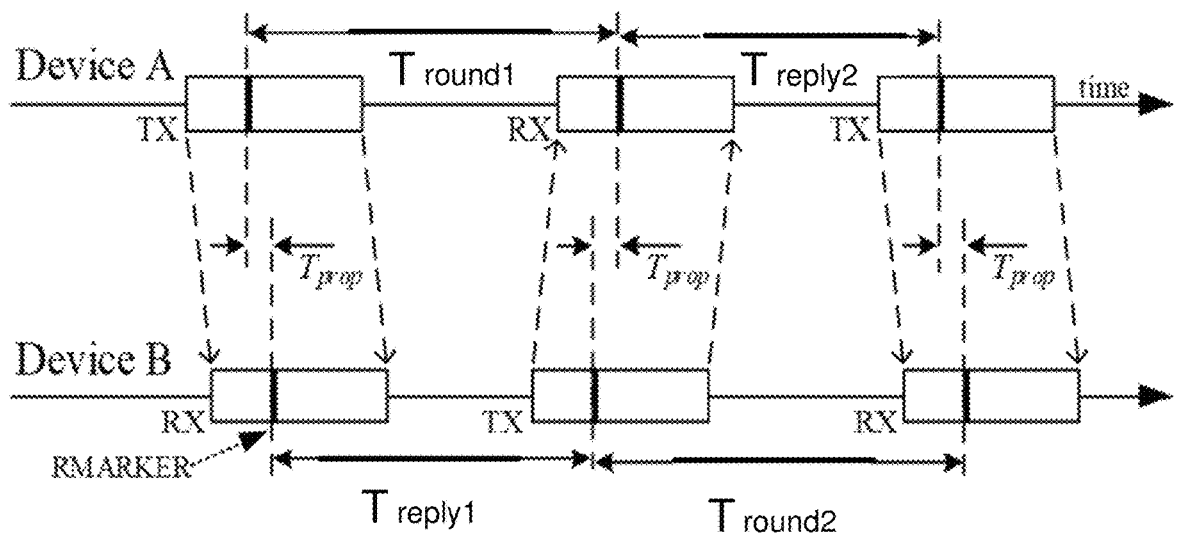
FIG. 8 illustrates an example double-sided two-way ranging with three messages according to embodiments of the present disclosure.

FIG. 8 illustrates an example double-sided two-way ranging with three messages 800 according to embodiments of the present disclosure. The embodiment of the double-sided two-way ranging with three messages 800 illustrated in FIG. 8 is for illustration only. FIG. 8 does not limit the scope of the present disclosure to any particular implementation. The double-sided two-way ranging with three messages 800 may be performed in the electronic device 501 as illustrated in FIG. 5.

DS-TWR with three messages is illustrated in FIG. 8, which reduces the estimation error induced by clock drift from long response delays. Device A is the initiator to initialize the first round-trip measurement, while device B as the responder, responses to complete the first round-trip measurement, and meanwhile initialize the second round-trip measurement. Each device precisely timestamps the transmission and reception times of the messages, and the resultant time-of-flight estimate, $T_{prop}$, can be calculated by the expression:

$$\hat{T}_{prop} = \frac{(T_{round1} \times T_{round2} - T_{reply1} \times T_{reply2})}{(T_{round1} + T_{round2} + T_{reply1} + T_{reply2})}.$$

Figure 9:
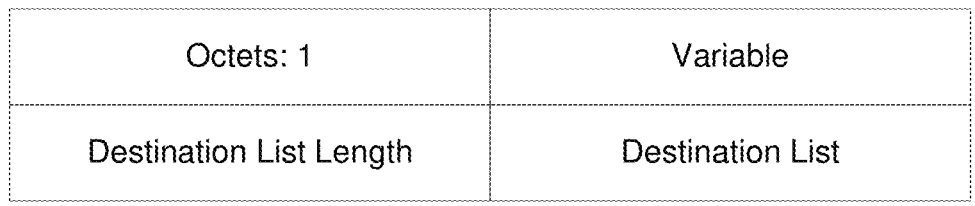
FIG. 9 illustrates an example ranging request reply time IE content field format according to embodiments of the present disclosure.

FIG. 9 illustrates an example ranging request reply time IE content field format 900 according to embodiments of the present disclosure. The embodiment of the ranging request reply time IE content field format 900 illustrated in FIG. 9 is for illustration only. FIG. 9 does not limit the scope of the present disclosure to any particular implementation. As illustrated in FIG. 9, the ranging request reply time IE content field format 900 may be used by the electronic device as illustrated in FIG. 5.

Referring to the payload IEs for ranging control and the transfer of timestamps from the IEEE 802.15.8 document, relevant ranging IEs are introduced here.

The ranging request reply time (RRRT) IE is used as part of a ranging exchange to request a ranging reply time from the remote device participating in the ranging exchange. If RRRT IE is used to request a reply time value of a specific device or multiple devices in multicast/broadcast/many-to-many case, the RRRT IE may include the field for the destination list and the field for the length of destination list as illustrated in FIG. 9. The field of destination list length indicates the number of rows in the destination list, which may be equivalent to the number of devices who need to send the reply time.

Figure 10:
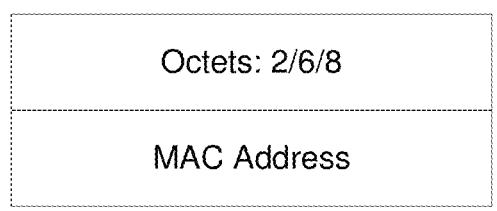
FIG. 10 illustrates an example destination list content field format according to embodiments of the present disclosure.

FIG. 10 illustrates an example destination list content field format 1000 according to embodiments of the present disclosure. The embodiment of the destination list content field format 1000 illustrated in FIG. 10 is for illustration only. FIG. 10 does not limit the scope of the present disclosure to any particular implementation. As illustrated in FIG. 10, the destination list content field format 1000 may be used by the electronic device as illustrated in FIG. 5.

Each row of the destination list includes the field for MAC address of destination device to send the reply time as illustrated in FIG. 10. The MAC address can be a 16-bit short address, 48-bit MAC address, or a 64-bit extended address.

Figure 11:
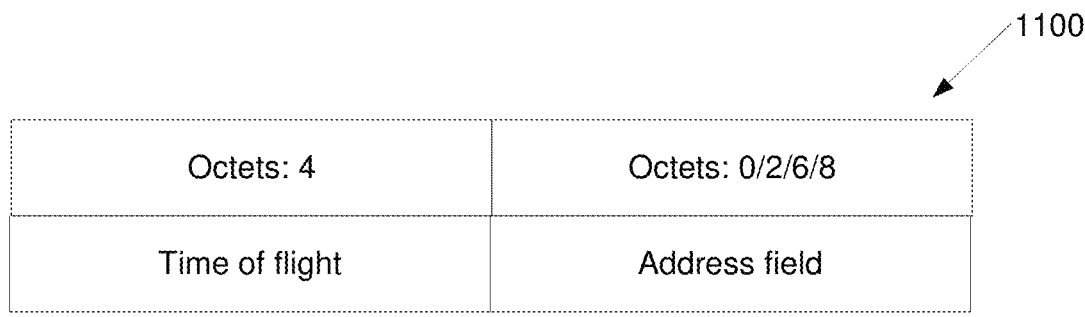
FIG. 11 illustrates an example ranging time-of-flight IE content field format according to embodiments of the present disclosure.

Ranging time-of-flight (RTOF) information element (IE) can be used to communicate the ranging result to the far end if requested. Since multiple ranging results between a device and others can be embedded into one data frame, a MAC address or other short addresses, e.g., a multicast group address can be added to this IE so that the device can extract the ranging result dedicated to the device. If a single pair of devices participates in the ranging round, there is no need to use the address field. An example of RTOF IE content field format is shown in FIG. 11. Other examples are not precluded.

FIG. 11 illustrates an example ranging time-of-flight IE content field format 1100 according to embodiments of the present disclosure. The embodiment of the ranging time-of-flight IE content field format 1100 illustrated in FIG. 11 is for illustration only. FIG. 11 does not limit the scope of the present disclosure to any particular implementation. As illustrated in FIG. 11, the ranging time-of-flight IE content field format 1100 may be used by the electronic device as illustrated in FIG. 5.

Figure 12:
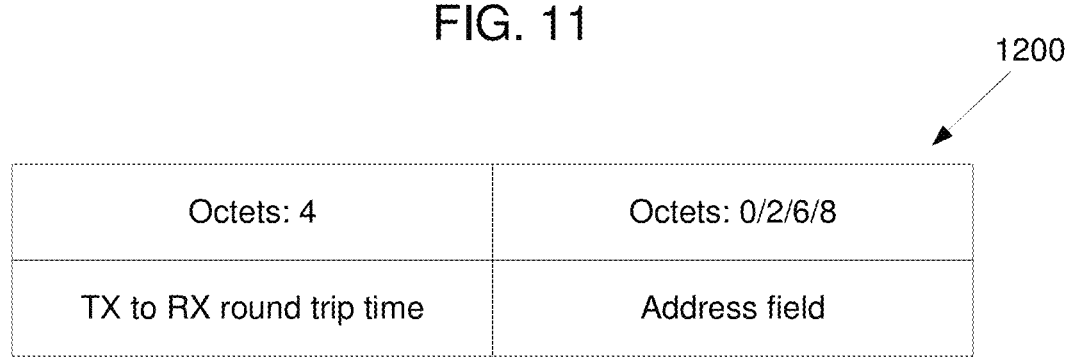
FIG. 12 illustrates an example ranging round trip measurement IE content field format according to embodiments of the present disclosure.

The ranging round trip measurement IE (RRTM IE) content includes the time difference between the transmit time of the ranging frame (RFRAME) initiating a round trip measurement and the receive time of the response RFRAME per source address that completes a round trip. The address field can be a 16-bit short address, a 48-bit MAC address, or a 64-bit extended address. If a single pair of devices participates in the ranging round, there is no need to use the address field. An example RRTM IE content field format is shown in FIG. 12. Other examples are not precluded.

FIG. 12 illustrates an example ranging round trip measurement IE content field format 1200 according to embodiments of the present disclosure. The embodiment of the ranging round trip measurement IE content field format 1200 illustrated in FIG. 12 is for illustration only. FIG. 12 does not limit the scope of the present disclosure to any particular implementation. As illustrated in FIG. 12, the ranging round trip measurement IE content field format 1200 may be used in the electronic device 501 as illustrated in FIG. 5.

Figure 13:
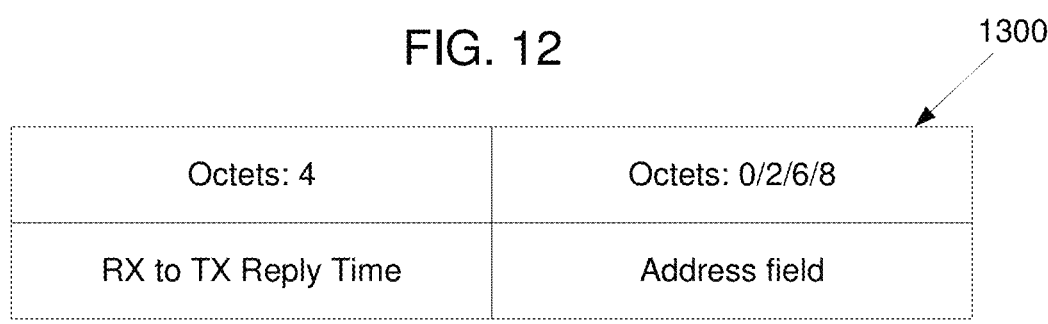
FIG. 13 illustrates an example ranging reply time instantaneous IE content field format according to embodiments of the present disclosure.

The RRTI IE content includes the time difference between the receive time of most recently received RFRAME per source address and the transmit time of the RFRAME containing the IE. The address field can be a 16-bit short address, a 48-bit MAC address, or a 64-bit extended address. If a single pair of devices participates in the ranging round, there is no need to use the address field. An example RRTI IE content field format is shown in FIG. 13. Other examples are not precluded.

FIG. 13 illustrates an example ranging reply time instantaneous IE content field format 1300 according to embodiments of the present disclosure. The embodiment of the ranging reply time instantaneous IE content field format 1300 illustrated in FIG. 13 is for illustration only and may be used in the electronic device as illustrated in FIG. 5. FIG. 13 does not limit the scope of the present disclosure to any particular implementation.

Figure 14:
FIG. 14 illustrates an example ranging reply time deferred IE content field format according to embodiments of the present disclosure.

The ranging reply time deferred IE (RRTD IE) content includes the time difference between the receive time of most recently received RFRAME per source address and the transmit time of the responding RFRAME transmitted, sent most recently before the frame containing this IE. The address field can be a 16-bit short address, a 48-bit MAC address, or a 64-bit extended address. If a single pair of devices participates in the ranging round, there is no need to use the address field. An example RRTD IE content field format is shown in FIG. 14. Other examples are not precluded.

FIG. 14 illustrates an example ranging reply time deferred IE content field format 1400 according to embodiments of the present disclosure. The embodiment of the ranging reply time deferred IE content field format 1400 illustrated in FIG.

14 is for illustration only and may be used in the electronic device as illustrated in FIG. 5. FIG. 14 does not limit the scope of the present disclosure to any particular implementation.

The ranging angle-of-arrival (AoA) deferred (RAD) IE content includes the AoA estimation at the device receiving request of AoA. The RAD IE is employed as part of two-way ranging exchanges and used in the case where the device cannot determine the AoA until after the reply has been sent, and in this case the RAD IE carries the AoA in a subsequent frame. When the RAD IE is used in multicast/broadcast frame (e.g., multicast/broadcast/many-to-many ranging), the RAD IE content can include a MAC address or a device ID of source who requests the AoA estimation. The address field can be a 16-bit short address, a 48-bit MAC address, or a 64-bit extended address. Otherwise, the RAD IE has a zero-length content field. The content field of the RAD IE can be formatted as shown in FIG. 15.

Figure 15:
FIG. 15 illustrates an example ranging angle-of-arrival deferred IE content field format according to embodiments of the present disclosure.

FIG. 15 illustrates an example ranging angle-of-arrival deferred IE content field format 1500 according to embodiments of the present disclosure. The embodiment of the ranging angle-of-arrival deferred IE content field format 1500 illustrated in FIG. 15 is for illustration only and may be used in the electronic device as illustrated in FIG. 5. FIG. 15 does not limit the scope of the present disclosure to any particular implementation.

Figure 16:
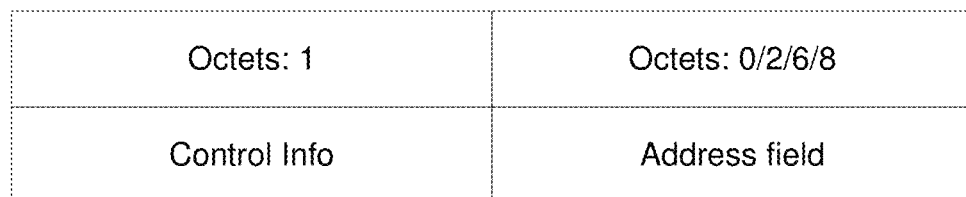
FIG. 16 illustrates an example ranging control single-sided TWR IE content field format according to embodiments of the present disclosure.

The ranging report control single-sided TWR (RRCST) IE is used to control SS-TWR message exchange. An example RCST IE content field format is shown in FIG. 16 and TABLE 1. Other examples are not precluded.

FIG. 16 illustrates an example ranging control single-sided TWR IE content field format 1600 according to embodiments of the present disclosure. The embodiment of the ranging control single-sided TWR IE content field format 1600 illustrated in FIG. 16 is for illustration only and may be used in the electronic device as illustrated in FIG. 5. FIG. 16 does not limit the scope of the present disclosure to any particular implementation.

TABLE 1

Values of the control info field in the ranging report control single-sided TWR IE

| Control Info value | Meaning |
|---|---|
| 0 | This frame indicates that the responding end does not require TX-to-RX round-trip time and ranging result |
| 1 | This frame indicates that the responding end requires TX-to-RX round-trip time at the end of exchange |
| 2 | This frame indicates that the responding end requires ranging result at the end of exchange |

Figure 17:
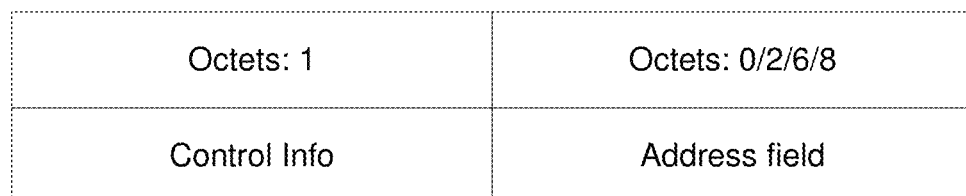
FIG. 17 illustrates an example ranging control double-sided TWR IE content field format according to embodiments of the present disclosure.

The ranging report control double-sided TWR (RRCDT) IE is used to control DS-TWR message exchange. An example RCDT IE content field format is shown in FIG. 17 and TABLE 2. Other examples are not precluded.

FIG. 17 illustrates an example ranging control double-sided TWR IE content field format 1700 according to embodiments of the present disclosure. The embodiment of the ranging control double-sided TWR IE content field format 1700 illustrated in FIG. 17 is for illustration only and may be used in the electronic device as illustrated in FIG. 5. FIG. 17 does not limit the scope of the present disclosure to any particular implementation.

TABLE 2

Values of the Control Info field in the Ranging Report Control Double-sided TWR IE

| Control Info value | Meaning |
|---|---|
| 0 | This frame is initiating DS-TWR and indicates that the initiating end does not require $1^{st}$ reply time, $2^{nd}$ TX-to-RX round-trip time or the ranging result |
| 1 | This frame is initiating DS-TWR and indicates that initiating end requires $1^{st}$ reply time and $2^{nd}$ TX-to-RX round-trip time at the end of exchange |
| 2 | This frame is initiating DS-TWR and indicates that initiating end requires ranging result at the end of exchange |
| 3 | This frame is continuing the DS-TWR, forming the request for the $2^{nd}$ TX-to-RX round-trip measurement |

Figure 18:
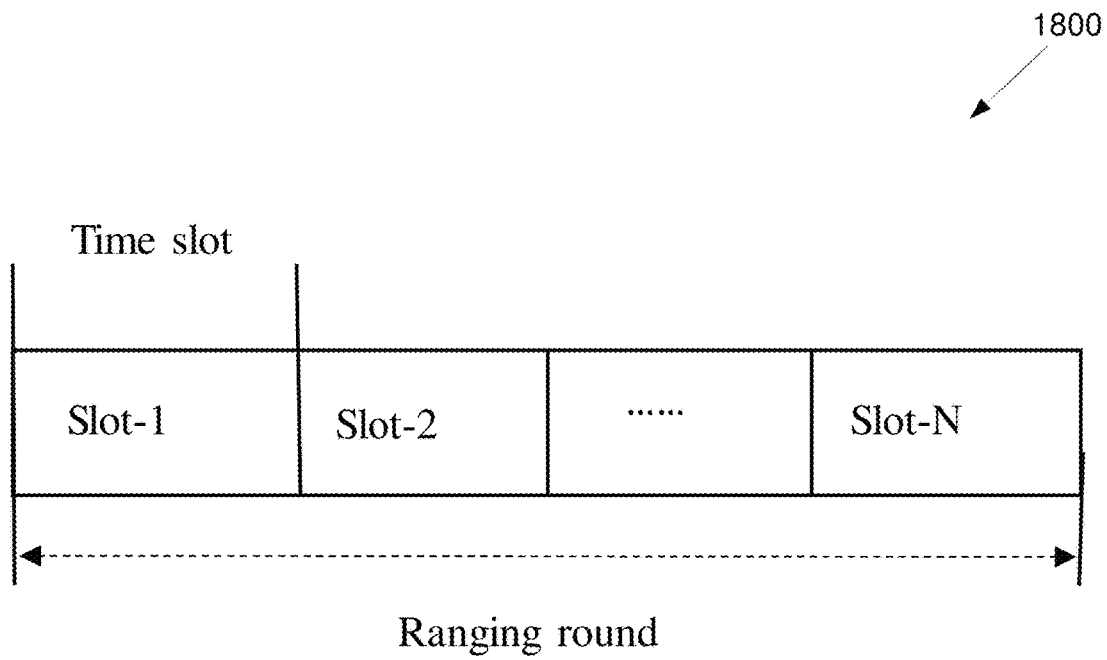
FIG. 18 illustrates an example time structure of ranging round according to embodiments of the present disclosure.

FIG. 18 illustrates an example time structure of ranging round 1800 according to embodiments of the present disclosure. The embodiment of the time structure of ranging round 1800 illustrated in FIG. 18 is for illustration only. FIG. 18 does not limit the scope of the present disclosure to any particular implementation.

Figure 34:
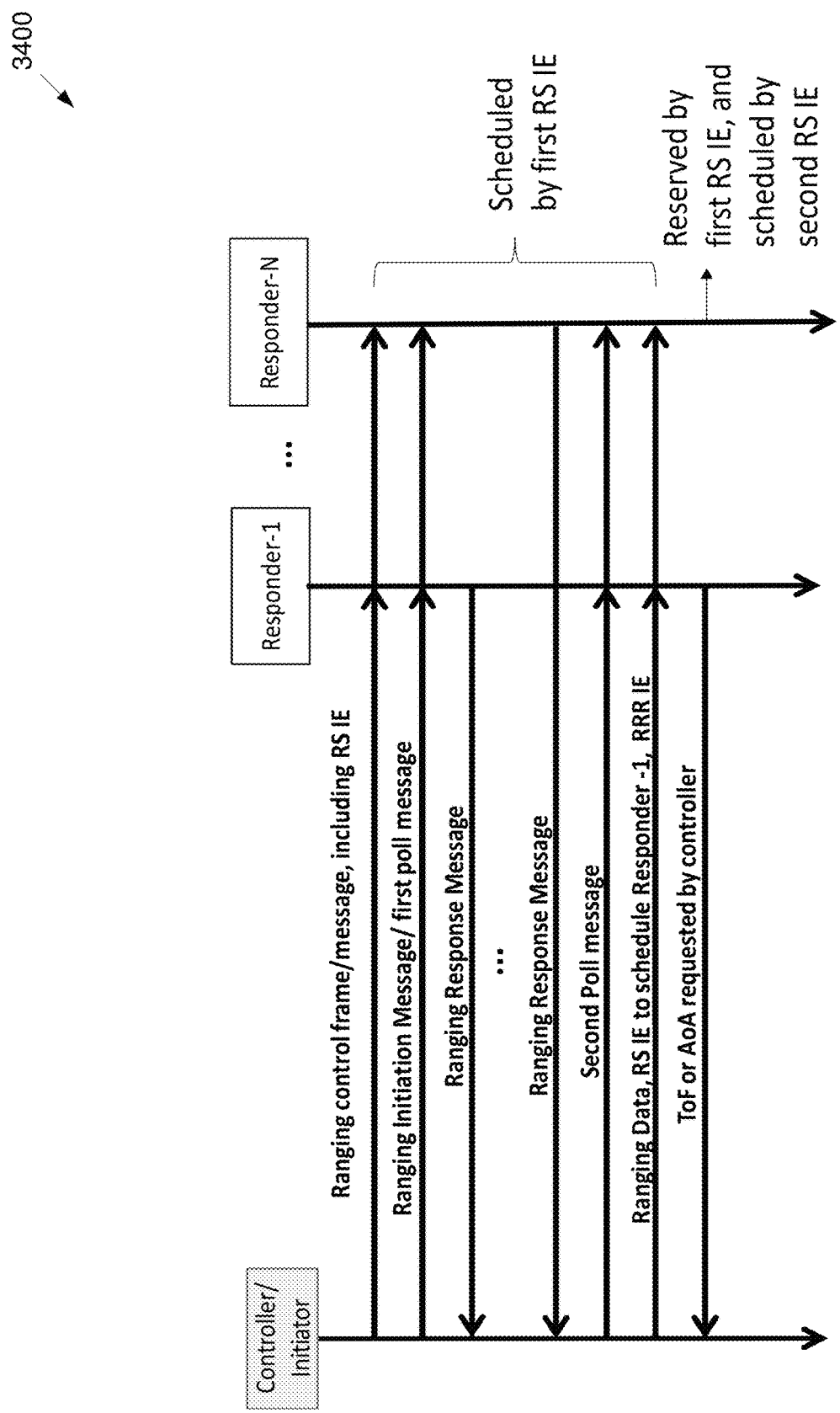
FIG. 34 illustrates an example message sequence chart of multicast ranging where ranging controller is an initiator and a requestor according to embodiments of the present disclosure.

In one embodiment, an electronic device 501 (e.g., 101-103 and 111-116 as illustrated in FIG. 1) as illustrated in FIG. 5 may use the ranging round 1800 as illustrated in FIG. 18. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

A ranging configuration incorporates the control information of a ranging round, which consists of multiple time slots as FIG. 18. Time slot is the basic time unit to fulfill a message exchange. Other conventions to fulfill the same functionalities as ranging round and time slot are not precluded in this disclosure. Depending on the device capabilities, slot duration and number of time slots in a ranging round can be adjusted in the ranging configuration, or the slot duration and the number of time slots are fixed to a default setting. One or multiple pairs of devices can participate in a ranging round to fulfill the ranging requests.

Figure 19:
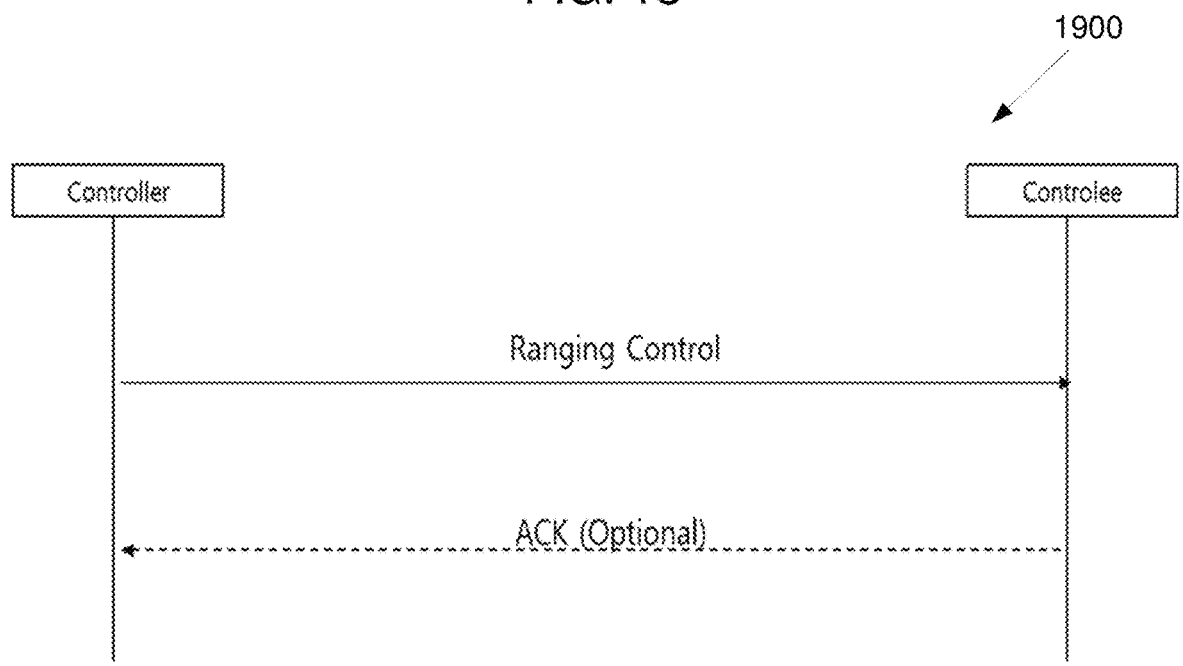
FIG. 19 illustrates an example ranging device nomenclatures: controller and controlee according to embodiments of the present disclosure.

FIG. 19 illustrates an example ranging device nomenclatures 1900: controller and controlee according to embodiments of the present disclosure. The embodiment of the ranging device nomenclatures 1900 illustrated in FIG. 19 is for illustration only. FIG. 19 does not limit the scope of the present disclosure to any particular implementation.

In one embodiment, an electronic device 501 (e.g., 101-103 and 111-116 as illustrated in FIG. 1) as illustrated in FIG. 5 may use the ranging device nomenclatures 1900 as illustrated in FIG. 19. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

The setting of a ranging configuration determined by the next higher layer can be sent to one or more ranging controlees from a ranging controller (lead device) as FIG. 19. With different network formations, the ranging configuration can be conveyed via a dedicated data frame sent to one or more devices, or the ranging configuration can be embedded into a sync frame broadcast to all devices in the network. Meanwhile, this disclosure does not preclude other methods to exchange the ranging configuration information, e.g., via the higher layer or our-of-band management.

Figure 20:
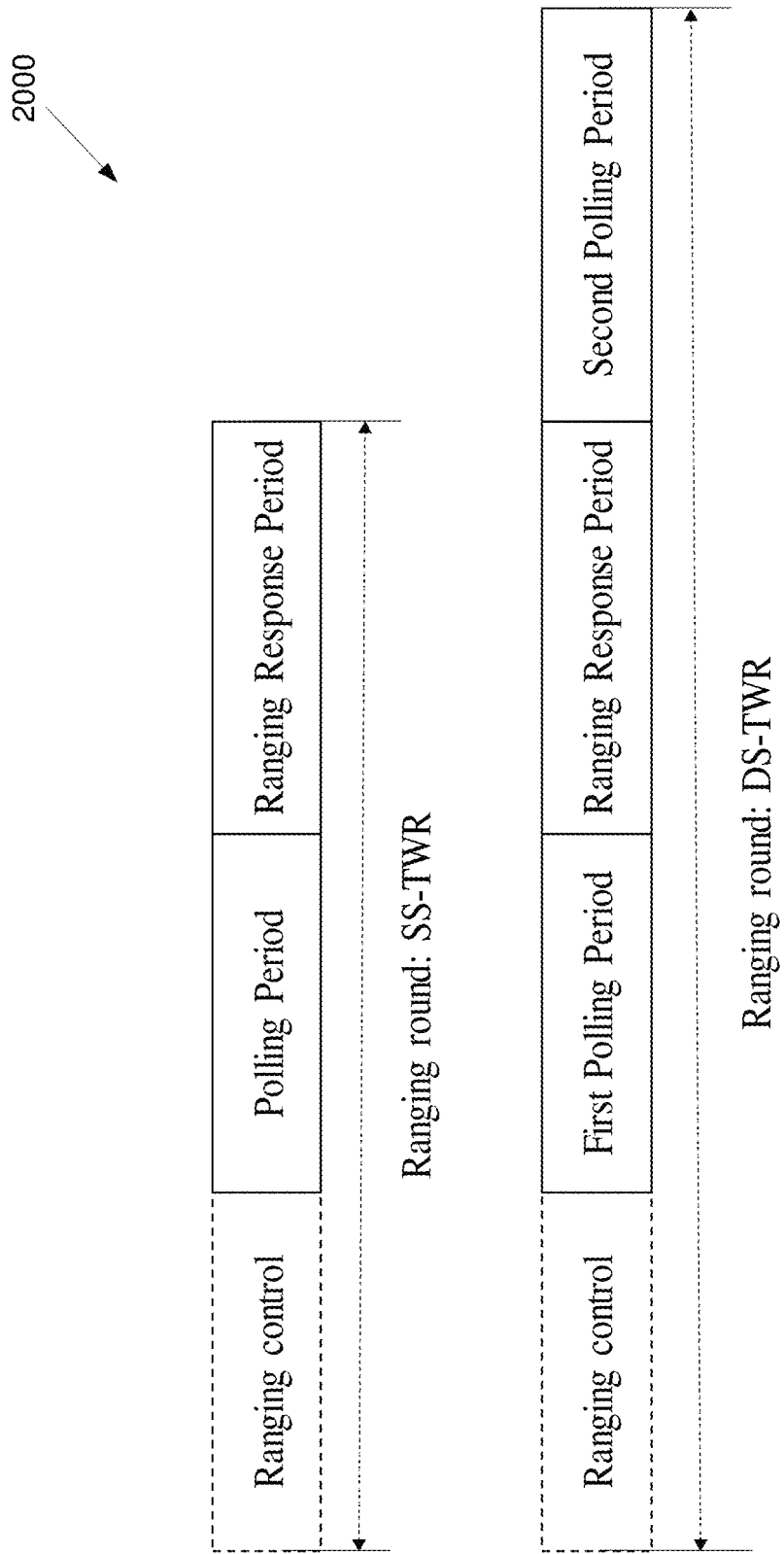
FIG. 20 illustrates an example ranging round structure according to embodiments of the present disclosure.

FIG. 20 illustrates an example ranging round structure 2000 according to embodiments of the present disclosure. The embodiment of the ranging round structure 2000 illustrated in FIG. 20 is for illustration only. FIG. 20 does not limit the scope of the present disclosure to any particular implementation.

In one embodiment, an electronic device 501 (e.g., 101-103 and 111-116 as illustrated in FIG. 1) as illustrated in FIG. 5 may use the ranging round structure 2000 as illustrated in FIG. 20. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

A ranging configuration includes the structure of a ranging round which contains one or more polling periods (PP) and one or more ranging response periods (RRP), where a PP consists of one or more time slots to send polling messages from initiator(s), and an RRP consists one or more time slots to send response messages from responder(s). FIG. 20 respectively illustrates two examples for the SS-TWR and DS-TWR with three message exchanges, other examples are not precluded. A ranging round can start with a ranging control period to exchange the ranging configuration over the UWB MAC. However, a ranging round can also start with a polling period if the ranging configuration is exchanged at the higher layer.

For the SS-TWR, one ranging round contains a PP and a RRP. For the DS-TWR with three messages, one ranging round contains a first PP, an RRP, and a second PP. Each period includes one or more time slots, where transmissions from initiator(s)/responder(s) can be scheduled as determined by the next higher layer or can contend time slots in the corresponding periods, respectively.

Figure 21:
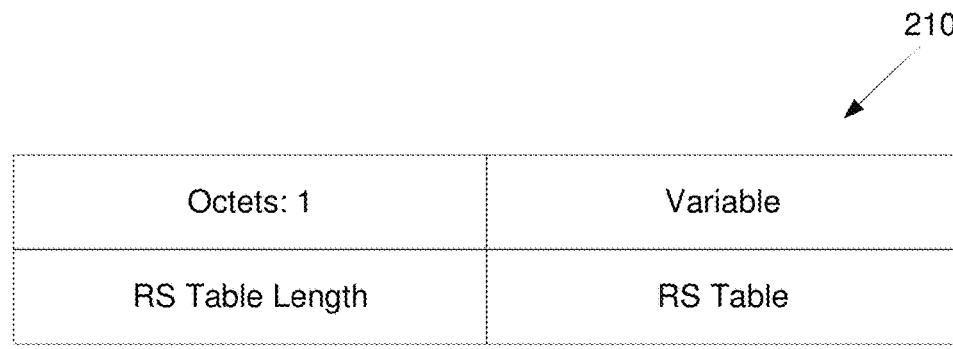
FIG. 21 illustrates an example content fields of ranging scheduling (RS) IE according to embodiments of the present disclosure.

FIG. 21 illustrates an example content fields of ranging scheduling (RS) IE 2100 according to embodiments of the present disclosure. The embodiment of the content fields of ranging scheduling (RS) IE 2100 illustrated in FIG. 21 is for illustration only. FIG. 21 does not limit the scope of the present disclosure to any particular implementation.

In one embodiment, an electronic device 501 (e.g., 101-103 and 111-116 as illustrated in FIG. 1) as illustrated in FIG. 5 may use the content fields of ranging scheduling (RS) IE 2100 as illustrated in FIG. 21. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

Figure 22:
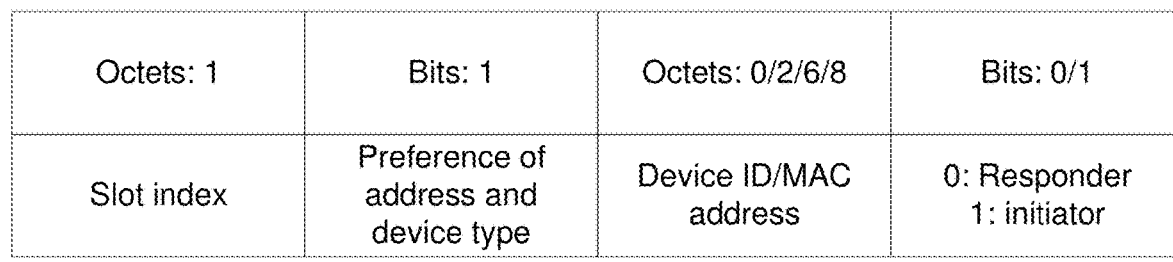
FIG. 22 illustrates an example row of RS table according to embodiments of the present disclosure.

FIG. 22 illustrates an example row of RS table 2200 according to embodiments of the present disclosure. The embodiment of the row of RS table 2200 illustrated in FIG. 22 is for illustration only. FIG. 22 does not limit the scope of the present disclosure to any particular implementation.

In one embodiment, an electronic device 501 (e.g., 101-103 and 111-116 as illustrated in FIG. 1) as illustrated in FIG. 5 may use the row of RS table 2200 as illustrated in FIG. 22. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

For scheduling-based ranging, ranging scheduling (RS) IE can be used to schedule time slots of a ranging round as FIG. 18. An example of content field of RS IE is exhibited in FIG. 21 and FIG. 22.

RS IE contains an RS table, where each row of the table represents a slot in the ranging round. As illustrated in FIG. 22, the first field of a row denotes the time slot index. The second field indicates the presence of following device ID/MAC address and device type. If the value is zero, the slot is reserved but not scheduled yet. If the value is one, the time slot is assigned to the ranging device with MAC address and device type denoted by following fields.

Other structures of content field to fulfill similar function is not precluded by this disclosure.

Figure 23:
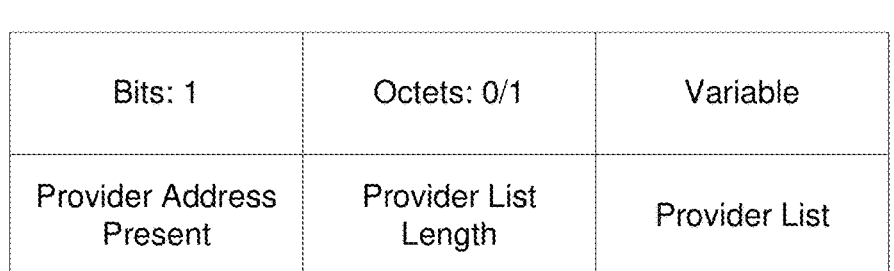
FIG. 23 illustrates an example RTR IE content field according to embodiments of the present disclosure.

FIG. 23 illustrates an example RTR IE content field 2300 according to embodiments of the present disclosure. The embodiment of the RTR IE content field 2300 illustrated in FIG. 23 is for illustration only. FIG. 23 does not limit the scope of the present disclosure to any particular implementation.

In one embodiment, an electronic device 501 (e.g., 101-103 and 111-116 as illustrated in FIG. 1) as illustrated in FIG. 5 may use the RTR IE content field 2300 as illustrated in FIG. 23. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

Figure 24:
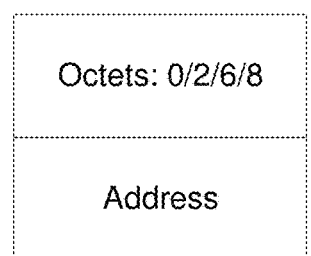
FIG. 24 illustrates an example row of provider list according to embodiments of the present disclosure.

FIG. 24 illustrates an example row of provider list 2400 according to embodiments of the present disclosure. The embodiment of the row of provider list 2400 illustrated in FIG. 24 is for illustration only. FIG. 24 does not limit the scope of the present disclosure to any particular implementation.

In one embodiment, an electronic device 501 (e.g., 101-103 and 111-116 as illustrated in FIG. 1) as illustrated in FIG. 5 may use the row of provider list 2400 as illustrated in FIG. 24. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

Ranging time-of-flight request (RTR) IE can be used by a ranging device to request ranging results, i.e., time-of-flight (ToF), from other ranging devices, which are able to calculate ToF associated with the requestor. An example of content fields of RTR IE is exhibited in FIG. 23 and FIG. 24.

As illustrated in FIG. 23, there can be three fields in the RTR IE. The first field indicate the presence of following fields. For unicast ranging, since request address and provider address can be found in address fields of MAC header. There is no need to use address fields in RTR IE, and the value of provider address present is zero. If a ranging device intends to request ranging results from multiple far ends via a broadcast/multicast message, the ranging device can list the address of desired providers in the RTR IE. The value of provider address present may be one, and the provider list length denotes the number of desired providers. In this disclosure, address types are not precluded as FIG. 24, which can be determined by the device configuration and DstAddrMode of MCPS-DATA.request.

FIG. 25 illustrates an example RAR IE content field 2500 according to embodiments of the present disclosure. The embodiment of the RAR IE content field 2500 illustrated in FIG. 25 is for illustration only. FIG. 25 does not limit the scope of the present disclosure to any particular implementation.

In one embodiment, an electronic device 501 (e.g., 101-103 and 111-116 as illustrated in FIG. 1) as illustrated in FIG. 5 may use the RAR IE content field 2500 as illustrated in FIG. 25. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 26 illustrates an example row of provider list 2600 according to embodiments of the present disclosure. The embodiment of the row of provider list 2600 illustrated in FIG. 26 is for illustration only. FIG. 26 does not limit the scope of the present disclosure to any particular implementation.

In one embodiment, an electronic device 501 (e.g., 101-103 and 111-116 as illustrated in FIG. 1) as illustrated in FIG. 5 may use the row of provider list 2600 as illustrated in FIG. 26. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

A ranging angle-of-arrival request (RAR) IE can be used by a ranging device to request ranging results, i.e., angle-of-arrival (AoA), at other ranging devices, which have antenna array to estimate AoA of requestor. An example of content fields of RAR IE is exhibited in FIG. 25 and FIG. 26.

The first octet of RAR IE contains indicators of present, i.e., provider address present (same as that of FIG. 23), AoA Azimuth present, and AoA elevation present. The latter two indicators denote whether AoA in azimuth, elevation, or both domains are requested. For example, if a value of AoA Azimuth request is one, AoA in azimuth domain from desired providers is requested; otherwise it is not. Bit 3~7 are reserved to maintain a full octet, but the Bit 3~7 can also be removed. Similar to FIG. 23, when the value of provider address present is zero, there is no fields of provider list length and provider list; otherwise provider list length indicates the number of providers, and provider list stacks addresses of desired providers as FIG. 26.

FIG. 27 illustrates another example RAR IE content field 2700 according to embodiments of the present disclosure. The embodiment of the RAR IE content field 2700 illustrated in FIG. 27 is for illustration only. FIG. 27 does not limit the scope of the present disclosure to any particular implementation.

FIG. 28 illustrates another example row of provider list 2800 according to embodiments of the present disclosure. The embodiment of the row of provider list 2800 illustrated in FIG. 28 is for illustration only. FIG. 28 does not limit the scope of the present disclosure to any particular implementation.

In one embodiment, an electronic device 501 (e.g., 101-103 and 111-116 as illustrated in FIG. 1) as illustrated in FIG. 5 may use the row of provider list 2800 as illustrated in FIG. 28. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

In one embodiment, an electronic device 501 (e.g., 101-103 and 111-116 as illustrated in FIG. 1) as illustrated in FIG. 5 may use the RAR IE content field 2700 as illustrated in FIG. 27. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

Other structures of content fields are not precluded by this disclosure. For example, the requestor may request azimuth AoA from a provider, but elevation AoA from another provider. Therefore, RAR IE can be revised as FIG. 27 and FIG. 28.

When value of provider address present is zero for unicast ranging, there is no need to use the provider list length field in FIG. 27, and also address field of a row in the provider list can be removed. When value of provider address present is one, the provider list length denotes the number of providers, and the provider list stores addresses of providers and types of AoA request. In this disclosure, address types are not precluded as FIG. 26 or FIG. 28, which can be determined by the device configuration and DstAddrMode of MCPS-DATA.request.

FIG. 29 illustrates an example RRR IE content field 2900 according to embodiments of the present disclosure. The embodiment of the RRR IE content field 2900 illustrated in FIG. 29 is for illustration only. FIG. 29 does not limit the scope of the present disclosure to any particular implementation.

In one embodiment, an electronic device 501 (e.g., 101-103 and 111-116 as illustrated in FIG. 1) as illustrated in FIG. 5 may use the RRR IE content field 2900 as illustrated in FIG. 29. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 30 illustrates yet another example row of provider list 3000 according to embodiments of the present disclosure. The embodiment of the row of provider list 3000 illustrated in FIG. 30 is for illustration only. FIG. 30 does not limit the scope of the present disclosure to any particular implementation.

In one embodiment, an electronic device 501 (e.g., 101-103 and 111-116 as illustrated in FIG. 1) as illustrated in FIG. 5 may use the row of provider list 3000 as illustrated in FIG. 30. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

A request of AoA and ToF can be realized by a single IE, which can be defined as ranging result request (RRR) IE. An example of content field is exhibited in FIG. 29 and FIG. 30.

FIG. 29 is the same as the FIG. 23 and FIG. 27. For unicast ranging, value of provider address present is zero, and there is no need to use the field of provider list length in FIG. 29 and the address field in FIG. 30. Each row of provider list contains the indicators of requested information, i.e., azimuth AoA, elevation AoA, and ToF. For example, if value ToF request is one, the requestor needs ToF estimation from the provider.

FIG. 31 illustrates another example RRR IE content field 3100 according to embodiments of the present disclosure.

The embodiment of the RRR IE content field 3100 illustrated in FIG. 31 is for illustration only. FIG. 31 does not limit the scope of the present disclosure to any particular implementation.

In one embodiment, an electronic device 501 (e.g., 101-103 and 111-116 as illustrated in FIG. 1) as illustrated in FIG. 5 may use the RRR IE content field 3100 as illustrated in FIG. 31. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 32 illustrates yet another example row of provider list 3200 according to embodiments of the present disclosure. The embodiment of the row of provider list 3200 illustrated in FIG. 32 is for illustration only. FIG. 32 does not limit the scope of the present disclosure to any particular implementation.

In one embodiment, an electronic device 501 (e.g., 101-103 and 111-116 as illustrated in FIG. 1) as illustrated in FIG. 5 may use the row of provider list 3200 as illustrated in FIG. 32. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

If the same kind of requests applies to all providers, content fields of RRR IE exhibited in FIG. 31 and FIG. 32 can be used.

As illustrated in FIG. 31, three bit-fields of the first octet is used to indicate the type of requested information. Bit 4~7 are reserved but can also be removed. For unicast ranging, the value of provider address present is zero, and there is need to use provider list length and provider list in FIG. 31. If the value of provider address present is one, the provider list length denotes the number of providers, and the provider list stacks their addresses.

When a requestor is a ranging controller, both RS IE and RRR (or RTR, RAR) IE can be inserted in a scheduled RFRAME or data frame sent by the controller. RRR IE indicates the requested information from the controller, while RS IE is used to schedule reserved time slots, so that desired providers/controlees can send back the requested information.

When a requestor is a ranging controlee, and a provider is a ranging controller. RRR (or RTR, RAR) IE can be inserted in a scheduled RFRAME or data frame sent by the requestor to the provider/controller. Then, controller can directly use a reserved time slot to transmit requested information to one or more requestors/controlees.

When both requestor and provider are ranging controlees, there can be three steps to fulfill the exchange of ranging results for a stand-alone UWB network: (1) step 1, a requestor(s) broadcasts RRR (or RTR, RAR) IE in the scheduled RFRAME or date frame; (2) step 2, a controller, which knows the requests from different ranging devices after step 1, schedules providers on reserved times slots via RS IE; and (3) step 3, a provider(s), which knows the requests from different requestors after step 1, sends requested information on the scheduled time slot(s).

Figure 33:
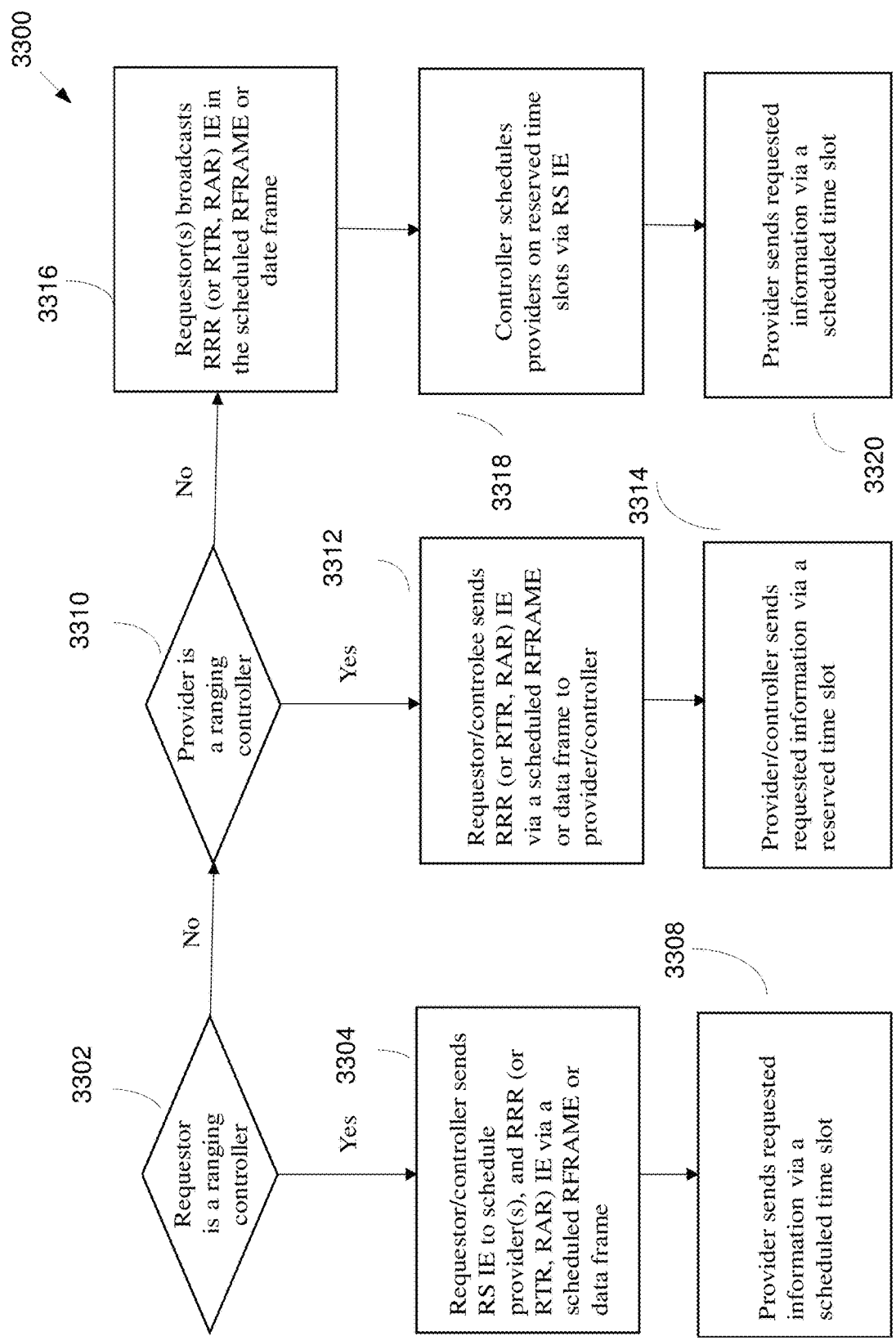
FIG. 33 illustrates a flow chart of a method for scheduling-based ranging according to embodiments of the present disclosure.

FIG. 33 illustrates a flow chart of a method 3300 for scheduling-based ranging according to embodiments of the present disclosure. The embodiment of the method 3300 illustrated in FIG. 33 is for illustration only. FIG. 33 does not limit the scope of the present disclosure to any particular implementation.

In one embodiment, an electronic device 501 (e.g., 101-103 and 111-116 as illustrated in FIG. 1) as illustrated in FIG. 5 may use the method 3300 as illustrated in FIG. 33. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

To summarize the aforementioned schemes, FIG. 33 shows operating procedures for different cases.

For the contention-based ranging, since there is no need to schedule time slots by the ranging controller. A requestor, as a ranging controller or ranging controlee, can contend for time slots to send ranging result request, i.e., RRR, RTR, or RAR IE.

As illustrated in FIG. 33, the method 3300 begins at step 3302. In step 3302, the method 3300 determines whether a requestor is a ranging controller. In step 3302, if the method 3300 determines that the requestor is the ranging controller, the requestor/controller in step 3304 sends RS IE to schedule provider(s), and RRR (or RTR, RAR) IE via a scheduled RFRAME or data frame. In step 3308, the provider sends requested information via a schedule time slot. In step 3302, if the method determines that the requestor is not the ranging controller, the method 3300 in step 3310 determines if the provider is a ranging controller. In step 3310, the method 3300 determines the provider is the ranging controller, the requestor/controlee sends in step 3312 RRR (or RTR, RAR) IE via a schedule RFRAME or data frame to the provided/controller. In step 3314, the provider/controller sends requested information via a reserved time slot. In step 3310, if the method determines the provider is not the ranging controller, the requestor(s) broadcasts RRR (or RTR, RAR) IE in the scheduled RFRAME or data frame. In step 3318, the controller schedules the providers on reserved time slot via RS IE. In step 3320, the provider sends requested information via a scheduled time slot.

FIG. 34 illustrates an example message sequence chart 3400 of multicast ranging where ranging controller is an initiator and a requestor according to embodiments of the present disclosure. The embodiment of the message sequence chart 3400 illustrated in FIG. 34 is for illustration only. FIG. 34 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 3400 as illustrated in FIG. 34. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 34 illustrate an example of message sequence chart (MSC) with multicast ranging where ranging controller is an initiator and also a requestor. The first RS IE in the ranging control message/frame is used to configure the ranging round. The last time slot of the ranging round is reserved by the ranging controller, and later scheduled to the responder-1 via the second RS IE. Therefore, A responder-1 can use the last time slot of the ranging round to send the ranging results to requestor/controller. There can be various examples of MSC for different use cases, which are not precluded by this disclosure.

Different IEs are defined to fulfill the requests of timestamp-related information in IEEE standard specification. For example, a ranging request reply time (RRRT) IE can be used to request a ranging reply time from the device which receives this IE. A ranging report control double-sided TWR (RRCDT) IE and a ranging report control single-sided TWR (RRCST) IE can be used to request the exchange of reply time and/or round-trip measurement for DS-TWR and SS-TWR, respectively. However, a revised ranging result request (RRR) IE in this embodiment can fulfill functionalities of these IEs for requests of timestamp-related information and AOA. Other appropriate terms of this IE are not precluded by this disclosure.

FIG. 35 illustrates an example RRR IE content field format 3500 according to embodiments of the present disclosure. The embodiment of the RRR IE content field format 3500 illustrated in FIG. 35 is for illustration only. FIG. 35 does not limit the scope of the present disclosure to any particular implementation.

In one embodiment, an electronic device 501 (e.g., 101-103 and 111-116 as illustrated in FIG. 1) as illustrated in FIG. 5 may use the RRR IE content field format 3500 as illustrated in FIG. 35. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 35 illustrates the revised RRR IE content field format. The first bit-field, namely provider address present (PAP), is used to indicate the presence of address field in each row/element of provider list. If the value is one, the address field in FIG. 36 is present, otherwise it is not. The field of provider list length (PLL) denotes the number of rows/elements in the provider list, which equals the number of providers.

For the unicast ranging between one ranging initiator and one ranging responder, the provider address can be specified by the destination address field of MHR. Therefore, the field of PAP can be set to zero, and the address field in FIG. 36 is not present.

For the multi-node ranging, a ranging device can broadcast an appropriate RFRAME or data message with RRR IE as shown in FIG. 35 to multiple providers. If rows/elements of RRR IE are stacked in a predefined fixed order to list requests upon different providers, the address field may not be present as long as this predefined order has been exchanged between ranging devices. Therefore, under this situation, the PAP field in FIG. 35 can be set to zero.

FIG. 36 illustrates an example row/element of provider list 3600 according to embodiments of the present disclosure. The embodiment of the row/element of provider list 3600 illustrated in FIG. 36 is for illustration only. FIG. 36 does not limit the scope of the present disclosure to any particular implementation.

In one embodiment, an electronic device 501 (e.g., 101-103 and 111-116 as illustrated in FIG. 1) as illustrated in FIG. 5 may use the row/element of provider list 3600 as illustrated in FIG. 36. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

Note that one of reserved bit-fields in FIG. 36 can be used to denote the address present. Therefore, the provider address present in FIG. 35 can be removed, and the size of provider list length becomes one octet.

The first bit-field of each row/element of provider list is the address type (AT). If the value is one, 2-octet short address is used in the address field, otherwise 8-octet extended address is used in the address field, or vice versa. The AT field provides the flexibility to exchange requests in an UWB network with mixed address types. More bits can be used in AT field to distinguish more address types, which is not precluded by this disclosure. If ranging devices of a network have the same address type, i.e., 2-octet or 8-octet address, A providers' address type can be specified by DstAddrMode of MCPS-DATA.request, and the address type field in FIG. 36 can be removed. Therefore, FIG. 36 is reduced to FIG. 37.

FIG. 37 illustrates another example row/element of provider list 3700 according to embodiments of the present disclosure. The embodiment of the row/element of provider list 3700 illustrated in FIG. 37 is for illustration only. FIG. 37 does not limit the scope of the present disclosure to any particular implementation.

In one embodiment, an electronic device 501 (e.g., 101-103 and 111-116 as illustrated in FIG. 1) as illustrated in FIG. 5 may use the row/element of provider list 3700 as illustrated in FIG. 37. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

In FIG. 36 and FIG. 37, a reply time request (RTR) field denotes whether the reply time of provider sending response to the message with RRR IE is requested: if an RTR value is one, the reply time is requested, otherwise it is not.

A round-trip measurement request (RMR) field indicates whether the round-trip measurement of provider upon receiving message with RRR IE is requested: if an RMR value is one, the round-trip measurement is requested, otherwise it is not.

Following bit-fields for ToF request (TOFR), AoA Azimuth request (AAR), and AoA elevation request (AER) denote whether time-of-flight (ToF), azimuth AoA, elevation AoA are requested or not: if a bit-field of request has value one, the corresponding information is requested, otherwise it is not.

The revised RRR IE with a content field format illustrated in FIG. 35 and FIG. 36 (or FIG. 37) can be used to fulfill the functionalities of RRRT, RRCST, RRCDT, and RRA IE in the IEEE 802.15.4z, which are used to request certain information.

Different IEs are defined to fulfill the reports of timestamp-related information and AOA in IEEE standard specification. For example, a ranging reply time instantaneous (RRTI) IE can be used to convey the reply time of the ranging response message, while a ranging round trip measurement (RRTM) IE can be used to convey a round trip time measurement. In this embodiment, a newly defined IE, namely a ranging report (RR) IE, can be used to fulfill exchange of time-related information and AOA. Other appropriate terms of this IE are not precluded by this disclosure. An example of a content field format is illustrated in FIG. 38 and FIG. 39.

FIG. 38 illustrates an example RR IE content field format 3800 according to embodiments of the present disclosure. The embodiment of the RR IE content field format 3800 illustrated in FIG. 38 is for illustration only. FIG. 38 does not limit the scope of the present disclosure to any particular implementation.

In one embodiment, an electronic device 501 (e.g., 101-103 and 111-116 as illustrated in FIG. 1) as illustrated in FIG. 5 may use the RR IE content field format 3800 as illustrated in FIG. 38. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 39 illustrates an example row/element of RR table 3900 according to embodiments of the present disclosure. The embodiment of the row/element of RR table 3900 illustrated in FIG. 39 is for illustration only. FIG. 39 does not limit the scope of the present disclosure to any particular implementation.

In one embodiment, an electronic device 501 (e.g., 101-103 and 111-116 as illustrated in FIG. 1) as illustrated in FIG. 5 may use the row/element of RR table 3900 as illustrated in FIG. 39. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

As shown in FIG. 38, RR IE content field format is similar to that of RRR IE as illustrated in FIG. 35. The first bit field is to indicate the presence of address field in each element of the ranging report (RR) table: if the value is one, the address field is present, otherwise it is not. The field of RR table length denotes the number of rows/elements in the RR table, which equals the number of ranging devices requesting certain information.

For the unicast ranging between one ranging initiator and one ranging responder, the address of requestor can be specified by the destination address field of MHR. Therefore, the field of AP can be set to zero, and the address field in FIG. 39 is not present.

For the multi-node ranging, a ranging device can broadcast an appropriate RFRAME or data message with RR IE as shown in FIG. 35. to multiple destinations. If rows/elements of RR IE are stacked in a predefined fixed order to list ranging result reports for different destinations, the address field may not be present as long as this predefined order has been exchanged between ranging devices. Therefore, under this situation, the AP field in FIG. 38 can be set to zero.

Note that one of reserved bit-fields in FIG. 39 can also be used to denote the address present. Therefore, the address present in FIG. 38 can be removed, and the size of RR table length becomes one octet.

The first bit-field of each row/element of RR table is the address type (AT). If the value is one, 2-octet short address is used in the address field, otherwise 8-octet extended address is used in the address field, or vice versa. The AT field provides the flexibility to exchange requests in an UWB network with mixed address types. More bits can be used in AT field to distinguish more address types, which is not precluded by this disclosure. If ranging devices of a network have the same address type, i.e., 2-octet or 8-octet address, address type can then be specified by DstAddrMode of MCPS-DATA.request, and the address type field in FIG. 39 can be removed. Therefore, FIG. 39 is reduced to FIG. 40.

FIG. 40 illustrates another example row/element of RR table 4000 according to embodiments of the present disclosure. The embodiment of the row/element of RR table 4000 illustrated in FIG. 40 is for illustration only. FIG. 40 does not limit the scope of the present disclosure to any particular implementation.

In one embodiment, an electronic device 501 (e.g., 101-103 and 111-116 as illustrated in FIG. 1) as illustrated in FIG. 5 may use the row/element of RR table 4000 as illustrated in FIG. 40. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

Fields of reply time present (RTP), round-trip measurement present (RMP), ToF present (TOFP), AoA Azimuth present (AAP), AoA elevation present are indicators to respectively denote the presence of following fields, including RX-to-TX-Reply-Time, TX-to-RX round-trip time, time-of-flight (ToF), AOA Azimuth, and AOA elevation. If the value of indicator is one, the corresponding field to report certain information is present, otherwise it is not.

The field of deferred mode is an indicator to denote whether a separate data frame after ranging transmissions is used to convey the ranging report: if the value is one, the deferred mode is enabled, and an RR IE is inserted in a separate data message to report timestamp-related information and/or AOA of the recent completed ranging cycle, otherwise this ranging report IE is embedded in an RFRAME within the ranging cycle to report certain information.

For example, if a PPDU format of RFRAME is SP3 as specified in IEEE standard specification, a ranging report cannot be conveyed via the RFRAME, since there is no MAC header or payload in SP3 frame. Therefore, an RR IE may be inserted in a data message after the ranging cycle, and the field of deferred mode is set to be one to indicate that the deferred mode is enabled.

Another example to enable the deferred mode is to send the requested ranging reply time and/or round-trip time after a ranging cycle, since a ranging device may not be capable of calculating the reply/round-trip time in time and embed ranging report in the RFRAME. Consequently, a separate data message after the ranging cycle may be used to exchange ranging report IE with the deferred mode field value 1.

Similar to the definition in the spec of IEEE standard specification, the RX-to-TX-reply-time field is the time difference between the receive time of most recently received RFRAME with RRR IE as shown in FIG. 35 and FIG. 36 (or FIG. 37), or an RRRT IE from a particular source and the transmit time of the response RFRAME. The reference for these time values is the RMARKER. The time unit is specified as a ranging counter time unit in IEEE standard specification.

Similar to the definition in the spec of IEEE 802.15.4z, the TX-to-RX Round-trip time field is the time difference between the transmit time of the RFRAME initiating a round trip measurement and the receive time of the response RFRAME that completes a round-trip measurement. The time unit is the same as that of RX-to-TX-Reply-Time field, i.e., a ranging counter time unit.

Fields of TOF, AOA Azimuth, and AOA elevation are following the same definitions as those in the IEEE 802.15.4z, which are not repeated here.

The RR IE with content field format illustrated in FIG. 38 and FIG. 39 (or FIG. 40) can be used to fulfill the functionalities of RRTI, RRTD, RRTM, RAR, and RTOF IE in the IEEE 802.15.4z, which are used to report certain information. Note that sizes of fields to report certain information are illustrated as examples in the FIG. 40. Depending on the use cases and implementations, other field sizes are not precluded by this disclosure.

In one embodiment, two examples of message sequence charts (MSCs) based on RRR, and RR IE are illustrated for SS-TWR and DS-TWR with one-to-many ranging. Various different MSCs can be fulfilled to accommodate different ranging requests/reports, which are not precluded by this disclosure.

Figure 41:
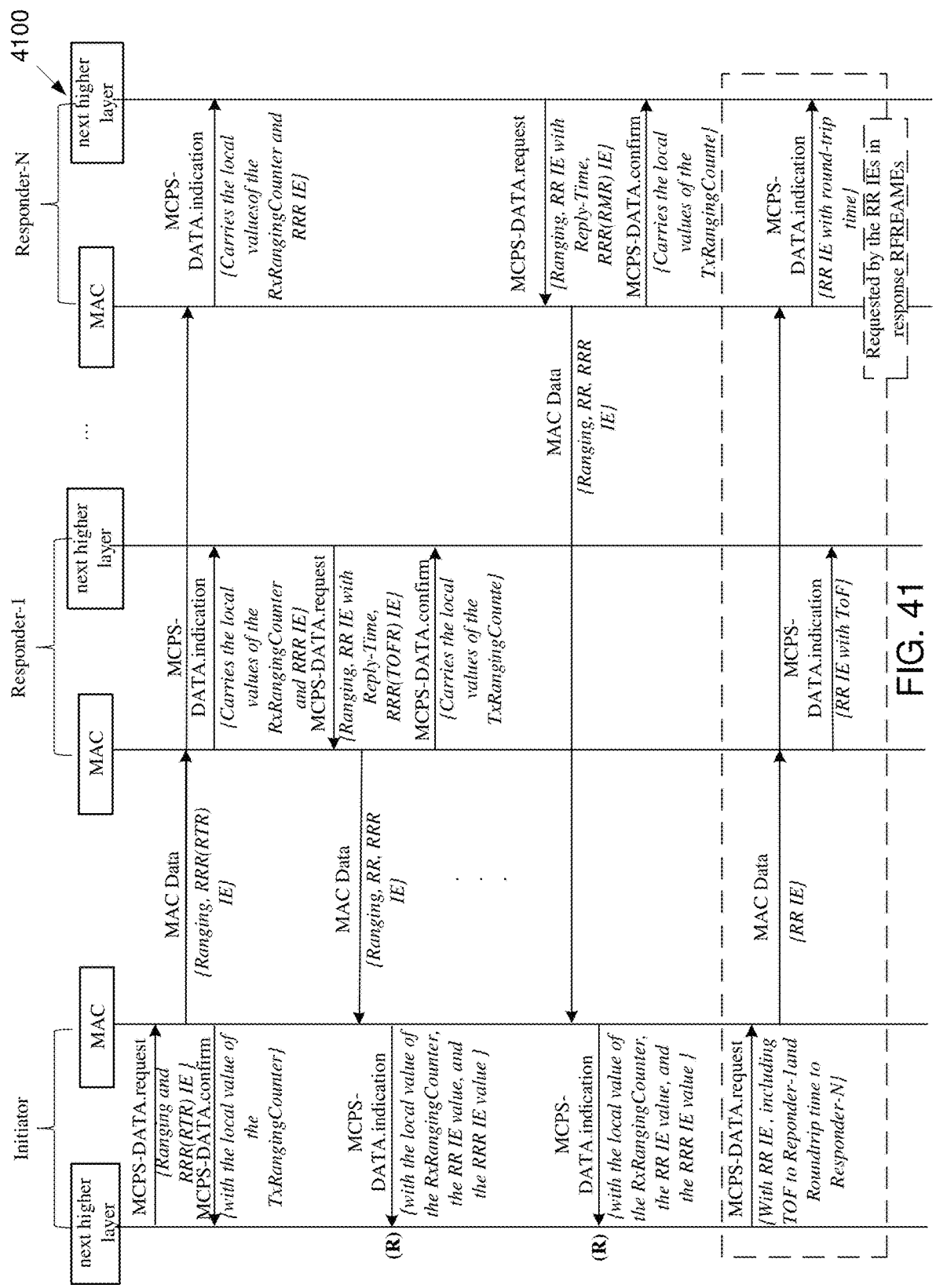
FIG. 41 illustrates an example message sequence chart for one-to-many SS-TWR with RRR and RR IE according to embodiments of the present disclosure.

FIG. 41 illustrates an example message sequence chart 4100 for one-to-many SS-TWR with RRR and RR IE according to embodiments of the present disclosure. The embodiment of the message sequence chart 4100 illustrated in FIG. 41 is for illustration only. FIG. 41 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 4100 as illustrated in FIG. 41. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

In FIG. 41, a ranging initiator initialize the ranging transmission via MCPS-DATA.request with enabled parameter Ranging, and an RRR IE to request reply time from responders. After the first ranging transmission, MCPS-DATA.confirm reports a transmit time in the unit of ranging counter time unit to the higher layer.

Upon reception of the ranging initiation message, a higher layer of responder can form the ranging report (RR) IE with the reply time and conveys the RR IE to a MAC layer. Meanwhile, different responders may request different types of ranging results, which are reflected by RRR IE in the ranging response message. For example, as shown in FIG. 41, a responder-1 directly requests the time-of-flight (ToF) by RRR IE, which is indicated by RRR(TOFR) IE in FIG. 41. A responder-N requests the round-trip time from the ranging initiator, which is indicated by RRR(RMR) IE. After transmission of ranging response message, a MAC layer of responder reports a transmit time in the unit of ranging counter time unit.

With the requested reply time in the response message, a higher layer of ranging initiator is capable of estimating the time-of-flight (ToF), which achieves the final ranging result. The point labeled by (R) in FIG. 41 is used to mark the time when ToF can be estimated.

After transmissions of one ranging cycle, including the ranging initiation message and ranging response message, the higher layer of ranging initiator forms the RR IE, which includes the ranging reports to different responders. For ranging report to a responder-1, the corresponding row/element of RR table with TOFP field being one contains the ToF field as shown in FIG. 39 (or FIG. 40). For ranging report to a responder-N, the corresponding row/element of RR table with RMP field being one contains the round-trip time field. Upon reception of ranging report, MCPS-DATA.indication reports the requested certain information to the high layer of responder.

Figure 42:
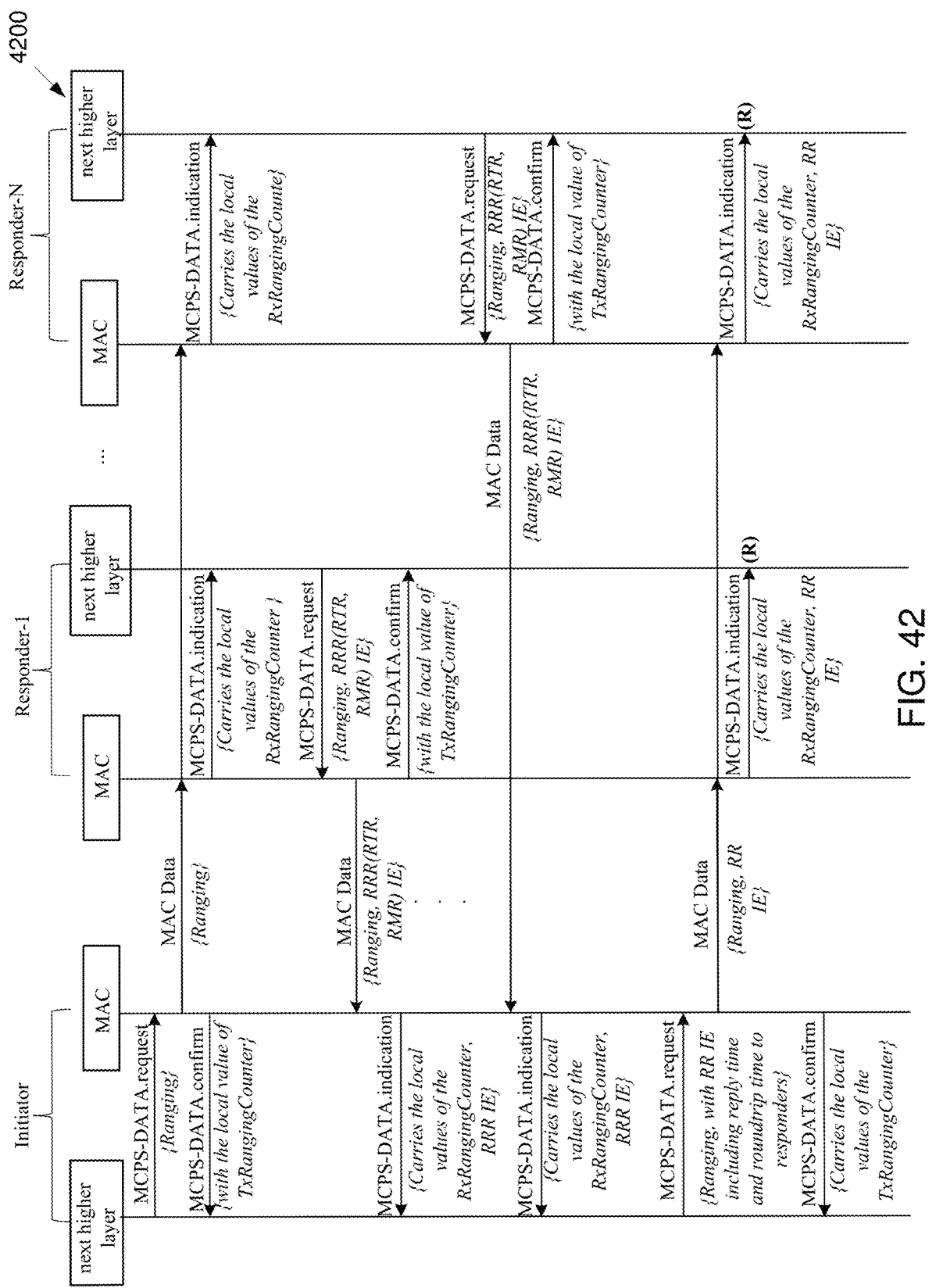
FIG. 42 illustrates an example message sequence chart for one-to-many DS-TWR with RRR and RR IE according to embodiments of the present disclosure.

FIG. 42 illustrates an example message sequence chart 4200 for one-to-many DS-TWR with RRR and RR IE according to embodiments of the present disclosure. The embodiment of the message sequence chart 4200 illustrated in FIG. 42 is for illustration only. FIG. 42 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 4200 as illustrated in FIG. 42. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 42 illustrates an example of message sequence chart for one-to-many DS-TWR. Compared with SS-TWR, FIG. 42 utilizes additional ranging transmission from the initiator to fulfill the second round-trip measurement. In the ranging response message, a high layer of responder conveys the RRR IE to request the round-trip time of the first round-trip measurement, and the reply time of the second ranging transmission from the initiator, which is indicated by an RRR (RTR, RMR) IE.

Figure 43:
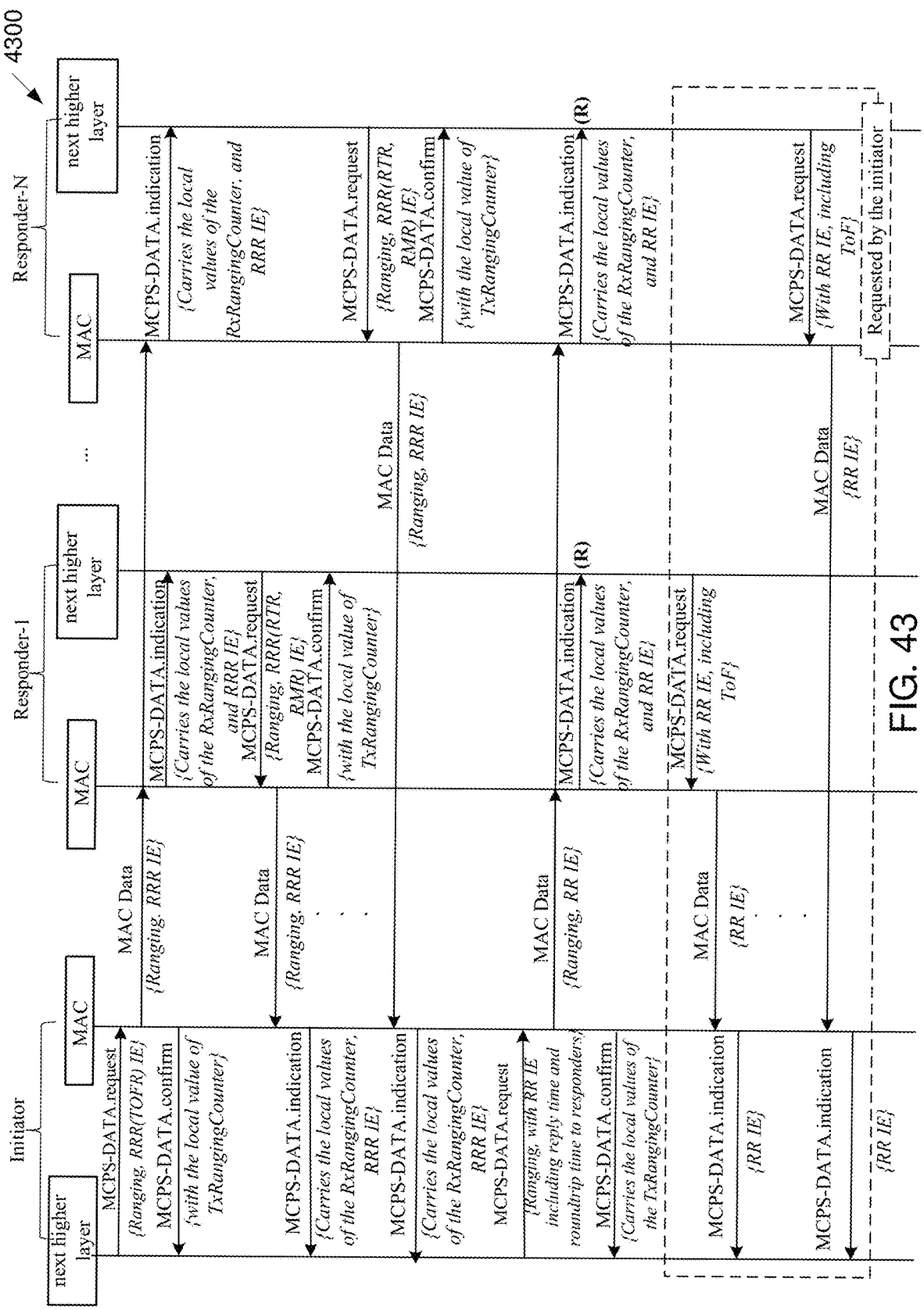
FIG. 43 illustrates an example message sequence chart for one-to-many DS-TWR with RRR and RR IE where initiator request ToF according to embodiments of the present disclosure.

FIG. 43 illustrates an example message sequence chart 4300 for one-to-many DS-TWR with RRR and RR IE where initiator request ToF according to embodiments of the present disclosure. The embodiment of the message sequence chart 4300 illustrated in FIG. 43 is for illustration only. FIG. 43 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 4300 as illustrated in FIG. 43. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

Figure 44:
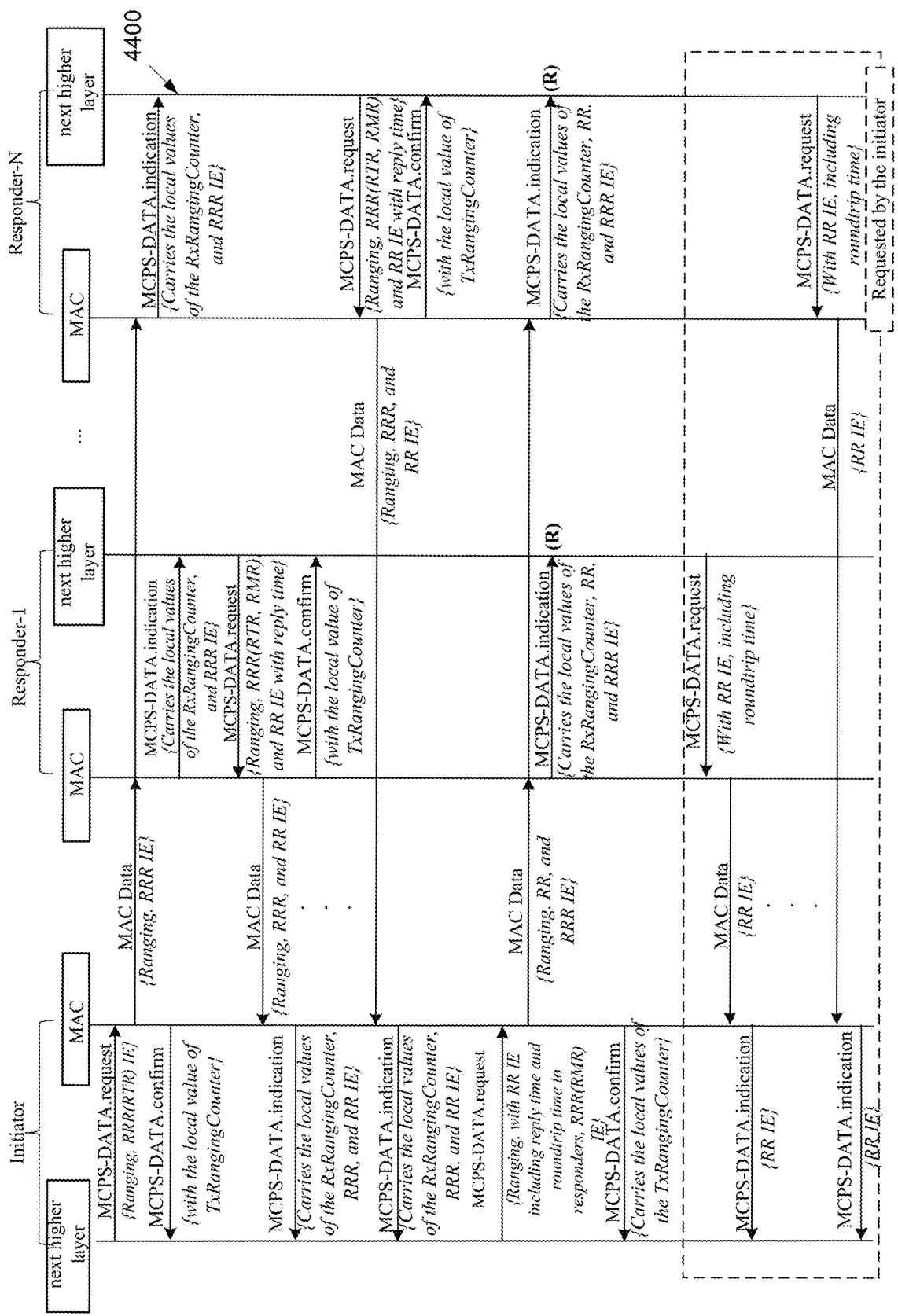
FIG. 44 illustrates an example message sequence chart for one-to-many DS-TWR with RRR and RR IE where initiator requests reply time and round-trip time according to embodiments of the present disclosure.

FIG. 44 illustrates an example message sequence chart 4400 for one-to-many DS-TWR with RRR and RR IE where initiator requests reply time and round-trip time according to embodiments of the present disclosure. The embodiment of the message sequence chart 4400 illustrated in FIG. 44 is for illustration only. FIG. 44 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 4400 as illustrated in FIG. 44. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

Upon reception of requests in the ranging response message, a higher layer of ranging initiator form the ranging report (RR) IE, including the round-trip time of the first round-trip measurement and the reply time of second ranging transmission to different responders. After receiving this information along with the local receiving time, a ranging responder is capable of estimating the time-of-flight (ToF), which is labeled by (R) in FIG. 42. There is no additional message of reporting the ranging result back to the initiator in FIG. 42, since the message of reporting is not requested.

FIG. 43 and FIG. 44 illustrate another two MSC examples of one-to-many DS-TWR, which include requests of ranging results from initiator.

In FIG. 43, a ranging initiator embeds the RRR IE with a TOFR field value being 1 to request the ToF from the responders, which is denoted by RRR(TOFR) IE in the ranging initiation message. The same request can also be inserted in the second ranging transmission from the ranging initiator, which is not precluded by this disclosure. After the completion of full ranging cycle for DS-TWR, ranging responders send back the ranging result, i.e., ToF, via RR IE, which is illustrated by the dashed box in FIG. 43.

In FIG. 44, instead of requesting ToF, a ranging initiator may also request the reply time of response RFRAME, and the round-trip time of the second round-trip measurement, based on which the ranging initiator is capable of estimating ToF.

In the ranging initiation message, a ranging initiator request the reply time of response RFRAME from a ranging responder via RRR IE, which is denoted by RRR(RTR) IE. In the response RFRAME, the ranging responder not only send requests for reply time of the second initiator's RFRAME and round-trip time of the first round-trip measurement, but also a reply time to the initiator, which are denoted by RRR(RTR, RMR) and RR IE with reply time, respectively. The second RFRAME of ranging initiator contains both ranging reports of requested information, and request of round-trip time, which are exchanged via RR IE and RRR IE, respectively.

Upon reception of initiator's request in a second RFRAME, a ranging responder uses a separate data message to convey the round-trip time of the second round-trip measurement. Consequently, an initiator is also capable of estimating the overall ToF.

An RRR IE, in the aforementioned embodiment, to control ranging request and RR IE to control a ranging report can be merged into a single IE, namely ranging request and report control (RRRC) IE. An example of a content field format is illustrated in FIG. 45 and FIG. 46.

FIG. 45 illustrates an example RRRC IE content field format 4500 according to embodiments of the present disclosure. The embodiment of the RRRC IE content field format 4500 illustrated in FIG. 45 is for illustration only. FIG. 45 does not limit the scope of the present disclosure to any particular implementation.

In one embodiment, an electronic device 501 (e.g., 101-103 and 111-116 as illustrated in FIG. 1) as illustrated in FIG. 5 may use the RRRC IE content field format 4500 as illustrated in FIG. 45. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 46 illustrates an example row/element of RRRC table 4600 according to embodiments of the present disclosure. The embodiment of the row/element of RRRC table 4600 illustrated in FIG. 46 is for illustration only. FIG. 46 does not limit the scope of the present disclosure to any particular implementation.

In one embodiment, an electronic device 501 (e.g., 101-103 and 111-116 as illustrated in FIG. 1) as illustrated in FIG. 5 may use the row/element of RRRC table 4600 as illustrated in FIG. 46. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

The content field format illustrated by FIG. 45 is similar to that of FIG. 35 and FIG. 38. The first bit-field is used to indicate the presence of address field in each row/element of RRRC table: if the value is one, the address field is present, otherwise it is not. The field of RRRC table length denotes the number of rows/elements in the RRRC table, which equals the number of ranging requests and ranging reports a ranging device may send to one or more destinations.

The first bit-field of each row/element of RRRC table is the address type (AT). If the value is one, 2-octet short address is used in the address field, otherwise 8-octet extended address is used in the address field, or vice versa. The AT field provides the flexibility to exchange requests in an UWB network with mixed address types. More bits can be used in AT field to distinguish more address types, which is not precluded by this disclosure. If ranging devices of a network have the same address type, i.e., 2-octet or 8-octet address, address type can be specified by DstAddrMode of MCPS-DATA.request, and the address type field in FIG. 46 can be removed. Therefore, FIG. 46 is reduced to FIG. 47.

FIG. 47 illustrates an example row/element of RRRC table 4700 according to embodiments of the present disclosure. The embodiment of the row/element of RRRC table 4700 illustrated in FIG. 47 is for illustration only. FIG. 47 does not limit the scope of the present disclosure to any particular implementation.

In one embodiment, an electronic device 501 (e.g., 101-103 and 111-116 as illustrated in FIG. 1) as illustrated in FIG. 5 may use the row/element of RRRC table 4700 as illustrated in FIG. 47. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

In FIG. 46 (or FIG. 47), the field of request/report indicator (RRI) is used to denote whether this row/element in RRRC table is to send ranging requests or ranging reports to a particular destination.

If an RRI value is one, this element is to send the ranging request, where requested information can be denoted by following fields, including reply time request (RTR), round-trip measurement request (RMR), ToF request (TOFR), AoA Azimuth request (AAR), and AoA elevation request (AER). If the value of the request field is one, then corresponding information is requested upon destination, otherwise it is not. The deferred mode (DM) field configured by the ranging requestor is to let the destination know whether to send ranging report in the RFRAME or a deferred data message: if a DM value is one, destination may send the ranging report in a separate data message after the current ranging cycle, otherwise ranging report may be embedded in a response RFRAME.

With an RRI value being one, fields of ranging reports, including RX-to-TX reply-time, TX-to-RX round-trip time, ToF, AOA Azimuth, and AOA elevation are not present.

If an RRI value is zero, this element of RRRC table is used to send the ranging reports to a particular destination. In this case, fields of RTR. RMR, TOFR, AAR, AER are used to indicate the presence of corresponding fields for ranging report, including RX-to-TX reply-time, TX-to-RX round-trip time, ToF, AOA Azimuth, and AOA elevation. If a request field is one, the corresponding field to report certain information is present, otherwise it is not. Note that fields for ranging report follow the same definitions of those in FIG. 39 or FIG. 40.

An RRRC table with elements as illustrated in FIG. 46 (or FIG. 47) can stack multiple ranging requests and/or ranging reports to different destinations. Timestamp-related information and/or AOA can be requested or reported via the same IE. Some implementations and use cases may not support certain feature(s). For example, AOA estimation requests equipment with antenna array, which is not applicable all the time. Therefore, a subset of fields for ranging requests/reports can be maintained from FIG. 47. FIG. 48 illustrates an example of a simplified row/element of RRRC table, which only contains timestamp-related information. Other simplifications of RRRC table element/row, compared to that of FIG. 47, are not precluded by this disclosure. FIG. 48 illustrates an example simplified row/element of RRRC table 4800 according to embodiments of the present disclosure. The embodiment of the simplified row/element of RRRC table 4800 illustrated in FIG. 48 is for illustration only. FIG. 48 does not limit the scope of the present disclosure to any particular implementation.

In one embodiment, an electronic device 501 (e.g., 101-103 and 111-116 as illustrated in FIG. 1) as illustrated in FIG. 5 may use the simplified row/element of RRRC table 4800 as illustrated in FIG. 48. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

Ranging procedures and corresponding message sequence charts with RRRC IE are similar to those illustrated in FIG. 41-44 via RRR and RR IE. Functionalities of RRR, RR IE introduced in the aforementioned embodiments can be realized by RRRC IE. When a request/report indicator field value is one, the element/row of RRRC table is to request certain information, which is the same as that of a row/element in the provider list. When a request/report indicator field value is zero, the element/row of RRRC table is to report certain information, which is the same as that of a row/element in the RR table. Consequently, RRR, RR IE in FIG. 41-44 can be replaced by newly defined RRRC IE.

FIG. 49 illustrates an example revised ranging result request IE (RRR IE) with one control octet 4900 according to embodiments of the present disclosure. The embodiment of the revised ranging result request IE (RRR IE) with one control octet 4900 illustrated in FIG. 49 is for illustration only. FIG. 49 does not limit the scope of the present disclosure to any particular implementation.

In one embodiment, an electronic device 501 (e.g., 101-103 and 111-116 as illustrated in FIG. 1) as illustrated in FIG. 5 may use the revised ranging result request IE (RRR IE) with one control octet 4900 as illustrated in FIG. 49. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 50 illustrates an example element/row in the RRR table 5000 according to embodiments of the present disclosure. The embodiment of the element/row in the RRR table 5000 illustrated in FIG. 50 is for illustration only. FIG. 50 does not limit the scope of the present disclosure to any particular implementation.

In one embodiment, an electronic device 501 (e.g., 101-103 and 111-116 as illustrated in FIG. 1) as illustrated in FIG. 5 may use the element/row in the RRR table 5000 as illustrated in FIG. 50. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

The ranging result request IE (RRR IE) introduced in the aforementioned embodiments can be used to send ranging requests to different devices. In each element of the FIG. 35, there may be one control octet to indicate the requested information to a particular ranging device. If the same request applies to multiple ranging devices, then one control octet can be used to indicate the requested information, which may apply to all devices receiving this IE. The number of required control octets is reduced from the number of destinations to one. FIG. 49 illustrates an example of the content field format for the revised RRR IE, where element or row of the content field format is shown in FIG. 50.

In FIG. 49, the address present field is used to indicate whether the RRR table length and RRR table fields are present or not: if the address present field value is 1, the RRR table length and RRR table fields are present, otherwise the RRR table length and RRR table fields are not. The RRR table length equals the number of rows or elements in the RRR table, which is the same as the number of devices who may receive the RRR IE.

If the RRR IE is conveyed in a unicast frame, the destination address has been specified by the MHR. Therefore, an RRR table length and RRR table fields are not needed. When the RRR IE is conveyed in a broadcast and multicast message, the device sending this IE expects to receive requested information from all devices receiving the RRR IE, then RRR table length and RRR table fields are also not needed. However, if the requesting device expects responses from a specified set of devices, the RRR table length and RRR table fields are present to list addresses of those devices. The control flow of using RRR table can be illustrated in FIG. 51.

Figure 51:
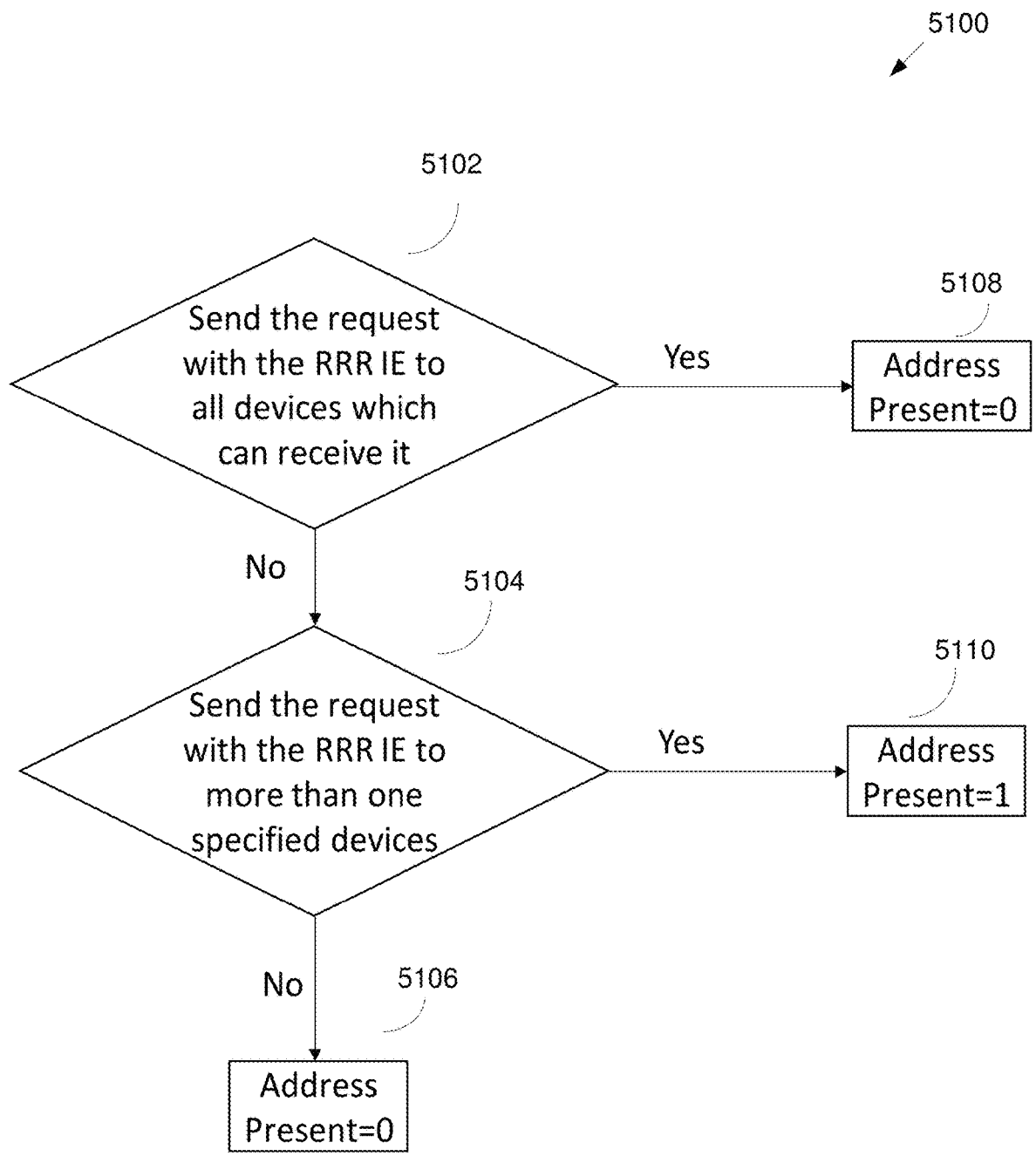
FIG. 51 illustrates an example RRR table for the device sending the RRR IE according to embodiments of the present disclosure.

FIG. 51 illustrates an example RRR table for the device sending the RRR IE 5100 according to embodiments of the present disclosure. The embodiment of the RRR table for the device sending the RRR IE 5100 illustrated in FIG. 51 is for illustration only. FIG. 51 does not limit the scope of the present disclosure to any particular implementation.

In one embodiment, an electronic device 501 (e.g., 101-103 and 111-116 as illustrated in FIG. 1) as illustrated in FIG. 5 may use the RRR table for the device sending the RRR IE 5100 as illustrated in FIG. 51. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

As illustrated in FIG. 51, the method 5100 begins at step 5102. In step 5102, the method 5100 determines if the request with the RRR IE is sent to all devices which can receive the request. In step 5102, if the method determines that the request is sent to all devices, the method 5100 sets the address present=0 in step 5108. In step 5102, if the method determines the request is not sent to all devices, the method 5100 determines in step 5104 that the request with the RRR IE is sent to more than one specified device. In step

5104, the method determines that the request is sent to more than one specified device, the method sets the address present=1 in step 5110. In step 5104, the method determines that the request is not sent to more than one specified device, the method 5100 in step 5106 sets the address present=0.

Similar to the bit fields for request in the FIG. 36, Bit 1-5 of the first control octet as shown in the FIG. 49 indicate whether a certain information is requested or not: if the request bit-field value is one, the corresponding information is requested, otherwise it is not requested. These bit-fields are associated with the requests for reply time, round-trip measurement, time-of-flight (TOF), azimuth AOA, and elevation AOA, respectively. Bit 6-7 can be reserved for future use to request other information.

With the structure of specified in FIG. 49, if a device requests different sets of information from different destinations, multiple RRR IEs can be used in a broadcast message, where different RRR IEs are used to exchange different sets of requested information.

FIG. 52 illustrates another example revised ranging result request IE (RRR IE) with one control octet 5200 according to embodiments of the present disclosure. The embodiment of the revised ranging result request IE (RRR IE) with one control octet 5200 illustrated in FIG. 52 is for illustration only. FIG. 52 does not limit the scope of the present disclosure to any particular implementation.

In one embodiment, an electronic device 501 (e.g., 101-103 and 111-116 as illustrated in FIG. 1) as illustrated in FIG. 5 may use the revised ranging result request IE (RRR IE) with one control octet 5200 as illustrated in FIG. 52. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

The address type, i.e., 2-octet or 8-octet address, can be specified by the DstAddrMode of MCPS-DATA.request. However, if the address type cannot be specified in this way, one of the reserved bits can be used to indicate the address type. Therefore, the content field format of the RRR IE becomes FIG. 52, while each element of the RRR table still remains the same as shown in the FIG. 50.

The address type field is valid when an address present field value is 1, and the RRR table is present. The address type field may indicate whether the used address type in the RRR table is 2-octet short address or 8-octet extended address: if an address type field value is 1, the 2-octet short address is used in the RRR table, otherwise the 8-octet extended address is used in the RRR table.

FIG. 53 illustrates an example revised ranging result request IE (RRR IE) with ranging control bits 5300 according to embodiments of the present disclosure. The embodiment of the revised ranging result request IE (RRR IE) with ranging control bits 5300 illustrated in FIG. 53 is for illustration only. FIG. 53 does not limit the scope of the present disclosure to any particular implementation.

In one embodiment, an electronic device 501 (e.g., 101-103 and 111-116 as illustrated in FIG. 1) as illustrated in FIG. 5 may use the revised ranging result request IE (RRR IE) with ranging control bits 5300 as illustrated in FIG. 53. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

If the ranging procedure is not fixed through an in-band or out-of-band coordination process before the ranging starts, two reserved bits in FIG. 49 can also be used to indicate the state of RFRAME conveying this RRR IE. Specifically, the revised RRR IE content field format can be found in FIG. 53, while the element of the RRR table remains the same as that of FIG. 50. The value of ranging control info field is illustrated in the following TABLE 3.

TABLE 3

Values of the Ranging Control Info field in the RRR IE

| Ranging Control Info field value | Meaning |
| --- | --- |
| 00 | This frame is the first RFRAME from the ranging initiator for the SS-TWR. |
| 01 | This frame is the response RFRAME from the ranging responder for the SS-TWR. |
| 10 | This frame is the first RFRAME from the ranging initiator for the DS-TWR. |
| 11 | This frame is the continuing RFRAME from the ranging responder for the DS-TWR, which initiates the second round-trip measurement. |

The revised RRR IE shown in the FIG. 53 with a ranging control info field specified in TABLE 3 can fulfill the same functionality as that of the RCDT IE for the unicast ranging. Moreover, the revised RRR IE can also be used to request information and control ranging procedure for the multi-node ranging, e.g., one-to-many, or many-to-many.

FIG. 54 illustrates an example revised ranging report IE (RR IE) with one control octet 5400 according to embodiments of the present disclosure. The embodiment of the revised ranging report IE (RR IE) with one control octet 5400 illustrated in FIG. 54 is for illustration only. FIG. 54 does not limit the scope of the present disclosure to any particular implementation.

In one embodiment, an electronic device 501 (e.g., 101-103 and 111-116 as illustrated in FIG. 1) as illustrated in FIG. 5 may use the revised ranging report IE (RR IE) with one control octet 5400 as illustrated in FIG. 54. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

The ranging report IE (RR IE) introduced in the aforementioned embodiment can be used to send ranging-related measurements to different devices. In each element of FIG. 38, there may be one control octet to indicate the presence of reported information to a particular ranging device. If the same set of information needs to be reported to different devices, one control octet can be used to indicate the reported information, which may apply to all devices receiving this IE. The number of required control octets is reduced from the number of destinations to one. FIG. 54 illustrates an example the content field format for the revised RR IE, where element or row of the content field format is shown in FIG. 54.

FIG. 55 illustrates an example element/row in the RR table 5500 according to embodiments of the present disclosure. The embodiment of the element/row in the RR table 5500 illustrated in FIG. 55 is for illustration only. FIG. 55 does not limit the scope of the present disclosure to any particular implementation.

In one embodiment, an electronic device 501 (e.g., 101-103 and 111-116 as illustrated in FIG. 1) as illustrated in FIG. 5 may use the element/row in the RR table 5500 as illustrated in FIG. 55. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

The first bit of the control octet, i.e., an address present field, is used to indicate whether the address field is present in each element of the RR table as shown in FIG. 55: if the address present field value is 1, the address field of RRR table element is present, otherwise it is not. Bit 1-5 are report present fields to denote whether certain information is present in the element of RR table: if a report present field is 1, the corresponding information is presented in each element of the RR table, otherwise it is not. Bit 6 of the control octet is used to indicate whether this ranging report is conveyed in the RFRAME, or in a deferred data message: if the value is zero, this RR IE is embedded in the RFRAME, otherwise it is conveyed in a deferred data message.

The address type, i.e., 2-octet or 8-octet address, can be specified by the DstAddrMode of MCPS-DATA.request. However, if the address type cannot be specified in this way, a reserved bit in FIG. 54 can be used to indicate the address type. Therefore, the content field format of the RR IE becomes FIG. 56, while each element of the RR table still remains the same as shown in the FIG. 55.

The address type field is valid when an address present field value is 1. The address type field may indicate whether the used address type in the RR table is 2-octet short address or 8-octet extended address: if the address type field value is 1, the 2-octet short address is used in the RR table, otherwise the 8-octet extended address is used in the RR table.

In FIG. 55, the RX-to-TX reply time field is the time difference between the receive time of most recently received RFRAME with the RRR IE as shown in FIG. 53 from a particular source to request reply time, and the transmit time of the response RFRAME. If the deferred mode field value is zero, the RR IE reporting the reply time is embedded in the responding RFRAME. If the deferred mode field value is one, the RR IE is embedded in a deferred data message, while the conveyed reply time is associated with the most recently transmitted RFRAME before this data message. The TX-to-RX round-trip time field is the time difference between the transmit time of the RFRAME initiating a round-trip measurement and the receive time of the response RFRAME that completes a round-trip measurement. The TOF field contains the time-of-flight estimate.

The reference for these time values, i.e., reply time, round-trip time, and TOF, is the RMARKER. They are all unsigned integer time values, whose time units are specified as a ranging counter time unit in the IEEE 802.15.4z.

The AOA Azimuth field, if present, reports the estimated angle of arrival in the azimuth domain of the received RFRAME with the RRR IE to request azimuth AOA. The AOA elevation field, if present, reports the estimated angle of arrival in the elevation domain of the received RFRAME with the RRR IE to request elevation AOA. These fields to report AOA contain unsigned integers. The unit of AOA Azimuth is $2^{-16}$ multiplying 360 degree, while the unit of AOA Elevation is $2^{-16}$ multiplying 180 degree.

FIG. 56 illustrates another example revised ranging report IE (RR IE) with one control octet 5600 according to embodiments of the present disclosure. The embodiment of the revised ranging report IE (RR IE) with one control octet 5600 illustrated in FIG. 56 is for illustration only. FIG. 56 does not limit the scope of the present disclosure to any particular implementation.

In one embodiment, an electronic device 501 (e.g., 101-103 and 111-116 as illustrated in FIG. 1) as illustrated in FIG. 5 may use the revised ranging report IE (RR IE) with one control octet 5600 as illustrated in FIG. 56. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 57 illustrates an example revised ranging request and report control (RRRC) IE with one control octet 5700 according to embodiments of the present disclosure. The embodiment of the revised ranging request and report control (RRRC) IE with one control octet 5700 illustrated in FIG. 57 is for illustration only. FIG. 57 does not limit the scope of the present disclosure to any particular implementation.

In one embodiment, an electronic device 501 (e.g., 101-103 and 111-116 as illustrated in FIG. 1) as illustrated in FIG. 5 may use the revised ranging request and report control (RRRC) IE with one control octet 5700 as illustrated in FIG. 57. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

The revised RR IE and RRR IE can be merged into the RRRC IE with a single control octet. The content field format of the revised RRRC IE is illustrated in the FIG. 57, while each element of the RRRC table remains the same as that of FIG. 55.

The definition of fields and meanings of their values are the same as those in the FIG. 45 and FIG. 46. Note that the control bits in the first octet may be applied to each element of the RRRC table.

The request/report indicator field is used to indicate whether this RRRC IE is used to request or report certain information: if the value is 1, this RRRC IE to request certain information, otherwise it is used to report certain information, or vice versa. If the RRRC IE is used to request, fields for measurement report in the RRRC table may not be present.

The address present field is used to indicate the presence of address field in each element of the RRRC table: if the values is 1, each element of RRRC table may contain an address field, otherwise it may not. If the RRRC IE is used to request, and the field value of address present is zero, both RRRC table length and RRRC table are not needed.

If an RRRC IE is used to request, Bit 2-6 indicate the request of certain information: if a bit-field value is one, the corresponding information is requested, otherwise it is not. If the RRRC IE is used to report, Bit 2-6 indicate the report of certain information: if a bit-field value is one, the corresponding information is reported in the RRRC table.

Bit 7 of the control octet indicates the deferred mode. If the RRRC IE is used to request, the deferred mode field value lets the device receiving this request know whether to embed ranging report in an RFRAME or a deferred data message: if the value is one, a deferred data message may be used to send ranging report, otherwise ranging report may be embedded in an RFRAME. If the RRRC IE is used to report, the deferred mode field value indicates whether this report is deferred or this report is conveyed in an RFRAME: if the value is 1, the ranging report is transmitted in a deferred data message, otherwise it is embedded in an RFRAME.

Other semantics for the ranging result request IE (RRR IE) and ranging report IE (RR IE) are not precluded in this disclosure. In this embodiment, the RRR IE is renamed as the ranging request measurement and control IE (RRMC IE), while the RR IE is renamed as the ranging measurement information IE (RMI IE).

Figure 58:
FIG. 58 illustrates an example RRMC IE (or RRR IE) with ranging control Information field according to embodiments of the present disclosure.

FIG. 58 illustrates an example RRMC IE (or RRR IE) with ranging control Information field 5800 according to embodiments of the present disclosure. The embodiment of the RRMC IE (or RRR IE) with ranging control Information field 5800 illustrated in FIG. 58 is for illustration only. FIG. 58 does not limit the scope of the present disclosure to any particular implementation.

In one embodiment, an electronic device 501 (e.g., 101-103 and 111-116 as illustrated in FIG. 1) as illustrated in FIG. 5 may use the RRMC IE (or RRR IE) with ranging control Information field 5800 as illustrated in FIG. 58. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

As shown in the FIG. 58, the length of the RRMC IE content field determines the presence of the RRMC table length and RRMC table fields: if the length is one octet, the RRMC table length and RRCM table are not present; if the length is more than one octet, the RRMC table length and RRCM table are present. RRMC table length equals the number of row elements in the RRMC table, which is the same as the number of devices receiving requests. The row element format of the RRMC table remains the same as that of FIG. 50.

If the RRMC IE is conveyed in a unicast frame, the destination address has been specified by the MHR. Therefore, the RRMC table length and RRMC table fields are not needed. When the RRMC IE is conveyed in a broadcast message, the device sending this IE intends to request all devices receiving the RRMC IE, then RRMC table length and RRMC table fields are not needed either. However, if the requesting device expects responses from a specified set of devices, RRMC table length and RRMC table fields are present to list addresses of those devices.

The fields to request different information, i.e., Bit 0-4, remain the same as those fields shown in FIG. 53. The value of the Ranging Control Information field is illustrated in the TABLE 3, which is used to indicate the usage of the RFRAME. With the content field format as shown in FIG. 58, if a device requests different sets of information from different destinations, multiple RRMC IEs can be used in a broadcast message, where different RRMC IEs are used to exchange different sets of requests.

In FIG. 50, the address type, i.e., 2-octet or 8-octet address, can be specified by the DstAddrMode of MCPS-DATA.request.

For one-to-many SS-TWR, the ranging exchange is started by the initiator, where the ranging request measurement and control IE (RRMC IE) is embedded in the ranging initiation message sent to multiple responders. The ranging control information field of the RRMC IE is set to be zero according to TABLE 3, which is indicated by the RRMC (0) IE in the FIG. 59. The reply time request field of the RRMC IE is set to be one, which requests the reply time of the responding ERDEV. At the responder side, the MCPS-DATA.indication delivering RRMC (0) IE tells a next higher layer to initiate the ranging response message, which conveys the ranging measurement information IE (RMI IE) with the reply time and the RRMC IE. The ranging control information field of the RRMC IE in the response RFRAME is set to be one according to TABLE 3, which is indicated by the RRMC (1) IE in FIG. 59.

For the multi-node ranging based on scheduling, responders send the ranging response messages in their assigned time slots, while for the multi-node ranging based on contention, the responders contend in the time slots of the ranging response phase. After acquisition of ranging response messages, the initiator has the full information to calculate the TOF to different responders.

Figure 59:
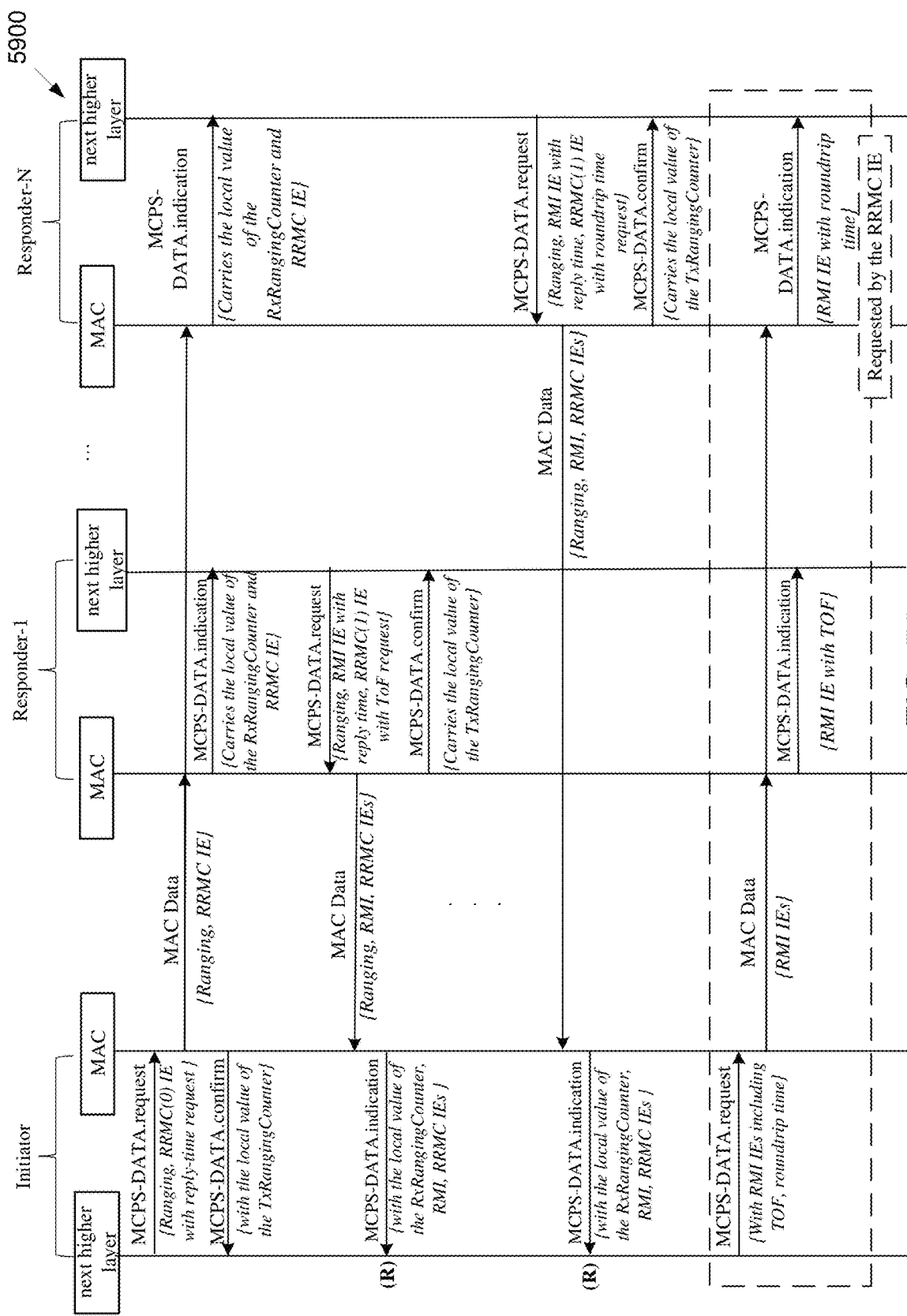
FIG. 59 illustrates an example message sequence chart for one-to-many SS-TWR according to embodiments of the present disclosure.

FIG. 59 illustrates an example message sequence chart 5900 for one-to-many SS-TWR according to embodiments of the present disclosure. The embodiment of the message sequence chart 5900 illustrated in FIG. 59 is for illustration only. FIG. 59 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 5900 as illustrated in FIG. 59. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 59 illustrates the message sequence chart for one-to-many SS-TWR between one initiator and N responders, i.e., responder-1, responder-2, . . . , responder-N, where ranging response messages from different responders are scheduled for transmission in a sequential order. At the point labeled (R), the initiator has the sufficient information to calculate the ranging result for the corresponding pair. Different responders can have different requests of ranging results.

In FIG. 59, for example, a responder-N requests the TX-to-RX round-trip time, i.e., the round-trip time request field value of the RRMC IE in the ranging response message is set to be one, while a responder-1 directly request the ranging result, i.e., the TOF request field value of the RRMC IE in the ranging response message is set to be one. The final data message broadcast by the initiator conveying multiple RMI IEs to fulfill measurement report, where the destinations of the measurement reports can be distinguished by the address field of the RMI IE. Note that if multiple responders request the same set of information, e.g., TOF, measurement report can be fulfilled by one RMI IE in the final data message.

Figure 60:
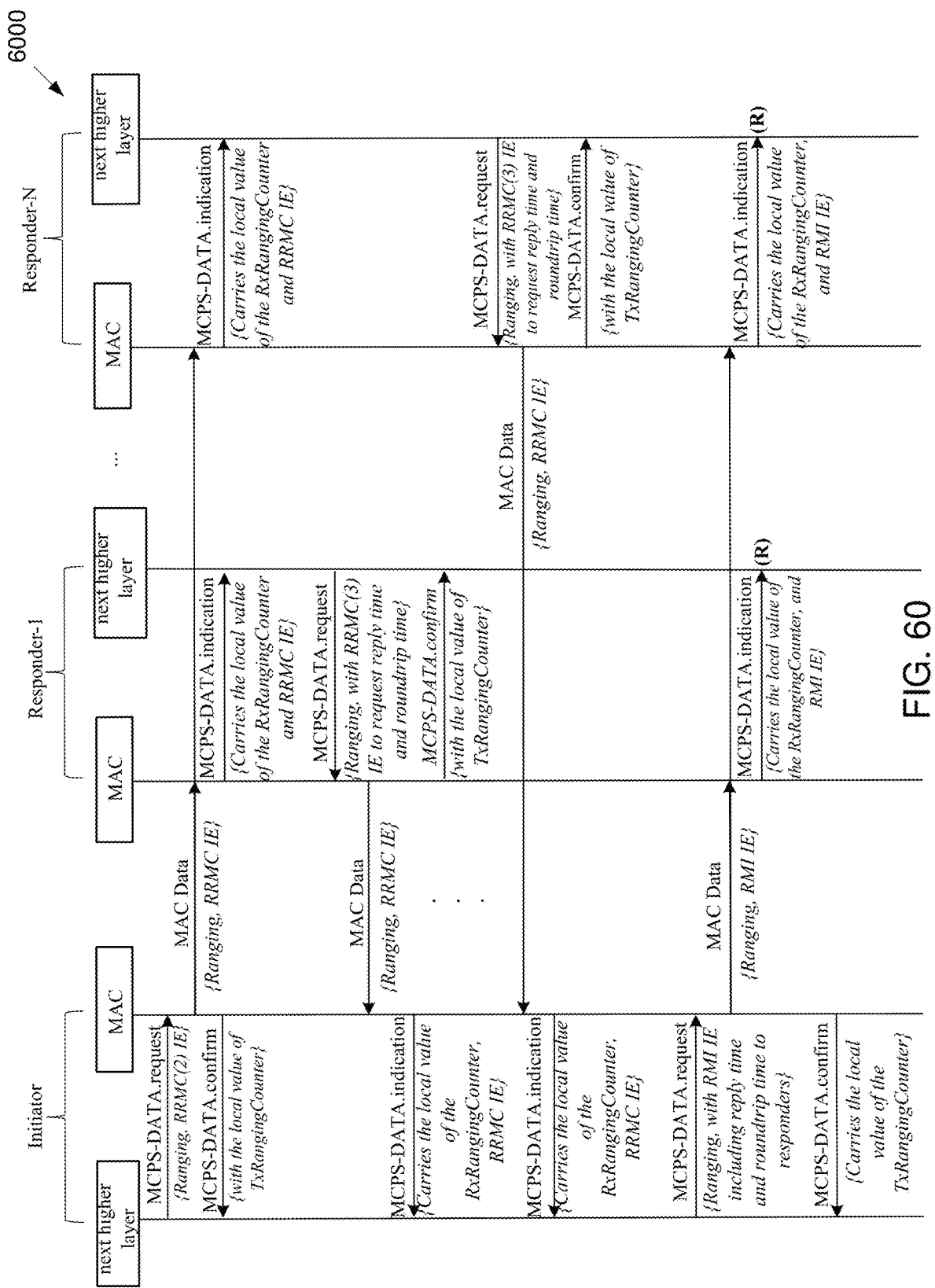
FIG. 60 illustrates an example message sequence chart for one-to-many DS-TWR: no request of ranging result from the initiator according to embodiments of the present disclosure.

FIG. 60 illustrates an example message sequence chart 6000 for one-to-many DS-TWR: no request of ranging result from the initiator according to embodiments of the present disclosure. The embodiment of the message sequence chart 6000 illustrated in FIG. 60 is for illustration only. FIG. 60 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 6000 as illustrated in FIG. 60. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

For one-to-many DS-TWR, the three-way ranging method can be considered in order to reduce the number of transmissions. The ranging exchange is started by the initiator, where the RRMC IE is embedded in the ranging initiation message and sent to multiple responders. The ranging control information field value in the RRMC IE is two according to TABLE 3, which is indicated by RRMC (2) IE in FIG. 60.

Once the responder receives the ranging initiation message, the responder may form the ranging response message, containing the RRMC IE to initialize the second round-trip measurement. The ranging control information field value in the RRMC IE is set to be three according to TABLE 3, which is indicated by RRMC (3) IE in FIG. 58. To request the first round-trip time and the reply time of the final RFRAME from the initiator, the fields of reply time request and round-trip time request in the RRMC IE of the ranging response message are set to be one. Similar to one-to-many SS-TWR, ranging response messages of different responders can be scheduled, or contend for the time slots in the ranging response phase. Then, the initiator forms the final RFRAME, which incorporates the RMI IE reporting requested reply time and round-trip time to different responders.

FIG. 59 illustrates the message sequence chart for one-to-many DS-TWR between one initiator and N responders, i.e., responder-1, responder-2, . . . responder-N, where ranging response messages from different responders are scheduled for transmission in a sequential order. At the point labeled (R), responders have sufficient information to calculate the ranging result. If the fields of reply time request, round-trip measurement request, and TOF request in the RRMC IE in the ranging initiation message are set to be zero, the responder may not send back the ranging result or relevant time measurement to the initiator.

Figure 61:
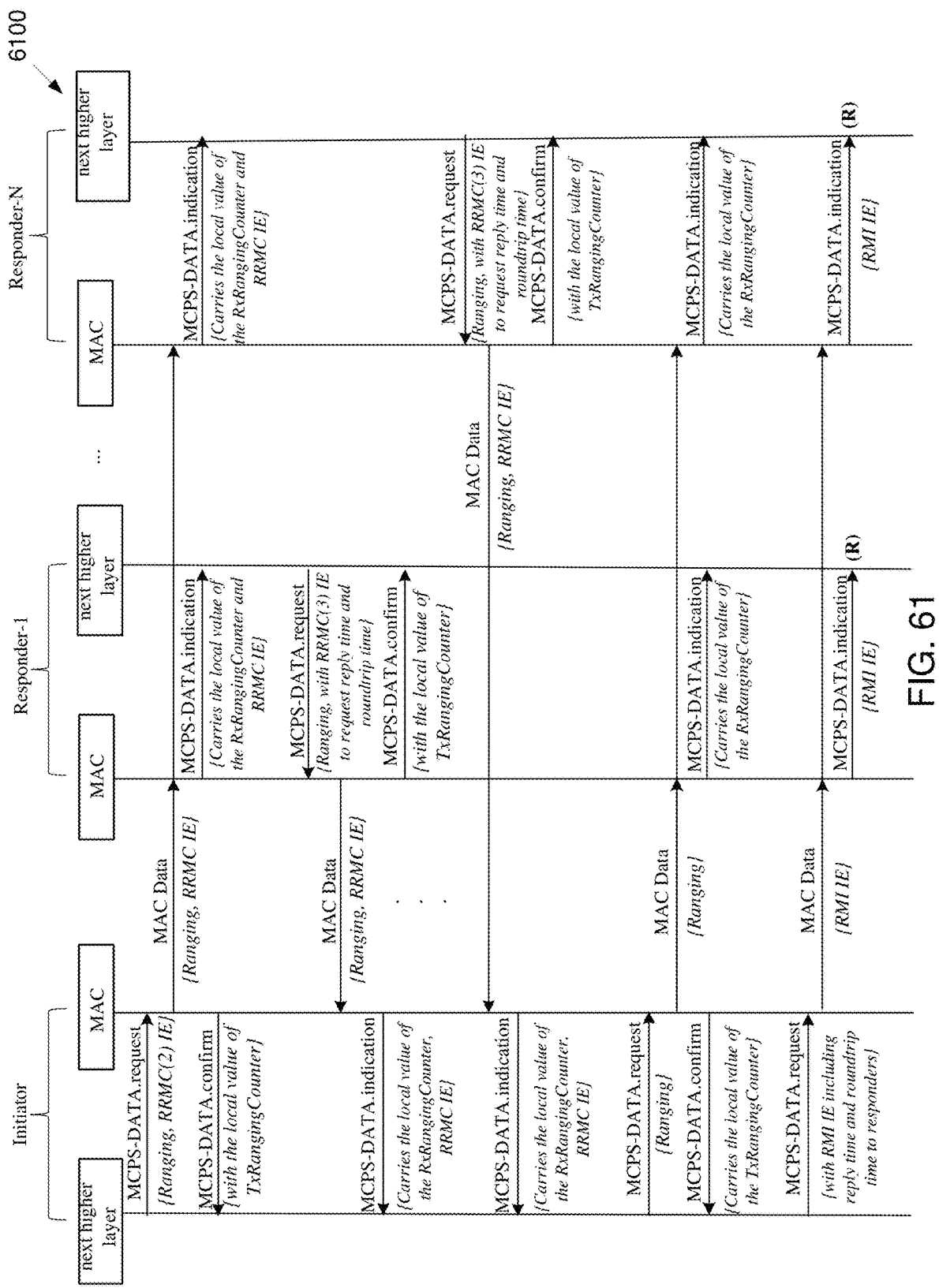
FIG. 61 illustrates an example message sequence chart for one-to-many DS-TWR: no request of ranging result from the initiator with deferred mode according to embodiments of the present disclosure.

FIG. 61 illustrates an example message sequence chart 6100 for one-to-many DS-TWR: no request of ranging result from the initiator with deferred mode according to embodiments of the present disclosure. The embodiment of the message sequence chart 6100 illustrated in FIG. 61 is for illustration only. FIG. 61 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 6100 as illustrated in FIG. 61. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 61 illustrates the message sequence chart for one-to-many DS-TWR when the deferred mode field value is set to be one in the ARC IE of the RCM. Therefore, the initiator sends the $1^{st}$ round-trip time and $2^{nd}$ reply time to the responders via the RMI IE in a deferred data frame, where the deferred mode field of the RMI IE is set to be one.

Figure 62:
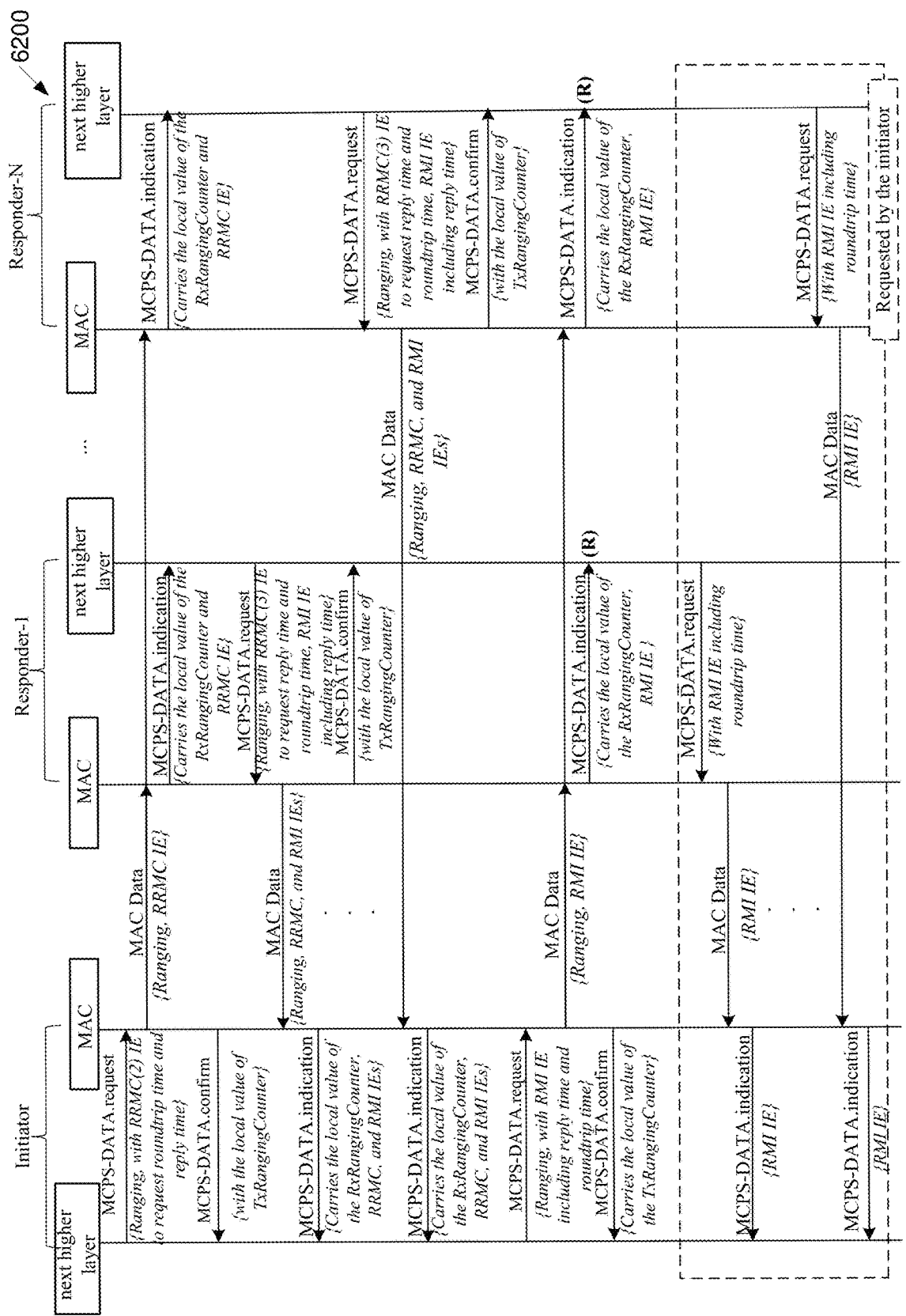
FIG. 62 illustrates an example message sequence chart for one-to-many DS-TWR: request of 1st reply time and 2nd round-trip time from the initiator according to embodiments of the present disclosure.

FIG. 62 illustrates an example message sequence chart 6200 for one-to-many DS-TWR: request of 1st reply time and 2nd round-trip time from the initiator according to embodiments of the present disclosure. The embodiment of the message sequence chart 6200 illustrated in FIG. 62 is for illustration only. FIG. 62 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 6200 as illustrated in FIG. 62. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

In FIG. 62, the initiator requests the $1^{st}$ reply time and $2^{nd}$ round-trip time at the responder by setting the reply time request and round-trip time request fields to be one in the RRMC IE of the ranging initiation message. Upon reception of the RRMC (2) IE by MCPS-DATA.indication, the next higher layer of the responder initializes the second round-trip measurement via the MCPS-DATA.request with RRMC (3) IE. Meanwhile, the next higher layer of the responder creates the RMI IE, which reports the reply time of ranging response message to the initiator. Since the initiator requests the second round-trip time from the responder, a separate data frame after ranging transmissions is used by each responder to send this information back. Therefore, the initiator is also able to calculate the TOF after the measurement report phase.

Figure 63:
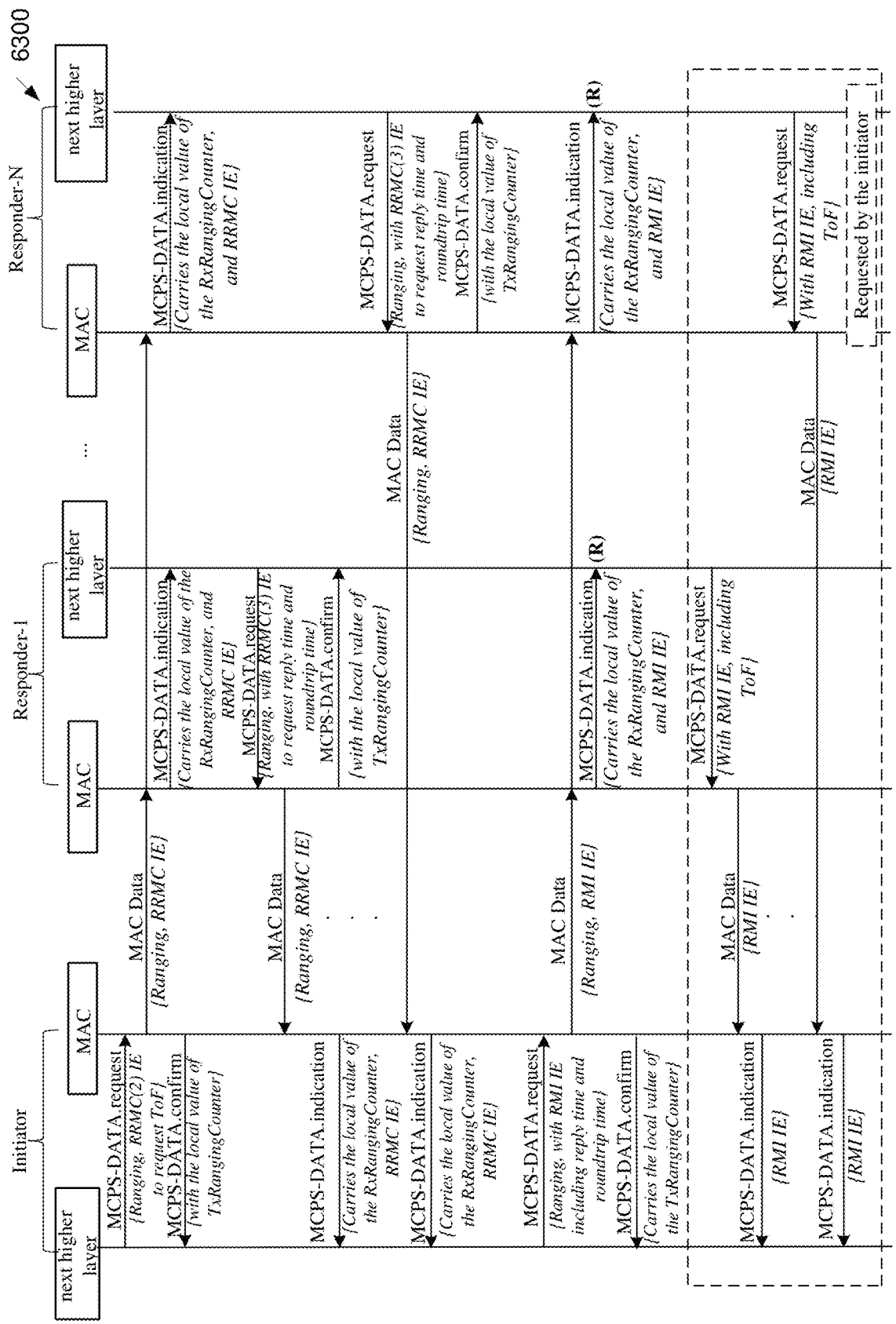
FIG. 63 illustrates an example message sequence chart for one-to-many DS-TWR: request of ranging result from the initiator according to embodiments of the present disclosure.

FIG. 63 illustrates an example message sequence chart 6300 for one-to-many DS-TWR: request of ranging result from the initiator according to embodiments of the present disclosure. The embodiment of the message sequence chart 6300 illustrated in FIG. 63 is for illustration only. FIG. 63 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 6300 as illustrated in FIG. 63. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

In FIG. 63, the initiator requests the ranging result, i.e., TOF, by setting the field value of the TOF request to be one in the RRMC IE of the ranging initiation message. Therefore, the responders respectively send back the ranging result (RMI IE) in separate data frames based on either time-scheduling or contention.

In one embodiment, the RRR IE is renamed as the ranging request measurement and control IE (RRMC IE), while the RR IE is renamed as the ranging measurement information IE (RMI IE).

FIG. 64 illustrates an example ranging reply time instantaneous IE content field format 6400 according to embodiments of the present disclosure. The embodiment of the ranging reply time instantaneous IE content field format 6400 illustrated in FIG. 64 is for illustration only. FIG. 64 does not limit the scope of the present disclosure to any particular implementation.

In one embodiment, an electronic device 501 (e.g., 101-103 and 111-116 as illustrated in FIG. 1) as illustrated in FIG. 5 may use the ranging reply time instantaneous IE content field format 6400 as illustrated in FIG. 64. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

The ranging reply time Instantaneous IE (RRTI IE) conveys the reply time(s) of the response frame containing the RRTI IE with respect to the frame(s) containing the RRMC IE with the reply time request field being one that solicited this response. The content field of the RRTI IE can be formatted as shown in FIG. 64.

Each row element of the RRTI table can be formatted as shown in FIG. 65.

FIG. 65 illustrates an example RRTI table row element format 6500 according to embodiments of the present disclosure. The embodiment of the RRTI table row element format 6500 illustrated in FIG. 65 is for illustration only. FIG. 65 does not limit the scope of the present disclosure to any particular implementation.

In one embodiment, an electronic device 501 (e.g., 101-103 and 111-116 as illustrated in FIG. 1) as illustrated in FIG. 5 may use the RRTI table row element format 6500 as illustrated in FIG. 65. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

The address present field in FIG. 64 is used to indicate the presence of the Address field in each row element of the RRTI table as illustrated in FIG. 65: if the address present field value is one, the address field of each row element is present, otherwise it is not.

The RRTI table length field denotes the number of row elements in the RRTI table. The RRTI table stacks the reply times to different RDEVs.

The RX-to-TX-reply-time field is the time difference between the receive time of most recently received RFRAME, conveying an RRMC IE with the reply time request field being one, from a particular source and the transmit time of the response RFRAME containing the RRTI IE. The reference for these time values is the RMARKER. The time unit follows the ranging counter time unit in the IEEE 802.15.4z spec, while other proper time units are not precluded.

The RRTI IE can be used to report reply times in the RFRAME in response to multiple RDEVs, which request the reply time via the RRMC IE with the reply time request field being one. The Address field in FIG. 65 can be used to specify the identity of the RDEV(s). For the ranging between one initiator and one responder, the address field may be omitted since the address field is specified by the destination address field of the MAC header. For multi-node ranging, the address field may not be present if reply times to different RDEVs are stacked in a pre-negotiated order.

For an SS-TWR with a deferred reply time result, the ranging exchange is initiated by the next higher layer invoking the MCPS-DATA.request primitive to send a ranging frame including the ranging request measurement and control IE (RRMC IE) requesting the ranging reply time information. The ranging control information field is set according to TABLE 3.

The replying ranging frame completes the round-trip measurement and the MCPS-DATA.confirm primitive gives the initiating side timestamps that define the round-trip time. At the responding side, the MCPS-DATA.indication primitive supplies the responding side timestamps that define the reply time for the round-trip measurement. This reply time is communicated to the initiating side in the ranging measurement information IE (RMI IE) carried by a subsequent message.

Figure 66:
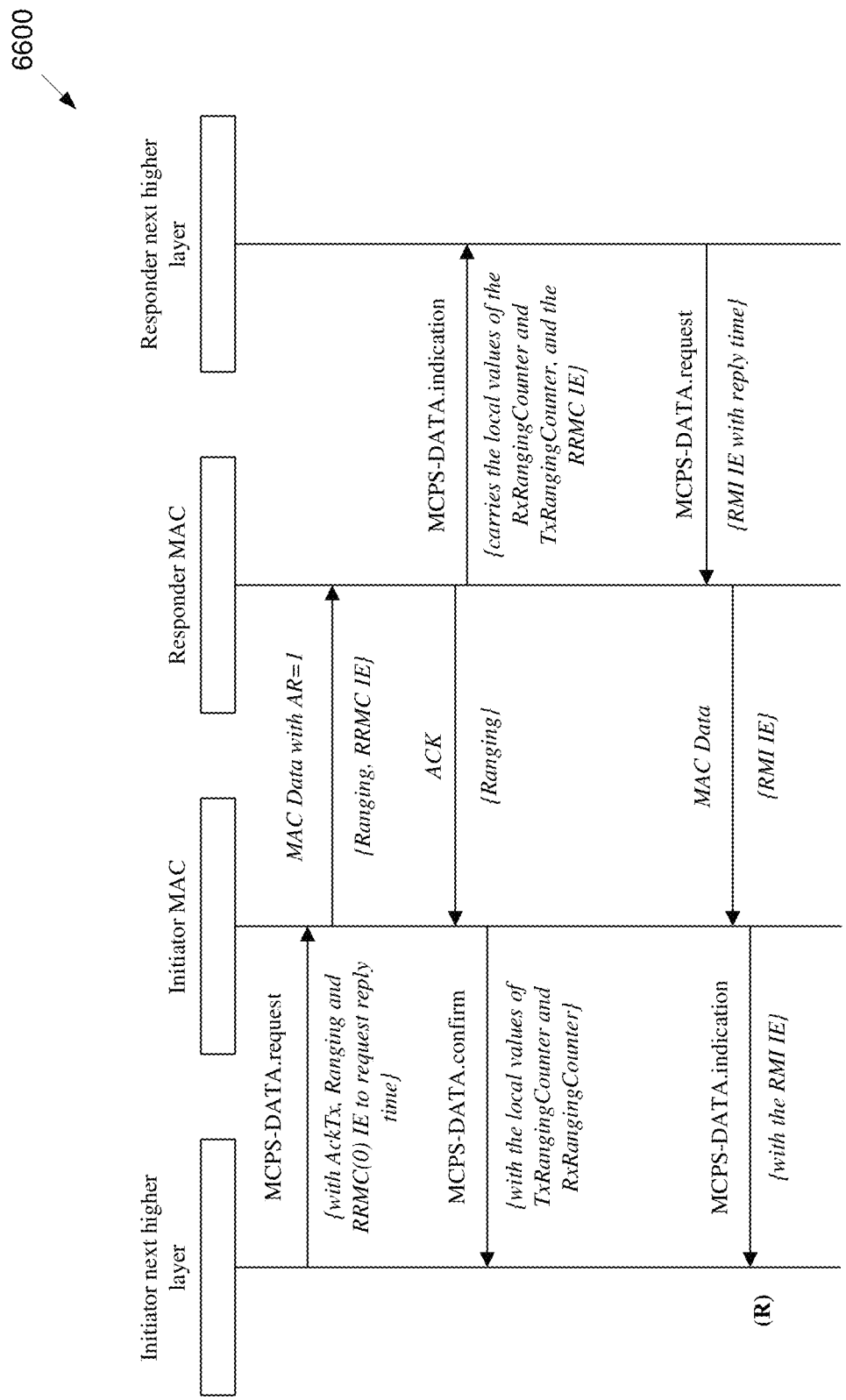
FIG. 66 illustrates an example message sequence chart for SS-TWR with deferred reply time result according to embodiments of the present disclosure.

FIG. 66 illustrates an example message sequence chart 6600 for SS-TWR with deferred reply time result according to embodiments of the present disclosure. The embodiment of the message sequence chart 6600 illustrated in FIG. 66 is for illustration only. FIG. 66 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 6600 as illustrated in FIG. 66. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 66 shows the message sequence chart for this exchange, where RRMC (0) IE indicates the carried RRMC IE with the ranging control information field value 0. At the point labelled (R) the initiating end has sufficient information to calculate the TOF between the two devices.

Figure 67:
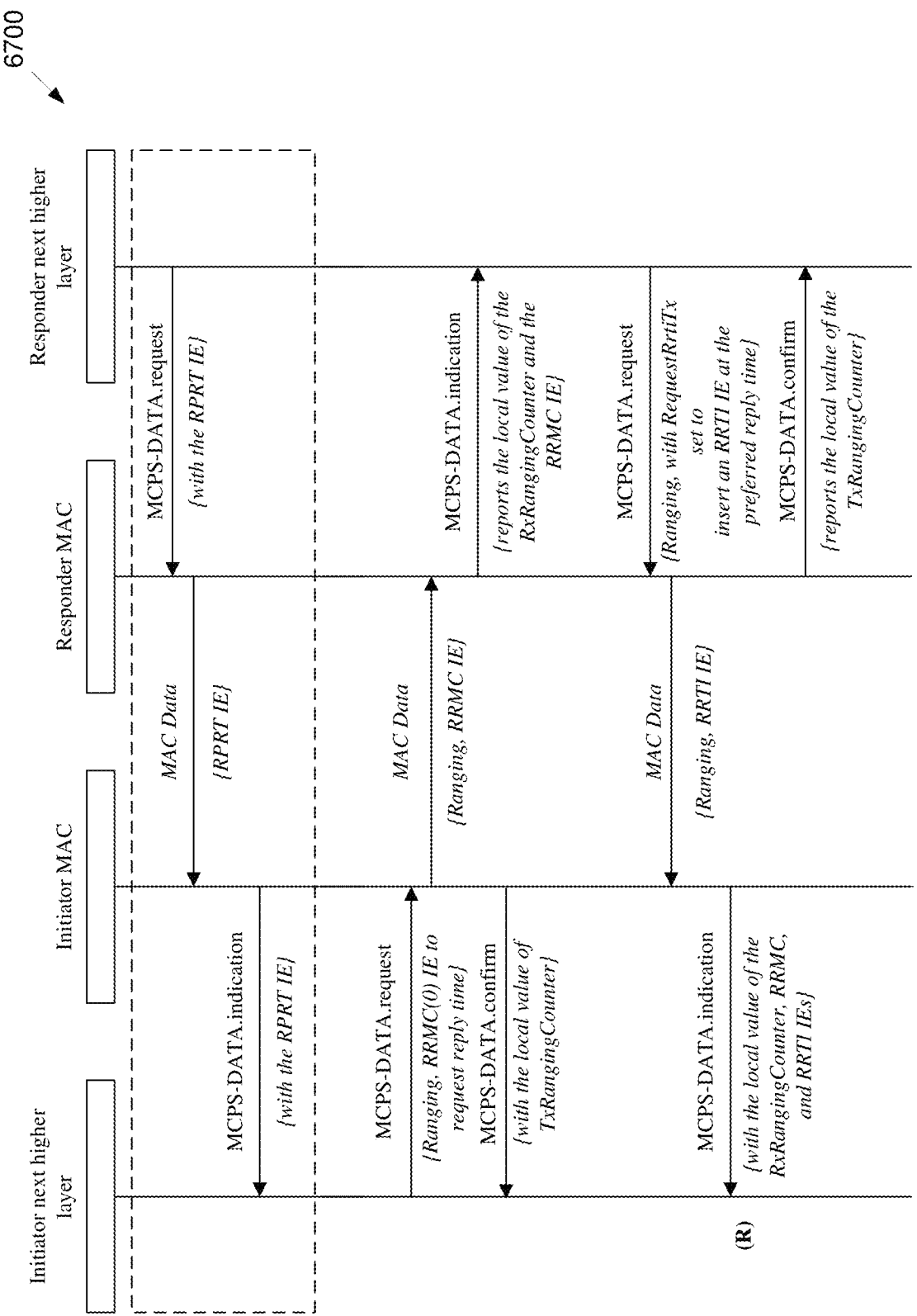
FIG. 67 illustrates an example message sequence chart for SS-TWR with embedded reply time according to embodiments of the present disclosure.

FIG. 67 illustrates an example message sequence chart 6700 for SS-TWR with embedded reply time according to embodiments of the present disclosure. The embodiment of the message sequence chart 6700 illustrated in FIG. 67 is for illustration only. FIG. 67 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 6700 as illustrated in FIG. 67. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 67 shows the message sequence chart for this exchange, where RRMC (0) IE indicates the carried RRMC IE with the ranging control information field value 0. The communication of the RPRT IE, shown in the dashed box, may happen at any convenient time before the ranging exchange is initiated, or may be out-of-band. At the point labelled (R) the initiating end has sufficient information to calculate the range between the two devices.

DS-TWR essentially involves completing SS-TWR exchanges initiated at either end or combining the results. The DS-TWR exchange is initiated by the next higher layer sending a ranging data frame carrying the RRMC with the ranging control information field set according to TALE 3. This frame and acknowledgement define the first round-trip measurement, while the RRMC IE delivery in the MCPS-DATA.indication primitive tells the next higher layer to initiate the second round-trip measurement of the exchange by the sending of an RFRAME in the other direction.

This RFRAME includes the RRMC IE with the ranging control information field set according to TABLE 3 to indicate this is the continuation of the exchange. The fields of reply time request and round-trip measurement request have value one to request the reply time and the first round-trip measurement. The acknowledgement to this message completes the second round-trip measurement. A subsequent message from the initiator conveys the first round-trip time measurement and the reply time for the second round-trip time measurement in an RMI IE.

Figure 68:
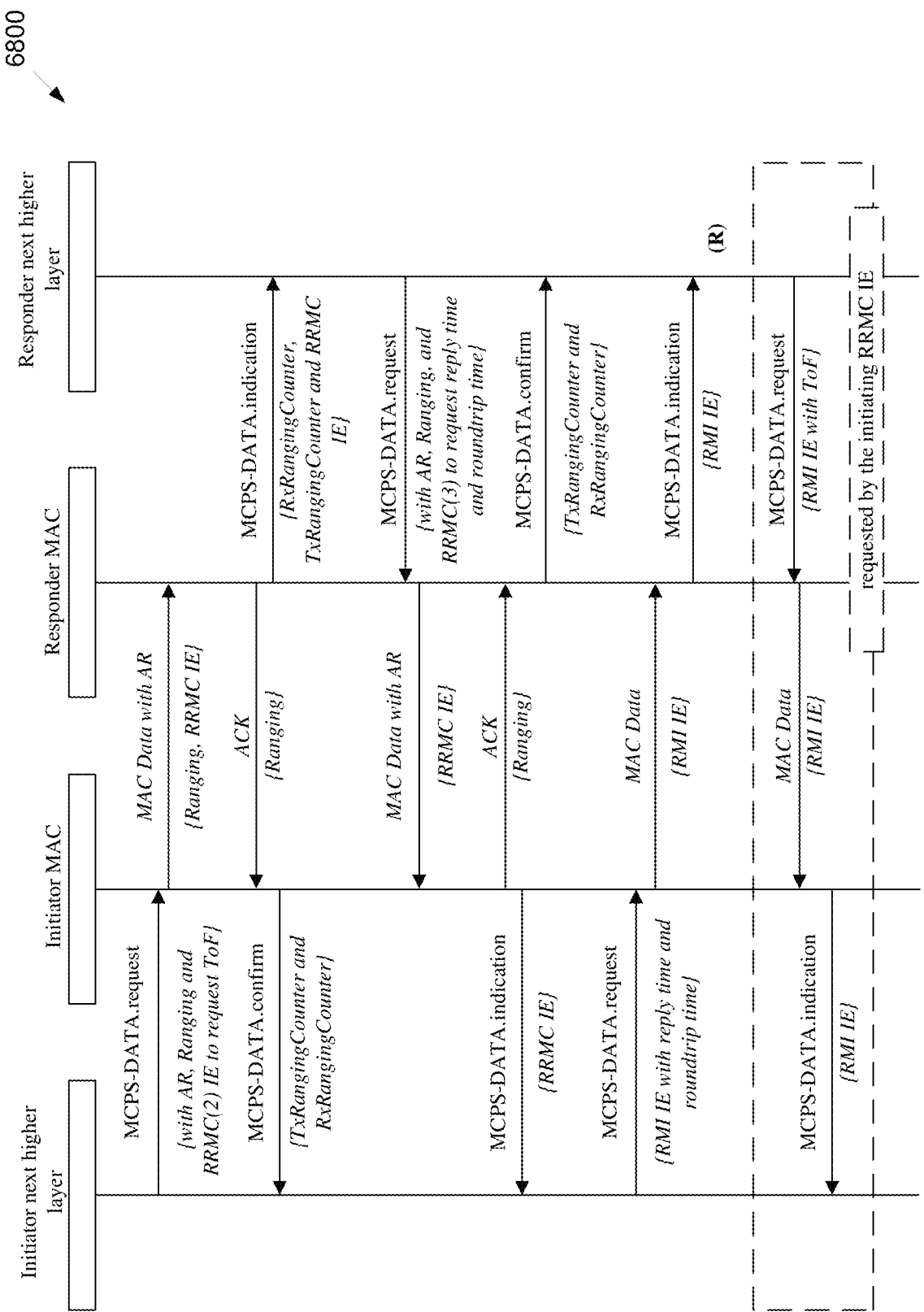
FIG. 68 illustrates an example message sequence chart for DS-TWR with deferred reply time result according to embodiments of the present disclosure.

FIG. 68 illustrates an example message sequence chart 6800 for DS-TWR with deferred reply time result according to embodiments of the present disclosure. The embodiment of the message sequence chart 6800 illustrated in FIG. 68 is for illustration only. FIG. 68 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 6800 as illustrated in FIG. 68. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 68 shows the message sequence chart for this exchange. At the point labelled (R) the responding end has sufficient information to calculate the range between the two devices. The subsequent reporting of the ranging result to the initiating end, in the RMI IE, depends on the value of the TOF request field in the initiating RRMC IE.

Figure 69:
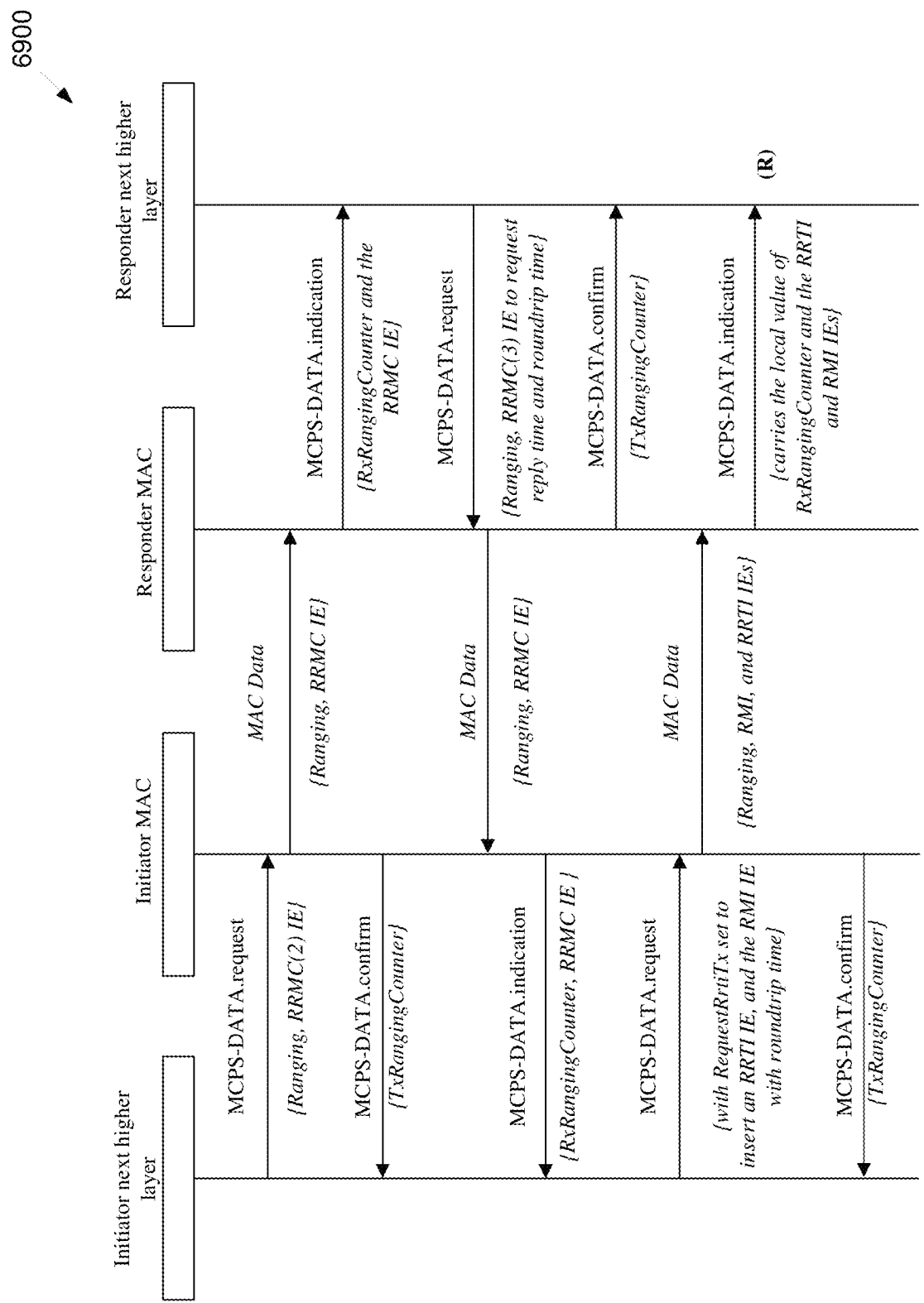
FIG. 69 illustrates an example message sequence chart for DS-TWR with three messages according to embodiments of the present disclosure.

FIG. 69 illustrates an example message sequence chart 6900 for DS-TWR with three messages according to embodiments of the present disclosure. The embodiment of the message sequence chart 6900 illustrated in FIG. 69 is for illustration only. FIG. 69 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 6900 as illustrated in FIG. 69. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

To embed the timestamp information in the RFRAME(s), the three message DS-TWR requires that the initiating end is able to embed the reply time as part of completing the second round-trip measurement. With reference to the message sequence chart of FIG. 69, the DS-TWR is initiated by an RFRAME carrying an RRMC IE with the ranging control information field set according to TABLE 3.

In this instance, the TOF request field of initiating RRMC IE with value zero indicates that the initiating end does not require a report of the ranging result. The responding side completes the first round-trip measurement and initiates the second measurement with an RFRAME carrying an RRMC IE with the ranging control information field set according to TABLE 3 to indicate this is the continuation of the exchange.

The reply time request and round-trip measurement request fields of this RRMC IE are set to be one, indicating the requests of the first round-trip measurement and the reply time for the second-round trip measurement. The original initiator completes the exchange by sending a final RFRAME carrying the first round-trip time measurement in an RMI IE and the reply time of this second round-trip measurement in an RRTI IE.

At the point labelled (R) the responding end has sufficient information to calculate the range between the two devices. Where the initiator of the ranging exchange wants the result, this may be requested in the TOF request field of initiating RRMC IE, to ask the responding end to convey the result in the RMI IE in a subsequent message at the end of the exchange as shown in FIG. 68.

For one-to-many SS-TWR, the ranging exchange is started by the initiator, where the ranging request measurement and control IE (RRMC IE) is embedded in the ranging initiation message broadcast to multiple responders. The ranging control information field of the RRMC IE may be set to zero according to TABLE 3, which is indicated by the RRMC (0) IE in FIG. 65.

The reply time request field of the RRMC IE is set to be one, which requests the reply time of the responding ERDEV. At the responder side, the MCPS-DATA.indication delivering RRMC (0) IE tells a next higher layer to initiate the ranging response message. With the RequestRrti setting to insert the RRTI IE, the MCPS-DATA.request at the responder also conveys the RRMC IE to control ranging procedure and send request(s).

Figure 70:
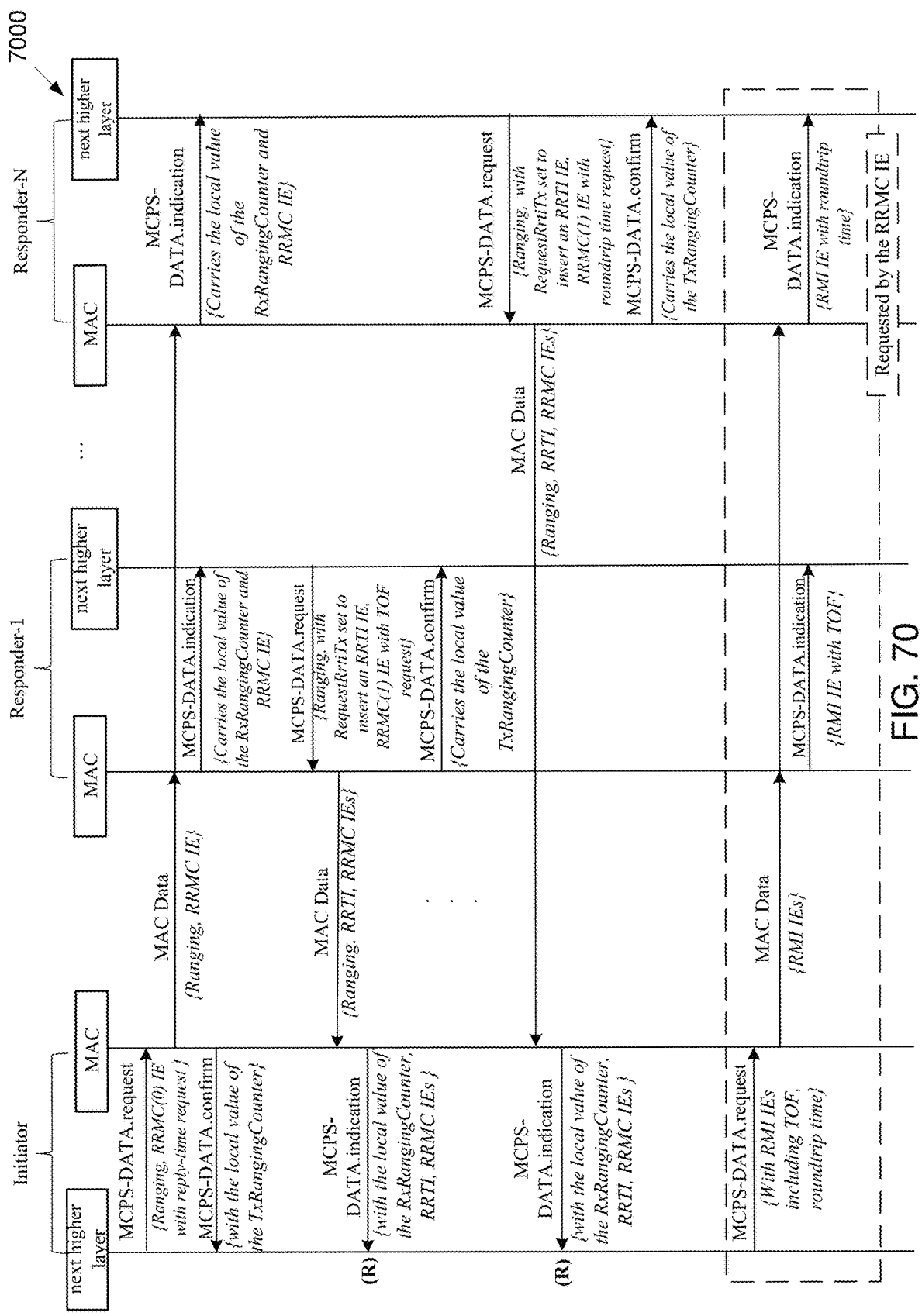
FIG. 70 illustrates an example message sequence chart for one-to-many SS-TWR according to embodiments of the present disclosure.

FIG. 70 illustrates an example message sequence chart 7000 for one-to-many SS-TWR according to embodiments of the present disclosure. The embodiment of the message sequence chart 7000 illustrated in FIG. 70 is for illustration only. FIG. 70 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 7000 as illustrated in FIG. 70. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

The ranging control information field of the RRMC IE in the response RFRAME may be set to one according to TABLE 3, which is indicated by the RRMC (1) IE in FIG. 70. The response RFRAME is sent to the initiator, where a destination address in the MAC header may be the initiator's address.

For the multi-node ranging based on scheduling, responders send the ranging response messages in their assigned time slots, while for the multi-node ranging based on contention, responders contend in the time slots of the ranging response phase. After acquisition of ranging response messages, the initiator has the full information to calculate the TOF to different responders.

FIG. 70 illustrates the message sequence chart for one-to-many SS-TWR between one initiator and N responders, i.e., responder-1, responder-2, . . . , responder-N, where ranging response messages from different responders are scheduled for transmission in a sequential order. At the point labeled (R), the initiator has the sufficient information to calculate the ranging result for the corresponding pair. Different responders can have different requests of ranging results.

In FIG. 70, for example, a responder-N requests the TX-to-RX round-trip time, i.e., the round-trip time request field value of the RRMC IE in the ranging response message is set to be one, while a responder-1 directly request the ranging result, i.e., the TOF request field value of the RRMC IE in the ranging response message is set to be one. The final data message broadcast by the initiator conveying multiple RMI IEs to fulfill measurement report, where the destinations of the measurement reports can be distinguished by the address field of the RMI IE. Note that if multiple responders request the same set of information, e.g., TOF, measurement report can be fulfilled by one RMI IE in the final data message.

For one-to-many DS-TWR, the three-way ranging method can be considered in order to reduce the number of transmissions. The ranging exchange is started by the initiator, where the RRMC IE is embedded in the ranging initiation message and sent to multiple responders. The ranging control information field value in the RRMC IE may be two according to TABLE 3, which is indicated by RRMC (2) IE in FIG. 71.

Figure 71:
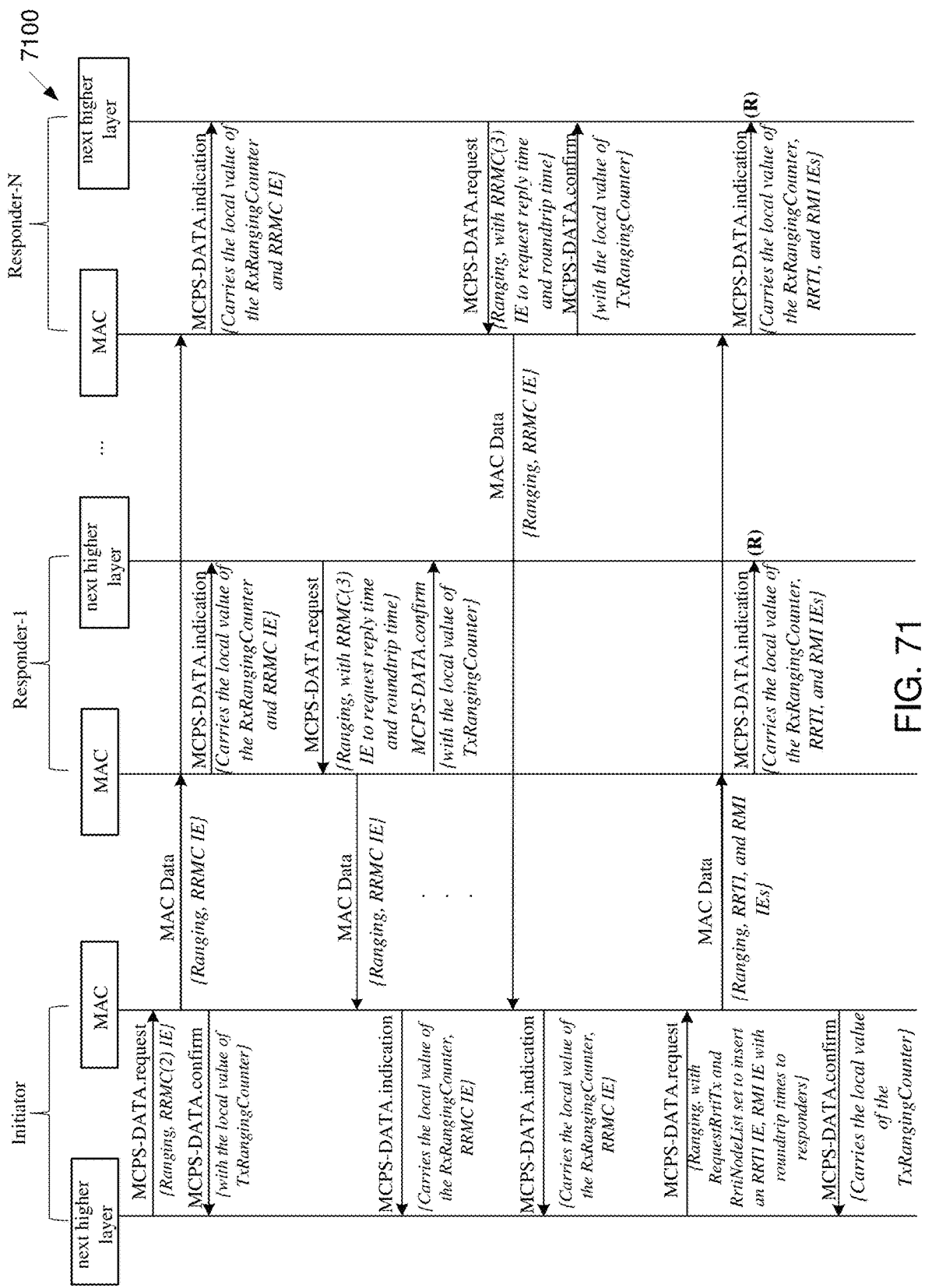
FIG. 71 illustrates an example message sequence chart for one-to-many DS-TWR: no request of ranging result from the initiator according to embodiments of the present disclosure.

FIG. 71 illustrates an example message sequence chart 7100 for one-to-many DS-TWR: no request of ranging result from the initiator according to embodiments of the present disclosure. The embodiment of the message sequence chart 7100 illustrated in FIG. 71 is for illustration only. FIG. 71 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 7100 as illustrated in FIG. 71. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

Once the responder receives the ranging initiation message, the responder may form the ranging response message, containing the RRMC IE to initialize the second round-trip measurement. The ranging control information field value in the RRMC IE may be three according to TABLE 3, which is indicated by RRMC (3) IE in FIG. 71. To request the first round-trip time and the reply time of the final RFRAME from the initiator, the fields of reply time request and round-trip time request in the RRMC IE of the ranging response message are set to be one. Similar to one-to-many SS-TWR, ranging response messages of different responders can be scheduled, or contend for the time slots in the ranging response phase. Then, the initiator forms the final RFRAME, which incorporates the RMI IE reporting round-trip times, and the RRTI IE reporting reply times to different responders. The next higher layer of initiator sets RequestRrtiTx and RrtiNodeList to request the MAC sublayer create and insert RRTI IE in the final RFRAME, which conveys the reply times to different responders.

FIG. 71 illustrates the message sequence chart for one-to-many DS-TWR between one initiator and N responders, i.e., responder-1, responder-2, . . . responder-N, where ranging response messages from different responders are scheduled for transmission in a sequential order. At the point labeled (R), responders have sufficient information to calculate the ranging result. If the fields of reply time request, round-trip measurement request, and TOF request in the RRMC IE in the ranging initiation message are set to be zero, the responder may not send back the ranging result or relevant time measurement to the initiator.

Figure 72:
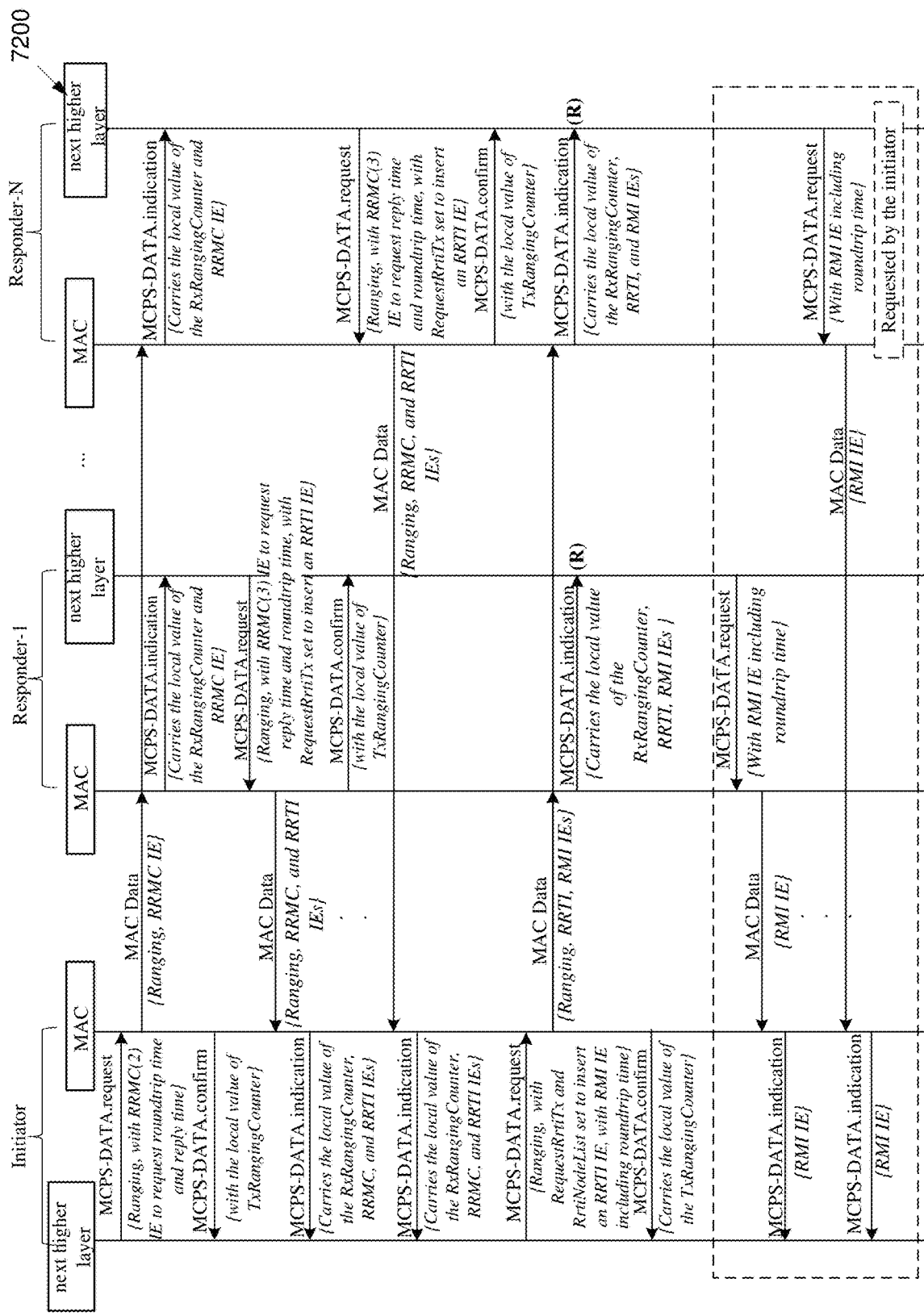
FIG. 72 illustrates an example message sequence chart for one-to-many DS-TWR: request of 1st reply time and 2nd round-trip time from the initiator according to embodiments of the present disclosure.

FIG. 72 illustrates an example message sequence chart 7200 for one-to-many DS-TWR: request of 1st reply time and 2nd round-trip time from the initiator according to embodiments of the present disclosure. The embodiment of the message sequence chart 7200 illustrated in FIG. 72 is for illustration only. FIG. 72 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 7200 as illustrated in FIG. 72. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

In FIG. 72, the initiator requests the $1^{st}$ reply time and $2^{nd}$ round-trip time at the responder by setting the reply time request and round-trip time request fields to be one in the RRMC IE of the ranging initiation message. Upon reception of the RRMC (2) IE by MCPS-DATA.indication, the next higher layer of the responder initializes the second round-trip measurement via the MCPS-DATA.request with RRMC (3) IE. Meanwhile, the RequestRrtiTx in the MCPS-DATA.request is set to insert the RRTI IE in the response RFRAME. To send the final RFRAME, the next high layer of the initiator sets the RequestRrti and RrtiNodeList of MCPS-DATA.request to insert an RRTI IE, and also conveys the RMI IE reporting the first round-trip time measurements to the MAC layer.

Since an initiator requests the second round-trip time from the responder, a separate data frame after ranging transmissions is used by each responder to send this information back. Therefore, initiator is also able to calculate the TOF after the measurement report phase.

Figure 73:
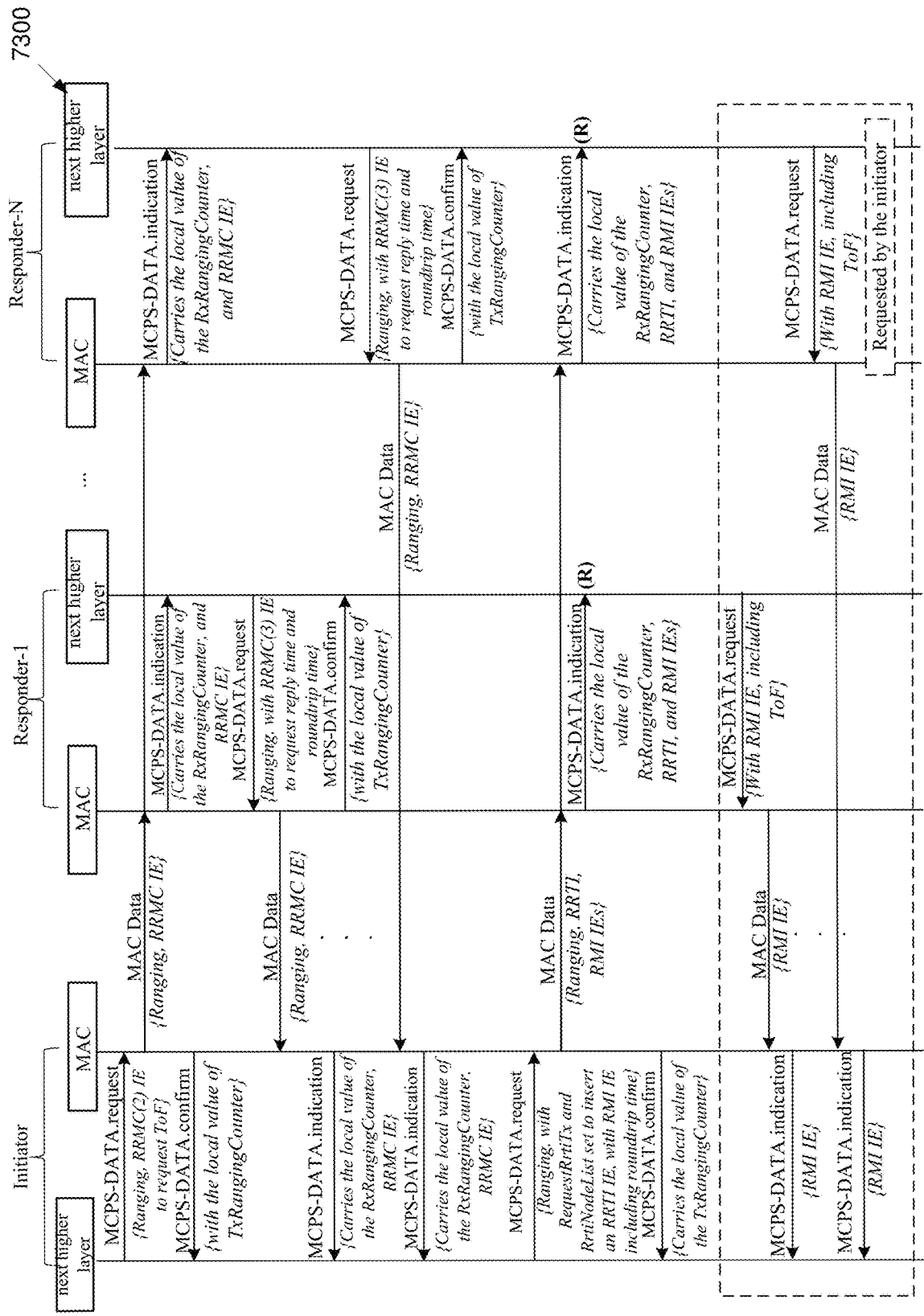
FIG. 73 illustrates an example message sequence chart for one-to-many DS-TWR: request of ranging result from the initiator according to embodiments of the present disclosure.

FIG. 73 illustrates an example message sequence chart 7300 for one-to-many DS-TWR: request of ranging result from the initiator according to embodiments of the present disclosure. The embodiment of the message sequence chart 7300 illustrated in FIG. 73 is for illustration only. FIG. 73 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 7300 as illustrated in FIG. 73. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

In FIG. 73, the initiator requests the ranging result, i.e., TOF, by setting the field value of the TOF Request to be one in the RRMC IE of the ranging initiation message. Therefore, the responders respectively send back the ranging result (RMI IE) in separate data frames based on either time-scheduling or contention.

For the scenario of many initiators-to-many responders (M2M), the controller sends the RCM with the ranging configuration to multiple initiators and responders. In the scenario of one-to-many ranging, there is only one ranging initiation message in the ranging initiation phase (RIP) from a single initiator, while multiple initiators can send ranging initiation messages in the RIP through either scheduling or contention in the M2M ranging. The ranging initiation message contains the RRMC IE, where the ranging control information field value is set to be zero, and the reply time request field value is set to be one.

After collecting ranging initiation messages from different initiators, the next higher layer of the responders initiates the response RFRAME via the MCPS-DATA.request, where RequestRrtiTx and RrtiNodeList are set to insert an RRTI IE. The response RFRAMEs are sent to initiators in the ranging response phase based on the time-scheduling or contention determined via the ranging configuration.

Figure 74:
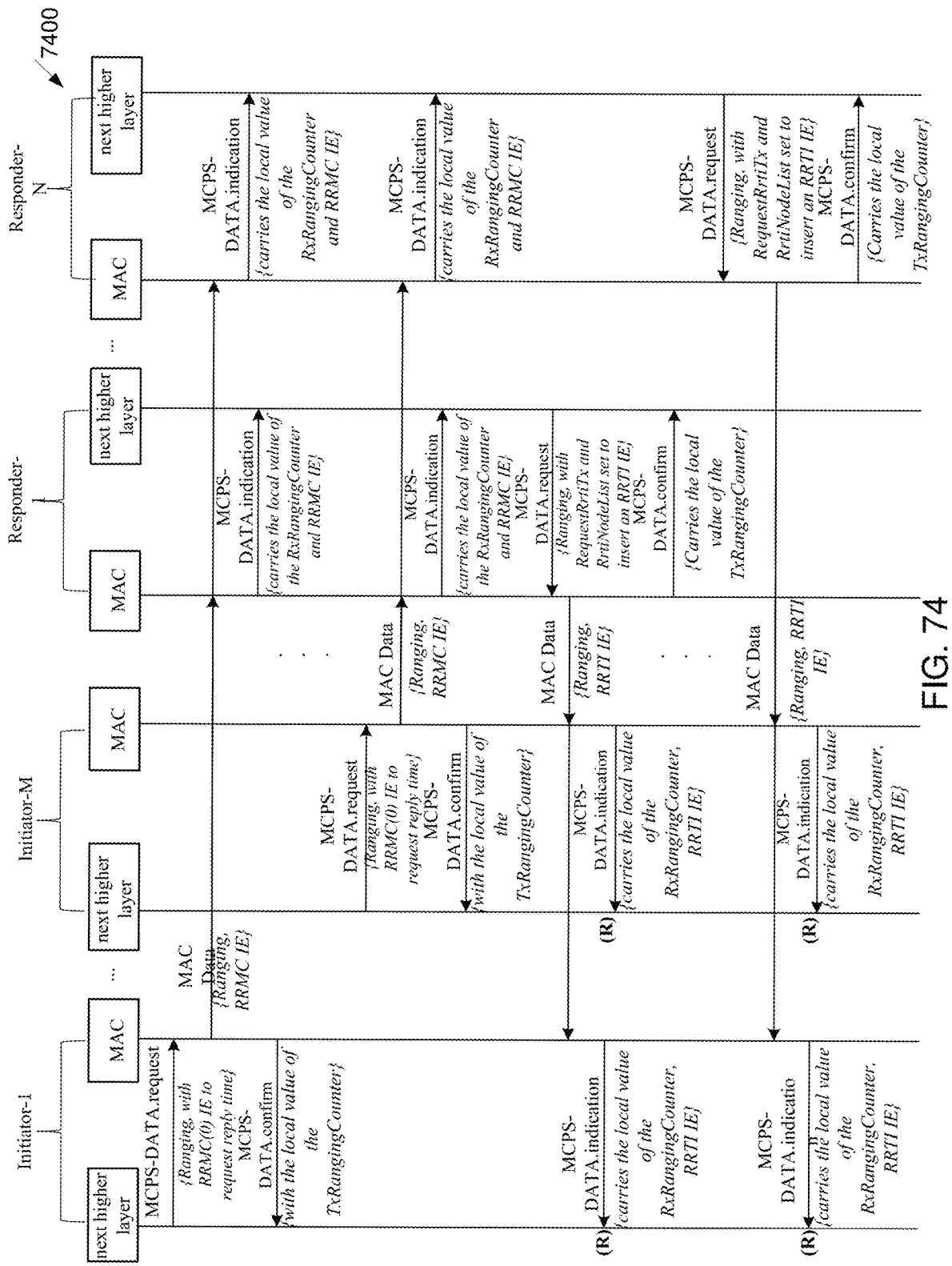
FIG. 74 illustrates an example message sequence chart for M2M SS-TWR according to embodiments of the present disclosure.

FIG. 74 illustrates an example message sequence chart 7400 for M2M SS-TWR according to embodiments of the present disclosure. The embodiment of the message sequence chart 7400 illustrated in FIG. 74 is for illustration only. FIG. 74 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 7400 as illustrated in FIG. 74. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

FIG. 74 illustrates the message sequence chart for M2M SS-TWR between M initiators and N responders, i.e., initiator-1, initiator-2, . . . , initiator-M, and responder-1, responder-2, . . . , responder-N, where transmissions of both ranging initiation and ranging response messages are scheduled in a sequential order. Contention-based transmissions for both ranging initiation phase and ranging response phase can also be performed. At the point labeled (R), the initiator has the sufficient information to calculate the ranging result for the corresponding pair. It is the responsibility of the higher layers to ensure that each required response is supplied in good time to allow the MAC to transmit the required response at the specified time, and similarly to have enabled the receiver in good time to receive any message the receiver needs to receive.

The controller can ascertain this using the ARC IE and RDM IE. In FIG. 74, responders do not request the ranging results. However, similar to FIG. 70, responders can also request the ranging results or relevant time measurement from initiators to calculate the ranging results, which need additional data frames transmitted from initiators.

Figure 75:
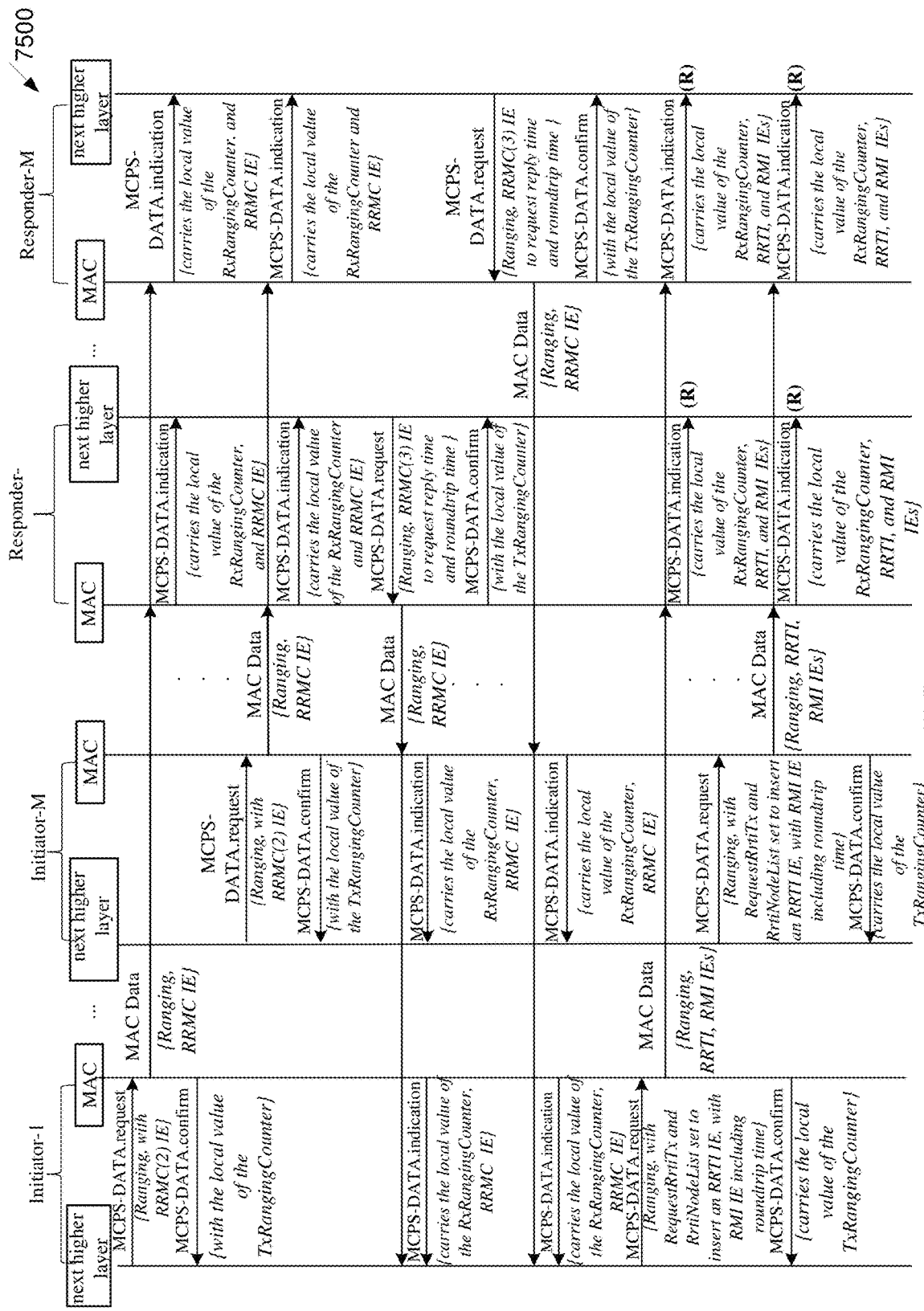
FIG. 75 illustrates an example message sequence chart for M2M DS-TWR according to embodiments of the present disclosure.

FIG. 75 illustrates an example message sequence chart 7500 for M2M DS-TWR according to embodiments of the present disclosure. The embodiment of message sequence chart 7500 illustrated in FIG. 75 is for illustration only. FIG. 75 does not limit the scope of the present disclosure to any particular implementation.

In one embodiment, an electronic device 501 (e.g., 101-103 and 111-116 as illustrated in FIG. 1) as illustrated in FIG. 5 may use the message sequence chart 7500 as illustrated in FIG. 75. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

For the M2M DS-TWR, based on the ranging configuration, multiple initiators may contend or be time-scheduled for the time slots in the ranging initiation phase to send the ranging initiation messages, which convey RRMC IEs. The ranging control information field value in the RRMC IE may be two, which is indicated by the RRMC (2) IE in FIG. 75.

After the ranging initiation phase, the responder forms the ranging response message, containing the RRMC IE to initialize the second round-trip measurement. The ranging control information field value may be three, which is indicated by the RRMC (3) IE in FIG. 75. The fields of reply time request and round-trip time request in the RRMC IE are set to be one.

Ranging response messages can also be transmitted through either time-scheduling or contention determined via ranging configuration. Then, the initiator forms the final RFRAME, which includes the RRTI IE to report reply time, and RMI IE to report round-trip time.

FIG. 75 illustrates the message sequence chart for M2M DS-TWR between M initiators and N responders, where both ranging initiation messages and ranging response messages are scheduled for transmission in a sequential order. At the point labeled (R), responders have sufficient information to calculate the ranging results. If the fields of reply time request, round-trip measurement request, and TOF Request in the RRMC IE in the ranging initiation message are set to be zero, the responder may not send back the ranging result or relevant time measurement to the initiator.

FIG. 76 illustrates a flowchart of a method 7600 for secure ranging operation according to embodiments of the present disclosure, as may be performed by a first network entity.

The embodiment of the method 7600 illustrated in FIG. 6 is for illustration only. FIG. 6 does not limit the scope of the present disclosure to any particular implementation.

In one embodiment, an electronic device 501 (e.g., 101-103 and 111-116 as illustrated in FIG. 1) as illustrated in FIG. 5 may use the method 7600 as illustrated in FIG. 76. The electronic device 501 may be one of electronic devices at least one of in group 1 or group 2 as illustrated in FIG. 6. The electronic device 501 may also be implemented as an initiator or a responder as illustrated in FIG. 34. The electronic device 501 may also be implemented as a controller or a controlee as illustrated in FIG. 34.

As illustrated in FIG. 76, the method 7600 begins at step 7602. In step 7602, the first network entity generates a medium access control (MAC) common part sublayer-data request (MCPS-DATA.request) primitive including a ranging enable indicator and a ranging request measurement and control IE (RRMC IE) with a reply-time request.

In step 7604, the first network entity transmits, to a second network entity, a first MAC Data including the RRMC IE.

In one embodiment, the RRMC IE includes a reply time request field, a round-trip measurement request field, a time-of-flight (ToF) request field, an angle of arrival (AOA) Azimuth request field, an AoA elevation request field, a ranging control information field, a reserved bit field, an RRMC table length field, and an RRMC table field.

In such embodiment, the ranging control information field includes a value indicating: a frame is used for a ranging initiation message of single sided-two way ranging (SS-TWR) when the value is set to zero; the frame is used for responding to the ranging initiation message of SS-TWR when the value is set to one; the frame is used for a ranging initiation message of double sided-two way ranging (DS-TWR) when the values is set to two; and the frame is used for continuing the DS-TWR and initiating a second round-trip time measurement.

In step 7606, the first network entity receives, from the second network entity, a second MAC Data including a ranging reply time instantaneous IE (RRTI IE), and the RRMC IE.

In step 7608, the first network entity identifies a local value of a receive ranging counter (RxRangingCounter).

In one embodiment, the first network entity sends, to the MAC layer from a higher layer, the MCPS-DATA.request primitive; after sends the first MAC Data to the second network entity, sending, to the higher layer from the MAC layer, an MCPS-DATA.confirm primitive including a local value of transmit ranging counter (TxRangingCounter); and after receiving the second MAC Data from the second network entity, sends, to the higher layer from the MAC layer, an MCPS-DATA.indication primitive with the local value of the receive ranging counter (RxRangingCounter), and the RRMC IE.

In one embodiment, the first network entity generates the MCPS-Data.request primitive including at least one ranging measurement information IE (RMI IE) with information requested by the first network entity; sends, to the MAC layer from a higher layer, the MCPS-Data.request primitive; and transmits, to the second network entity, the first MAC data including the RRMC IE.

In such embodiment, the at least one RMI IE includes an address present field, a reply-time present field, a round-trip measurement present field, a ToF present field, an AoA Azimuth present field, an AoA elevation present field, a deferred mode field, a reserved field, an RMI list length field, and an RMI list field; and the RMI list field includes an RX-to-Tx reply-time field, a Tx-to-Rx round-trip field, a ToF field, an AoA Azimuth field, an AoA elevation field, and an address field.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope

What is claimed is:

1. A first network entity in a wireless communication system supporting ranging capability, the first network entity comprising:
a processor configured to:
generate a medium access control (MAC) common part sublayer-data request (MCPS-DATA.request) primitive including a ranging enable indicator and a ranging request measurement and control IE (RRMC IE) with a reply-time request; and
a transceiver operably connected to the processor, the transceiver configured to:
transmit, to a second network entity, a first MAC Data including the RRMC IE,
receive, from the second network entity, a second MAC Data including a ranging reply time instantaneous IE (RRTI IE), and the RRMC IE,
the processor is further configured to identify a local value of a receive ranging counter (RxRangingCounter).

2. The first network entity of claim 1, wherein the processor is configured to:
send, to a MAC layer from a higher layer, the MCPS-DATA.request primitive;
after sending the first MAC Data to the second network entity, send, to the higher layer from the MAC layer, an MCPS-DATA.confirm primitive including a local value of transmit ranging counter (TxRangingCounter); and
after receiving the second MAC Data from the second network entity, send, to the higher layer from the MAC layer, an MCPS-DATA.indication primitive with the local value of the receive ranging counter (RxRangingCounter), the RRTI IE, and the RRMC IE.

3. The first network entity of claim 1, wherein the RRMC IE includes a reply time request field, a round-trip measurement request field, a time-of-flight (ToF) request field, an angle of arrival (AOA) Azimuth request field, an AoA elevation request field, a ranging control information field, a reserved bit field, an RRMC table length field, and an RRMC table field.

4. The first network entity of claim 3, wherein the ranging control information field includes a value indicating:
a frame is used for a ranging initiation message of single sided-two way ranging (SS-TWR) when the value is set to zero;
the frame is used for responding to the ranging initiation message of SS-TWR when the value is set to one;
the frame is used for a ranging initiation message of double sided-two way ranging (DS-TWR) when the values is set to two; and
the frame is used for continuing the DS-TWR and initiating a second round-trip time measurement.

5. The first network entity of claim 1, wherein:
the processor is further configured to:
generate the MCPS-Data.request primitive including at least one ranging measurement information IE (RMI IE) with information requested by the second network entity; and
send, to a MAC layer from a higher layer, the MCPS-Data.request primitive; and
the transceiver is further configured to transmit, to the second network entity, the first MAC data including the at least one RMI IE.

6. The first network entity of claim 5, wherein the at least one RMI IE includes an address present field, a reply-time present field, a round-trip measurement present field, a ToF present field, an AoA Azimuth present field, an AoA elevation present field, a deferred mode field, a reserved field, an RMI list length field, and an RMI list field.

7. The first network entity of claim 6, wherein the RMI list field includes an RX-to-Tx reply-time field, a Tx-to-Rx round-trip field, a ToF field, an AoA Azimuth field, an AoA elevation field, and an address field.

8. A second network entity in a wireless communication system supporting ranging capability, the second network entity comprising:
a transceiver configured to:
receive, from a first network entity, a first MAC Data including ranging enable indicator and a ranging request measurement and control IE (RRMC IE) with a reply-time request, wherein the RRMC IE is generated, by a first network entity, in a medium access control (MAC) common part sublayer-data request (MCPS-DATA.request); and
transmit, to the first network entity, a second MAC Data including a ranging reply time instantaneous IE (RRTI IE), and the RRMC IE; and
a processor operably connected to the transceiver, the processor configured to identify a local value of a receive ranging counter (RxRangingCounter).

9. The second network entity of claim 8, wherein the processor is configured to:
send, to a MAC layer from a higher layer, the MCPS-DATA.request primitive;
after sending the second MAC Data to the first network entity, send, to the higher layer from the MAC layer, an MCPS-DATA.confirm primitive including a local value of transmit ranging counter (TxRangingCounter); and
after receiving the first MAC Data from the first network entity, send, to the higher layer from the MAC layer, an MCPS-DATA.indication primitive with the local value of the receive ranging counter (RxRangingCounter), and the RRMC IE.

10. The second network entity of claim 8, wherein the RRMC IE includes a reply time request field, a round-trip measurement request field, a time-of-flight (ToF) request field, an angle of arrival (AOA) Azimuth request field, an AoA elevation request field, a ranging control information field, a reserved bit field, an RRMC table length field, and an RRMC table field.

11. The second network entity of claim 10, wherein the ranging control information field includes a value indicating:
a frame is used for a ranging initiation message of single sided-two way ranging (SS-TWR) when the value is set to zero;
the frame is used for responding to the ranging initiation message of SS-TWR when the value is set to one;

the frame is used for a ranging initiation message of double sided-two way ranging (DS-TWR) when the values is set to two; and the frame is used for continuing the DS-TWR and initiating a second round-trip time measurement.

12. The second network entity of claim 8, wherein:
the processor is further configured to:
send, from a MAC layer to a higher layer, the MCPS-Data.indication primitive; and
identify the MCPS-Data.request primitive including at least one ranging measurement information IE (RMI IE) with information requested by the first network entity; and
the transceiver is further configured to receive, from the first network entity, the first MAC data including the RRMC IE.

13. The second network entity of claim 12, wherein the at least one RMI IE includes an address present field, a reply-time present field, a round-trip measurement present field, a ToF present field, an AoA Azimuth present field, an AoA elevation present field, a deferred mode field, a reserved field, an RMI list length field, and an RMI list field.

14. The second network entity of claim 13, wherein the RMI list field includes an RX-to-Tx reply-time field, a Tx-to-Rx round-trip field, a ToF field, an AoA Azimuth field, an AoA elevation field, and an address field.

15. A method of a first network entity in a wireless communication system supporting ranging capability, the method comprising:
generating a medium access control (MAC) common part sublayer-data request (MCPS-DATA.request) primitive including a ranging enable indicator and a ranging request measurement and control IE (RRMC IE) with a reply-time request;
transmitting, to a second network entity, a first MAC Data including the RRMC IE;
receiving, from the second network entity, a second MAC Data including a ranging reply time instantaneous IE (RRTI IE), and the RRMC IE; and
identifying a local value of a receive ranging counter (RxRangingCounter).

16. The method of claim 15, further comprising:
sending, to a MAC layer from a higher layer, the MCPS-DATA.request primitive;
after sending the first MAC Data to the second network entity, sending, to the higher layer from the MAC layer, an MCPS-DATA.confirm primitive including a local value of transmit ranging counter (TxRangingCounter); and
after receiving the second MAC Data from the second network entity, sending, to the higher layer from the MAC layer, an MCPS-DATA.indication primitive with the local value of the receive ranging counter (RxRangingCounter), the RRTI IE, and the RRMC IE.

17. The method of claim 15, wherein the RRMC IE includes a reply time request field, a round-trip measurement request field, a time-of-flight (ToF) request field, an angle of arrival (AOA) Azimuth request field, an AoA elevation request field, a ranging control information field, a reserved bit field, an RRMC table length field, and an RRMC table field.

18. The method of claim 17, wherein the ranging control information field includes a value indicating:
a frame is used for a ranging initiation message of single sided-two way ranging (SS-TWR) when the value is set to zero;
the frame is used for responding to the ranging initiation message of SS-TWR when the value is set to one;
the frame is used for a ranging initiation message of double sided-two way ranging (DS-TWR) when the values is set to two; and
the frame is used for continuing the DS-TWR and initiating a second round-trip time measurement.

19. The method of claim 18, further comprising:
generating the MCPS-Data.request primitive including at least one ranging measurement information IE (RMI IE) with information requested by the second network entity;
sending, to a MAC layer from a higher layer, the MCPS-Data.request primitive; and
transmitting, to the second network entity, including the at least one RMI IE.

20. The method of claim 19, wherein:
the at least one RMI IE includes an address present field, a reply-time present field, a round-trip measurement present field, a ToF present field, an AoA Azimuth present field, an AoA elevation present field, a deferred mode field, a reserved field, an RMI list length field, and an RMI list field; and
the RMI list field includes an RX-to-Tx reply-time field, a Tx-to-Rx round-trip field, a ToF field, an AoA Azimuth field, an AoA elevation field, and an address field.

* * * * *